US012099542B2

(12) United States Patent
Severn et al.

(10) Patent No.: US 12,099,542 B2
(45) Date of Patent: Sep. 24, 2024

(54) IMPLEMENTING A GRAPHICAL USER INTERFACE TO COLLECT INFORMATION FROM A USER TO IDENTIFY A DESIRED DOCUMENT BASED ON DISSIMILARITY AND/OR COLLECTIVE CLOSENESS TO OTHER IDENTIFIED DOCUMENTS

(71) Applicant: Evolv Technology Solutions, Inc., San Francisco, CA (US)

(72) Inventors: Robert Severn, Berkeley, CA (US); Matthew J. Strom, Concord, CA (US); Diego Guy M. Legrand, San Francisco, CA (US); James O'Neill, Berkeley, CA (US); Scott Henning, San Francisco, CA (US)

(73) Assignee: Evolv Technology Solutions, Inc., San Francisco, CA (US)

( * ) Notice: Subject to any disclaimer, the term of this patent is extended or adjusted under 35 U.S.C. 154(b) by 0 days.

(21) Appl. No.: 17/589,882

(22) Filed: Jan. 31, 2022

(65) Prior Publication Data

US 2022/0156302 A1 May 19, 2022

Related U.S. Application Data

(62) Division of application No. 15/977,931, filed on May 11, 2018, now Pat. No. 11,238,083.

(Continued)

(51) Int. Cl.
*G06F 16/35* (2019.01)
*G06F 16/335* (2019.01)
(Continued)

(52) U.S. Cl.
CPC .......... *G06F 16/358* (2019.01); *G06F 16/335* (2019.01); *G06F 16/355* (2019.01);
(Continued)

(58) Field of Classification Search
CPC .... G06F 16/335; G06F 16/355; G06F 16/358; G06F 16/93; G06F 18/22;
(Continued)

(56) References Cited

U.S. PATENT DOCUMENTS 5,819,258 A * 10/1998 Vaithyanathan ...... G06F 16/355
707/999.005
5,930,784 A * 7/1999 Hendrickson .......... G06F 16/34
707/E17.093

(Continued)

FOREIGN PATENT DOCUMENTS

WO WO-2015173647 A1 * 11/2015 ......... G06F 16/2455

OTHER PUBLICATIONS

H. Yang, "A Document Clustering Algorithm for Web Search Engine Retrieval System," 2010 International Conference on e-Education, e-Business, e-Management and e-Learning, Sanya, China, 2010, pp. 383-386, doi: 10.1109/IC4E.2010.72. (Year: 2010).*

(Continued)

*Primary Examiner* — James E Richardson
(74) *Attorney, Agent, or Firm* — Haynes Beffel & Wolfeld LLP; Andrew L. Dunlap

(57) ABSTRACT

A method of implementing a graphical user interface to collect information from a user is provided. The method includes (i) dynamically displaying, by the graphical user interface, K>1 groupings of M>1 documents from a catalog of documents in an embedding space, wherein a distance between each pair of the documents in the embedding space corresponds to a predetermined measure of dissimilarity between the pair of documents, and the K groupings are formed using K-medoid clustering analysis, (ii) receiving a user selection of one grouping of the K groupings, (iii) dynamically displaying a predetermined number P>0 documents of the cluster which corresponds to the selected (Continued)

grouping, (iv) receiving user feedback with respect to one of the $P_k$ documents of the selected grouping, (v) and dynamically displaying an identified subsequent document from the selected grouping in dependence on the set of liked documents and the set of disliked documents.

13 Claims, 46 Drawing Sheets
(18 of 46 Drawing Sheet(s) Filed in Color)

Related U.S. Application Data

(60) Provisional application No. 62/512,646, filed on May 30, 2017, provisional application No. 62/512,649, filed on May 30, 2017, provisional application No. 62/505,756, filed on May 12, 2017, provisional application No. 62/505,753, filed on May 12, 2017, provisional application No. 62/505,757, filed on May 12, 2017.

(51) Int. Cl.
*G06F 16/93* (2019.01)
*G06F 18/22* (2023.01)
*G06F 18/23213* (2023.01)
*G06F 18/2413* (2023.01)
*G06V 10/764* (2022.01)

(52) U.S. Cl.
CPC .............. *G06F 16/93* (2019.01); *G06F 18/22* (2023.01); *G06F 18/23213* (2023.01); *G06F 18/24143* (2023.01); *G06V 10/764* (2022.01)

(58) Field of Classification Search
CPC ........ G06F 18/23213; G06F 18/24143; G06K 9/00624; G06K 9/6215; G06K 9/6223; G06K 9/6274
See application file for complete search history.

(56) References Cited

U.S. PATENT DOCUMENTS

| | | | | |
|---|---|---|---|---|
| 7,644,373 | B2* | 1/2010 | Jing | G06F 3/0485 715/838 |
| 8,429,163 | B1* | 4/2013 | Ahmadullin | G06F 16/93 382/305 |
| 10,817,557 | B1* | 10/2020 | Knas | G06F 16/438 |
| 2002/0091678 | A1* | 7/2002 | Miller | G06F 16/338 |
| 2009/0216692 | A1* | 8/2009 | Saito | G06F 16/683 706/12 |
| 2012/0096009 | A1* | 4/2012 | Scholz | G06F 16/335 707/748 |
| 2015/0169635 | A1* | 6/2015 | Jing | G06F 16/583 707/723 |
| 2015/0220647 | A1* | 8/2015 | Gangwani | G06F 16/951 707/731 |
| 2016/0179847 | A1* | 6/2016 | Epstein | G06Q 30/0623 707/737 |
| 2017/0039198 | A1* | 2/2017 | Ramamurthy | G06F 16/904 |

OTHER PUBLICATIONS

Lai et al. Variance enhanced K-medoid clustering, Expert Systems with Applications, vol. 38, Issue 1, 2011, pp. 764-775, ISSN 0957-4174, https://doi.org/10.1016/j.eswa.2010.07.030. (https://www.sciencedirect.com/science/article/pii/S0957417410006470) (Year: 2011).*

Balabantaray et al. Document Clustering using K-Means and K-Medoids, International Journal of Knowledge Based Computer Systems, vol. 1 Issue 1 ,2013 (Year: 2013).*

U.S. Appl. No. 15/977,931—Office Action dated May 20, 2021, 41 pages.

U.S. Appl. No. 15/977,931—Response to Office Action dated May 20, 2021, filed Aug. 20, 2021, 17 pages.

U.S. Appl. No. 15/977,931—Notice of Allowance dated Sep. 20, 2021, 11 pages.

U.S. Appl. No. 15/977,931—Supplemental Notice of Allowance dated Sep. 28, 2021, 6 pages.

* cited by examiner

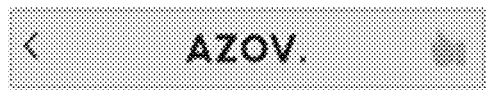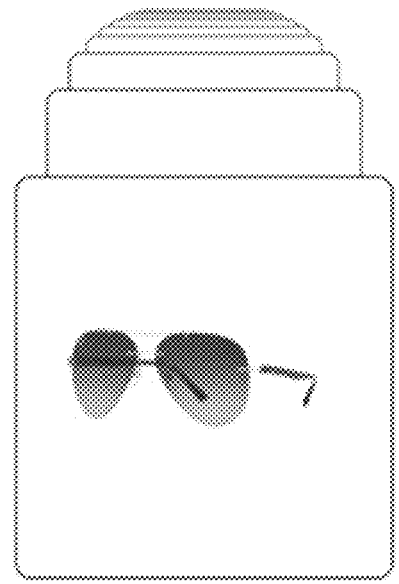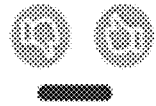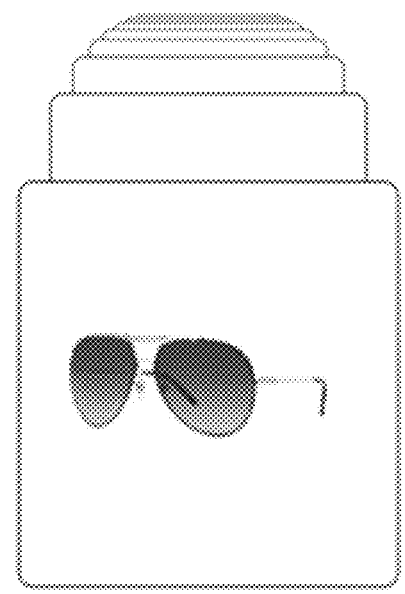
FIG. 44A
FIG. 44B

IMPLEMENTING A GRAPHICAL USER INTERFACE TO COLLECT INFORMATION FROM A USER TO IDENTIFY A DESIRED DOCUMENT BASED ON DISSIMILARITY AND/OR COLLECTIVE CLOSENESS TO OTHER IDENTIFIED DOCUMENTS

CROSS-REFERENCE TO OTHER APPLICATIONS

This application is a divisional of U.S. application Ser. No. 15/977,931 filed May 11, 2018, now U.S. Pat. No. 11,238,083 issued Feb. 1, 2022, entitled "INTELLIGENTLY DRIVEN VISUAL INTERFACE ON MOBILE DEVICES AND TABLETS BASED ON IMPLICIT AND EXPLICIT USER ACTIONS", which claims priority to U.S. Provisional Application No. 62/512,646 filed May 30, 2017, entitled "VISUAL INTERACTIVE SEARCH THAT PROVIDES AN INTELLIGENTLY DRIVEN VISUAL INTERFACE ON MOBILE DEVICES AND TABLETS BASED ON USER ACTIONS"; U.S. Provisional Application No. 62/512,649 filed May 30, 2017, entitled "VISUAL INTERACTIVE SEARCH THAT PROVIDES INTELLIGENT RECOMMENDATIONS DRIVEN FROM IMPLICIT USER ACTIONS AND BY WEIGHTING IMPLICIT AND EXPLICIT USER ACTIONS"; U.S. Provisional Application No. 62/505,757 filed May 12, 2017, entitled "INTELLIGENT RECOMMENDATIONS DRIVEN FROM IMPLICIT USER ACTIONS"; U.S. Provisional Application No. 62/505,753 filed May 12, 2017, entitled "SIMPLE COLLECTION AND COMPARISON OF ITEMS ON A MOBILE DEVICE OR TABLET"; and U.S. Provisional Application No. 62/505,756 filed May 12, 2017, entitled "INTELLIGENTLY DRIVEN ECOMMERCE ON MOBILE DEVICES AND TABLETS", the entire contents of each are incorporated by reference herein in their entireties.

BACKGROUND

The invention relates generally to a server that provides a visual and interactive environment that allows a user to search for and find digital documents in an intuitive, interactive and visual way by (i) intelligently determining sets of documents and visualizing the documents on a screen according to user actions and (ii) considering and gradually weighting both implicit and explicit user actions. Examples of digital documents include: photographs, product descriptions, or webpages.

Current computer search technologies allow servers respond to search queries with an ordered list of results. The queries may be in the form of a structured query language, natural language text, speech, or a reference image. However, the results returned often are unsatisfactory. The problem is particularly acute where the server is looking for a document which has particular visual characteristics, which may not be easily articulated in words or by a description of how the target document differs from a reference image. Stated simply, someone must see the final identified document in order to determine whether the search was successful. As a result of this uncertainty, the server can be inefficient at identifying the document and can consume an unnecessarily high level of resources (e.g., bandwidth and processing).

For example, the server may be searching for a single particular photograph. If the library is not pre-annotated with the photo characteristics that are sufficient to uniquely identify the target photograph, it would be extremely difficult for the server to find such a photograph. The server may be relegated to showing images iteratively to a user until the user indicates success. As another example, the server may be searching through a vendor's catalog of shoes for a shoe design which might be aesthetically pleasing to a particular user. Unless the server can receive, from the user, an articulation of what constitutes an aesthetically pleasing design, the server is relegated to consuming an unnecessarily high level of bandwidth and processing power in order to provide an extended ongoing iterative browsing experience to the user. As yet another example, the server may be searching the web in order to find a web page that might look interesting to the user to read. Again, unless the server knows beforehand what subject matter will be interesting to the user at that moment, the server is relegated to consuming an unnecessarily high level of bandwidth and processing power in order to provide an extended ongoing iterative browsing to the user, forcing the server to occupy users' time and consume resources while receiving random clicks through various links, which may be the only way to find the target web page. As yet another example, the server may be searching for apparel or accessories that look nice with other apparel already owned by a particular person. As yet another example, the server may be searching for images similar to a prototype image, but different in ways that are not easily articulated. Again, without being able to receive an exact articulation of characteristics of the target document, current computer search technologies implemented by the server may not be able to help.

Some libraries are annotated with metadata, such as date and location (for a photo library), or type and features of products (for a product catalog). But many are not annotated, and even those which are may not be sufficiently specific to allow the server to efficiently hone in on the desired document quickly. As touched on above, some search technologies allow the server to perform searches iteratively, thereby gradually narrowing the field of possible documents until the target document is found. But these often still take a long time, and cause the server to consume an unnecessarily high level of bandwidth and processing power by requiring the server to offer many different collections of candidate documents before the target document is found.

SUMMARY

Intelligently Driven User Interface

When searching for documents on a screen of a device using a visual search environment, the size of the screen and the particular documents displayed on the screen for the user play a significant factor on e-commerce conversion rates. Smaller screens and non-intelligent displays of documents typically have a lower conversion rate with respect to a purchase than larger screens. This is at least partially driven by the size of the screen and the user not feeling completely sure that they have seen all of the best options of documents related to their interest or that they have not identified the correct document or document that they think they need.

For example, when viewing products on a graphical user interface, users feel like they have not seen all of the best options of products that are related to their interest. Further, even when a user identifies a product or products that appear to be what they are looking for, the user is hesitant to make a purchase because the size of the graphical user interface is limited with respect to what the user is used to seeing in a brick-and-mortar store. In the brick-and-mortar store the user can see the entire layout and the user controls the direction of their search for a product. Online shopping is much different, because the user has to trust that the system (e.g., the graphical user interface) is giving them the best options that are most aligned with their interests. This "feeling" that the user has leads them to not purchasing a product, even if they have identified the best option for what they are looking for. Furthermore, typical graphical user interfaces rely on the user to filter or group based on their own categorization, which is typically too narrow or focused on the wrong area of products.

What is needed is a visual and interactive environment and search method that overcomes these shortcomings and allows a user to search and find products in an intuitive, interactive and visual way by intelligently determining groups of products and visualizing the products according to user actions that provides the user with the "feeling" that they have seen all of the best options and make a purchase with confidence. Specifically, these shortcomings can be overcome by providing a front-end user interface that intelligently groups products, gathers information from users, and uses the gathered information to update products displayed to the user from electronic "catalogs" of products on the back-end. These electronic "catalogs" can be highly dimensional spaces (e.g., an embedding space) comprised of representations of products. Based on the information gathered from the user, various aspects of the products represented in the highly dimensional spaces can be considered for determining which products to present to the user.

Further, this visual and interactive search method will implement a front-end interface in such a way that information regarding whether the user "likes," "dislikes" or is "neutral" about a product or a group of products can be gathered. This information can be gathered on an ongoing basis using, for example, a carousel of products presented to the user. Each time the user provides information on the product, the highly dimensional space on the back-end is updated based on the gathered information and then new results are provided to the user. The new results provided to the user are driven by the "likes," "dislikes" or "neutral" opinions provided by the user. As a result of implementing these features, a conventional computer system (e.g., the server and/or user device providing the results) is improved because the user is able to get to what they are looking for faster, with fewer iterations and more confidence. This is achievable because the computer system implementing these features is able to intelligently display a limited set of information to the user by gathering the information mentioned above and summarizing the user's interests to provide a limited set of valuable information to the user.

For example, when a user "likes" a particular group of products presented to them by selecting a like button on the carousel that visually illustrates groups of products, additional products that are similar to the liked group of products and that are obtained from the highly dimensional space. These subsequent products shown to the user are obtained by shrinking and converging, within the highly dimensional space, towards products previously liked by the user. On the other hand, when a user "dislikes" a product (or a group of products) by selecting a dislike button on the carousel of images, a group of candidate products, from the highly dimensional space, can expand to provide the user with a more diverse selection of products.

Further, this visual and interactive search method will allow the user to act and feel as if they are shopping in a physical store eventually honing in on the products they are searching for. Such a user experience will collect more use information from the user and allow a server to locate a target product or products much more quickly. Methods according to aspects of the invention as described herein allow the server to obtain user valuable feedback, which in turn allows the server to search for the target product in a much more effective and efficient manner. This solves the problems of prior graphical user interface devices in the context of computerized searching (e.g., shopping) relating to speed, accuracy and usability. Methods according to aspects of the invention can thereby reduce the number of search iterations processed by the server on the order of 40% or more, which in turn greatly reduces the consumption of bandwidth and processing power required by the server (e.g., improved speed, accuracy and usability). These methods also allow the user to much more quickly locate the target product, feel comfortable with their selection and make a more confident final selection or purchasing decision with respect to the target product.

Intelligent Recommendations Driven by Implicit User Actions

Previously implemented methods of searching for documents (e.g., products) includes soliciting explicit actions from the user, such as forcing the user to indicate whether they "like" or "dislike" a document or asking the user whether or not they would like to add the document to a wish list. However, users are often reluctant to take an affirmative position as to whether or not the "like" or "dislike" the document because they feel like they are being forced to choose on the spot whether they like or dislike the document.

For example, when viewing products on a graphical user interface, users are often able to provide feedback based on explicit solicitations requiring the user to provide an explicit response, such as selecting a "like" option or a "dislike" option. Some problems with this approach are that (i) the user may not really know what they are looking for and may not be sure whether they like or dislike the product, such that "like" or "dislike" forces that particular product into an unproductive category, (ii) the limited screen space on the graphical user interface could be better utilized without requiring "like" and "dislike" options along with all of the other more necessary options and (iii) it is difficult to provide further product recommendations to the user when the only information available is whether the user likes or dislikes particular products. By using only the "like" and "dislike" criteria, users are often placed into a group (e.g., a cohort group) that for one reason or another seems to include members that have similar interests. Such an approach can result in a user being misclassified and forced down a path of products that is not productive for the user or the retailer, even though, on average, that particular group might be interested in particular types of products.

What is needed is a visual search method that can overcome these shortcomings and allow the server to significantly shortcut the search process while providing the user with a visual interface that does not make the user feel like they are making "like" or "dislike" decisions on the spot. Specifically, these shortcomings can be overcome by assigning weights to user actions performed when a product is presented on a product view page of a mobile device, a tablet or even a desktop computer. These weights can be assigned based on both explicit actions other than "like" or "dislike" taken by a user and implicit actions taken by the user. Explicit actions can include adding a product to a wish list or a favorites list or adding the product to a shopping cart. Implicit actions can include opening up a more detailed view of a product, lingering on a view of a product for a specific amount of time, hovering over the view of a product with a cursor for a specific amount of time, or quickly scrolling past (e.g., dismissing) the product. Each of these actions can be assigned a weight (positive and/or negative) so that a much more accurate feeling for a user's preference can be learned over a short period of time. This provides the user with a better and more productive experience and increases the customer conversion rate for the retailer.

Further, this visual search method will allow the user to act and feel as if they are shopping in a physical store eventually honing in on the products they are searching for. Such a user experience will collect more use information from the user and allow the server to locate the target product or products much more quickly. Methods according to aspects of the invention as described herein allow the server to obtain and gradually weighting both implicit and explicit user actions, which in turn allows the server to search for the target product in a much more effective and efficient manner. Methods according to aspects of the invention can thereby reduce the number of search iterations processed by the server on the order of 40% or more, which in turn greatly reduces the consumption of bandwidth and processing power required by the server. These methods also allow the user to much more quickly locate the target product, feel comfortable with their selection and make a more confident final selection or purchasing decision with respect to the target product.

Aspects of the Present Disclosure

Aspects of the present disclosure are to address at least the above-mentioned problems and/or disadvantages and to provide at least the advantages described below. Accordingly, an aspect of the present disclosure is to provide a system that uses a novel, visual and iterative search technique with relative feedback.

In accordance with an aspect of the present disclosure, a method for user identification of a desired document is provided. The method includes providing, accessibly to a computer system, a database identifying (i) a catalog of documents in an embedding space and (ii) a distance between each pair of the documents in the embedding space and the distance corresponds to a predetermined measure of dissimilarity between the pair of documents and a clustering step of a computer system forming K clusters of documents, such that each document of the catalog of documents is included in a cluster of the K clusters. The method further includes a medoid locating step of locating a medoid document for each of the clusters. Furthermore, the method includes a representative selection step of selecting $M_k>1$ representative documents from each k'th one of the clusters, a cluster presentation step of identifying for dynamic display toward the user, K groupings of documents, wherein each of the groupings identifies the selected $M_k$ representative documents of a corresponding one of the clusters, and a document presentation step of, in response to user selection of one of the groupings, identifying, for dynamic display toward the user, a predetermined number $P_k>0$ of documents of the cluster which corresponds to the selected grouping.

In accordance with another aspect of the present disclosure, a method of implementing a graphical user interface to collect information from a user is provided. The method includes dynamically displaying, by the graphical user interface, $K>1$ groupings of $M>1$ documents from a catalog of documents in an embedding space, wherein the catalog of documents is from a database, a distance between each pair of the documents in the embedding space corresponding to a predetermined measure of dissimilarity between the pair of documents, and wherein the K groupings are formed using K-medoid clustering analysis, receiving a user selection of one grouping of the K groupings, dynamically displaying, by the graphical user interface, a predetermined number $P>0$ documents of the cluster which corresponds to the selected grouping, receiving user feedback with respect to one of the $P_k$ documents indicating a like or a dislike, and dynamically displaying, by the graphical user interface, a user feedback related document in dependence on the received user feedback, wherein the user feedback related document is identified from the cluster which corresponds to the selected grouping in dependence on a distance of the user feedback related document from the one of the $P_k$ documents for which the user feedback was received.

In accordance with other aspects of the present disclosure, a non-transitory computer-readable recording medium is provided, which contains software code portions that implement aspects of the above-described methods.

In accordance with another aspect of the present disclosure, a system is provided, which includes one or more processors coupled to memory, the memory being loaded with computer instructions to provide for user identification of a desired document, the instructions, when executed on the processors, implement actions of the above-describe method.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab. The invention will be described with respect to specific implementations thereof, and reference will be made to the drawings, in which:

FIGS. 44A, 44B, 44C, 44D and 44E illustrate simple collection and comparison of items on a mobile device or tablet.

DETAILED DESCRIPTION

The following description is presented to enable any person skilled in the art to make and use the invention, and is provided in the context of a particular application and its requirements. Various modifications to the disclosed implementations will be readily apparent to those skilled in the art, and the general principles defined herein may be applied to other implementations and applications without departing from the spirit and scope of the present invention. Thus, the present invention is not intended to be limited to the implementations shown, but is to be accorded the widest scope consistent with the principles and features disclosed herein.

Figure 3:
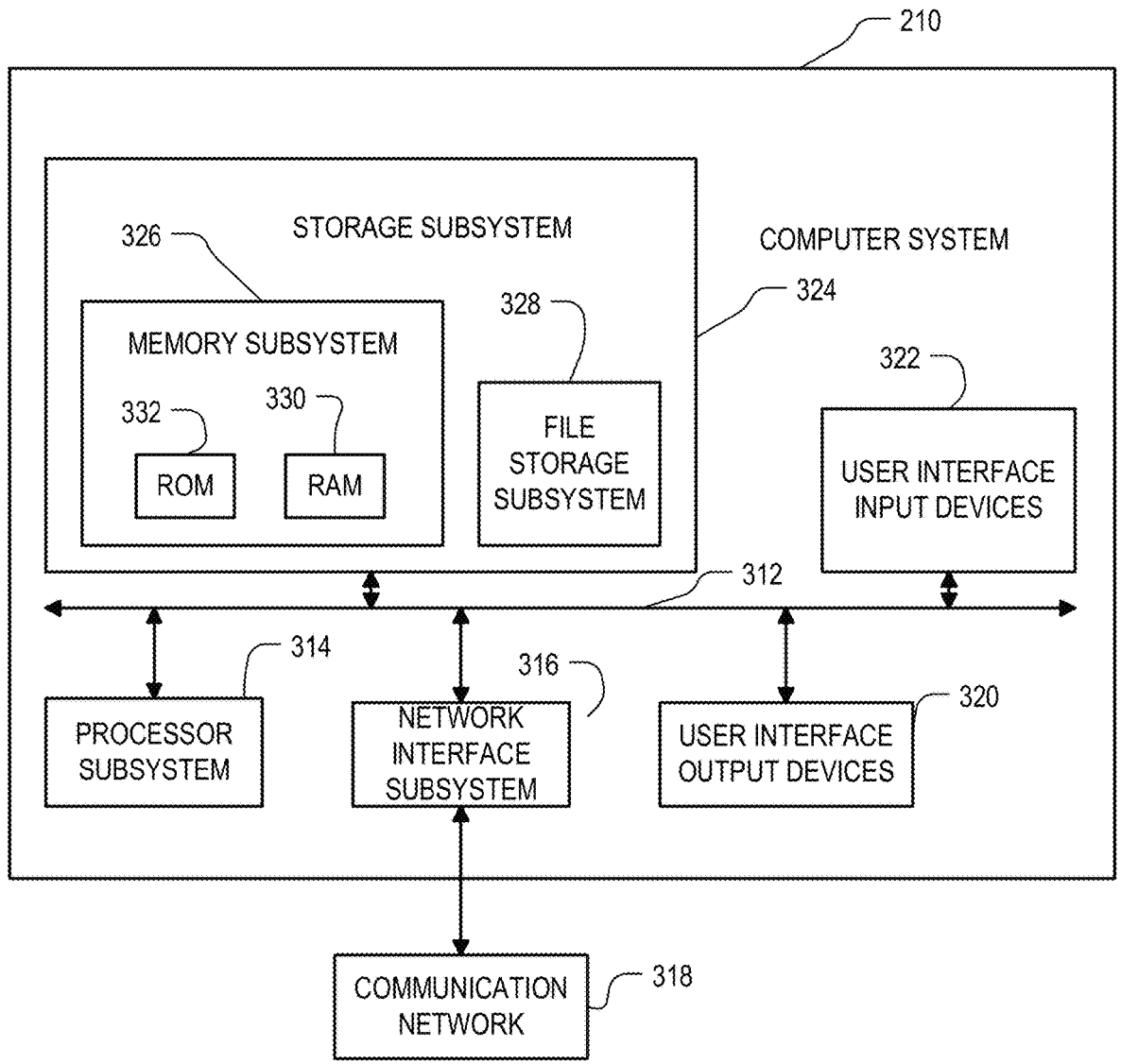
FIG. 3 is a block diagram of a user computer and/or a server computer, as illustrated in FIG. 2, that can be used to implement software incorporating aspects of the visual interactive search system according to an implementation of the present disclosure.
Figure 4:
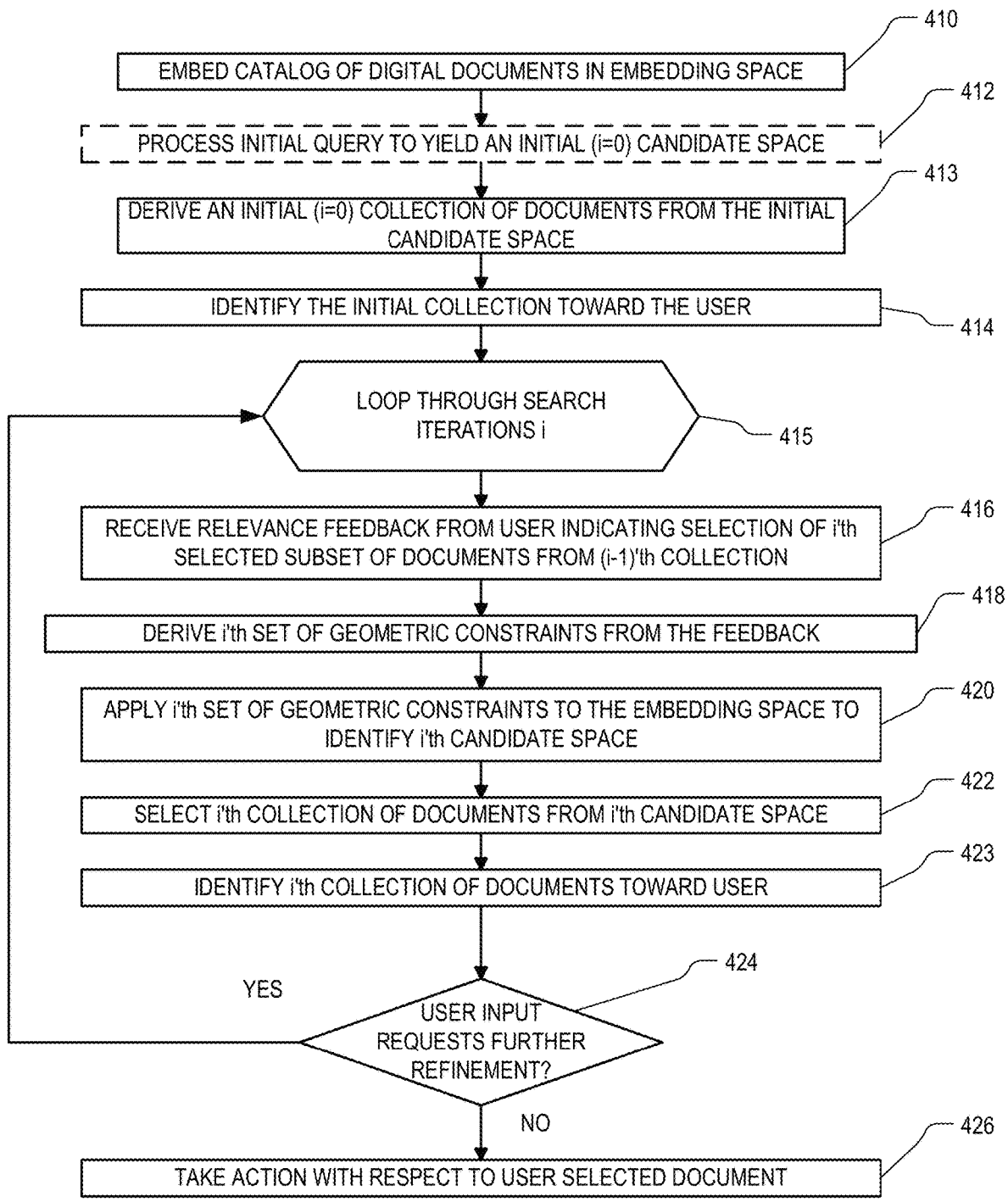
FIG. 4 is a flowchart illustrating various logic phases through which a visual interactive search system may proceed according to an implementation of the present disclosure.
Figure 5:
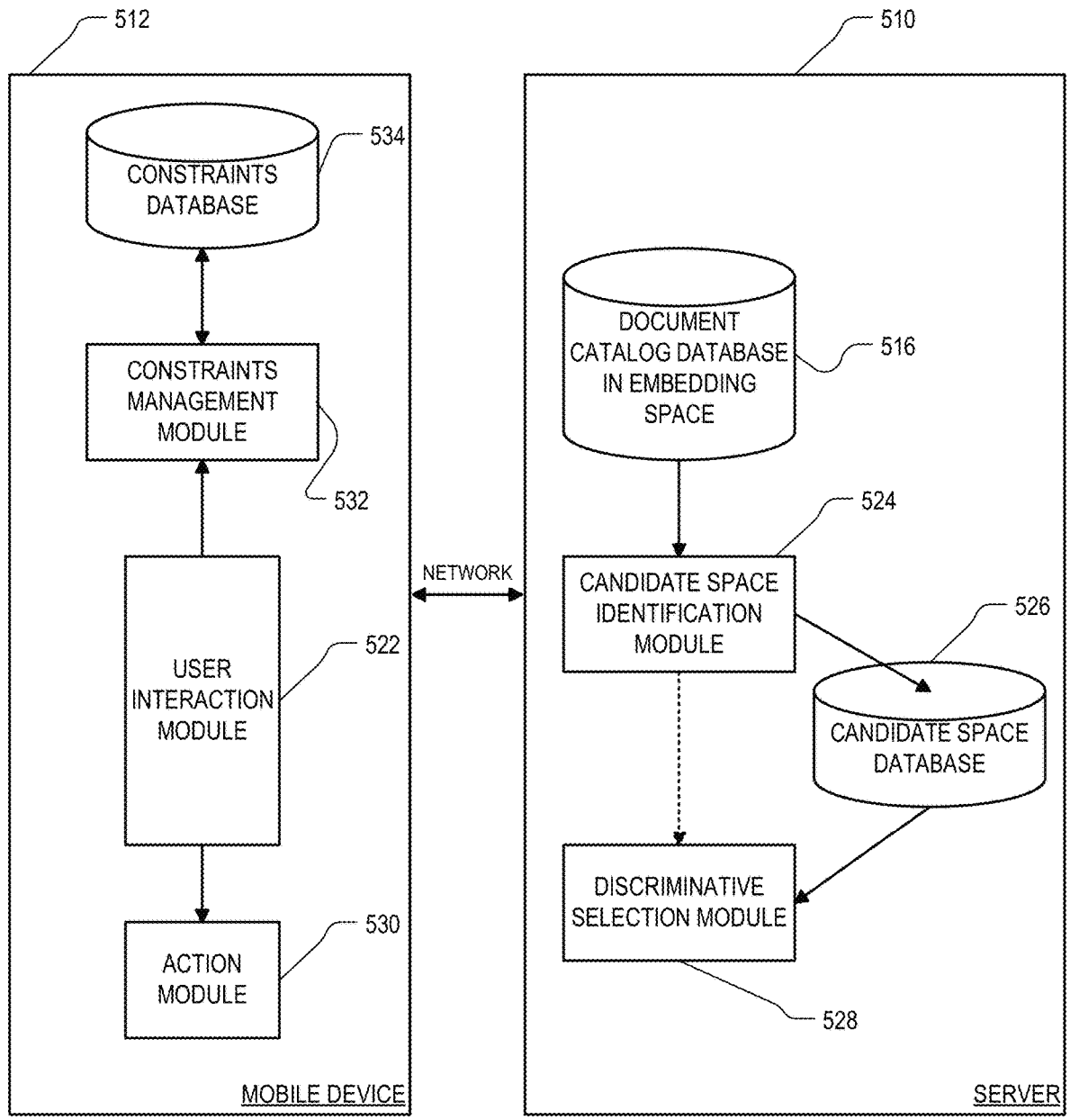
FIG. 5 is a block diagram of various components of a server and a mobile device for implementing the visual interactive search system according to an implementation of the present disclosure.
Figure 6:
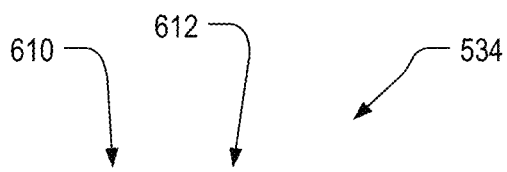
FIG. 6 illustrates contents of a constraints database of FIG. 5 according to an implementation of the present disclosure.
Figure 7:
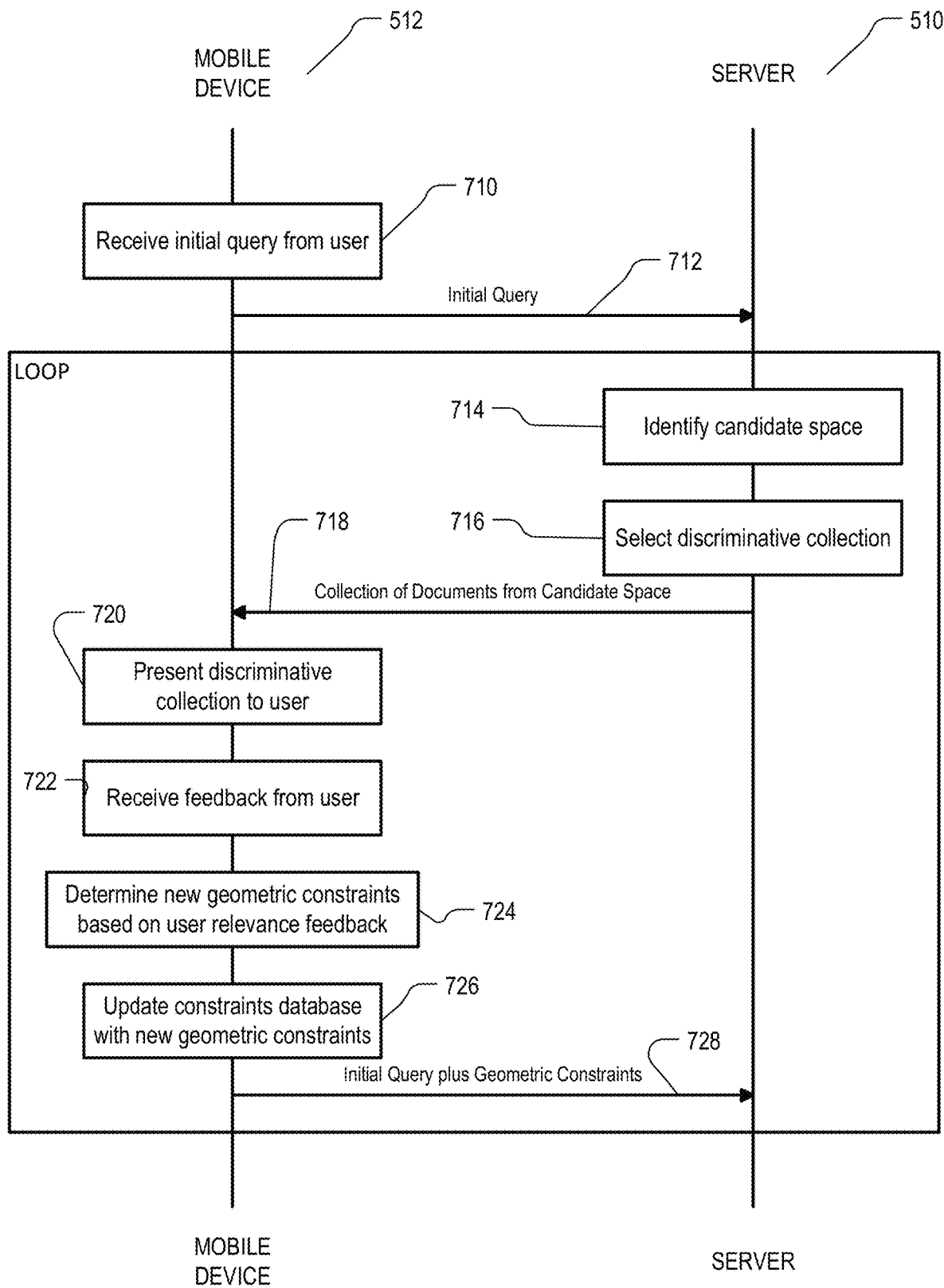
FIG. 7 is a diagram illustrating primary types of messages that pass between a mobile device and a server, as illustrated in FIG. 6, according to an implementation of the present disclosure
Figure 17:
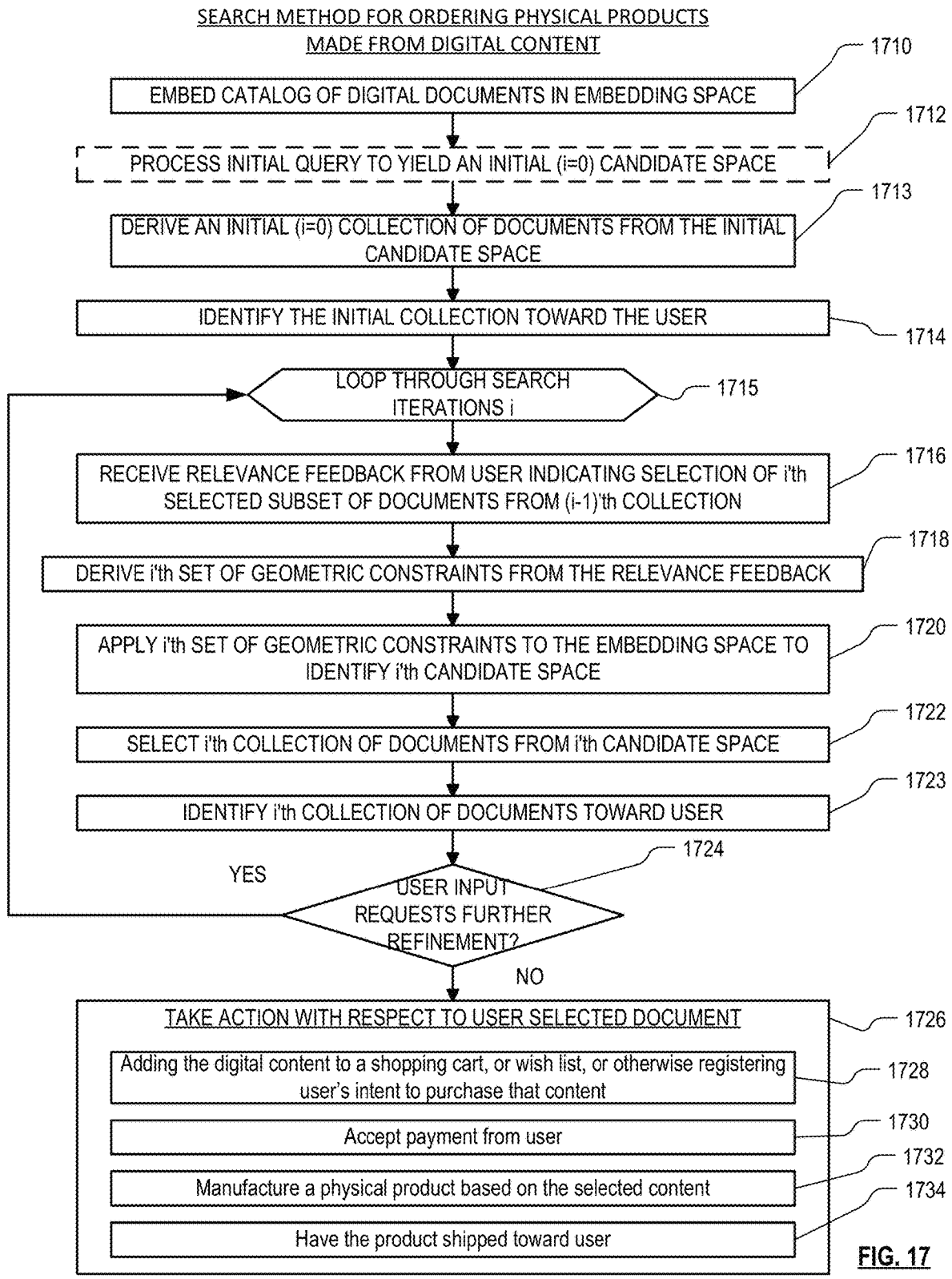
FIG. 17 is a flowchart expanding the various logic phases illustrated in FIG. 4 to implement an identification of digital product that can be used to produce a physical product according to an implementation of the present disclosure.
Figure 18:
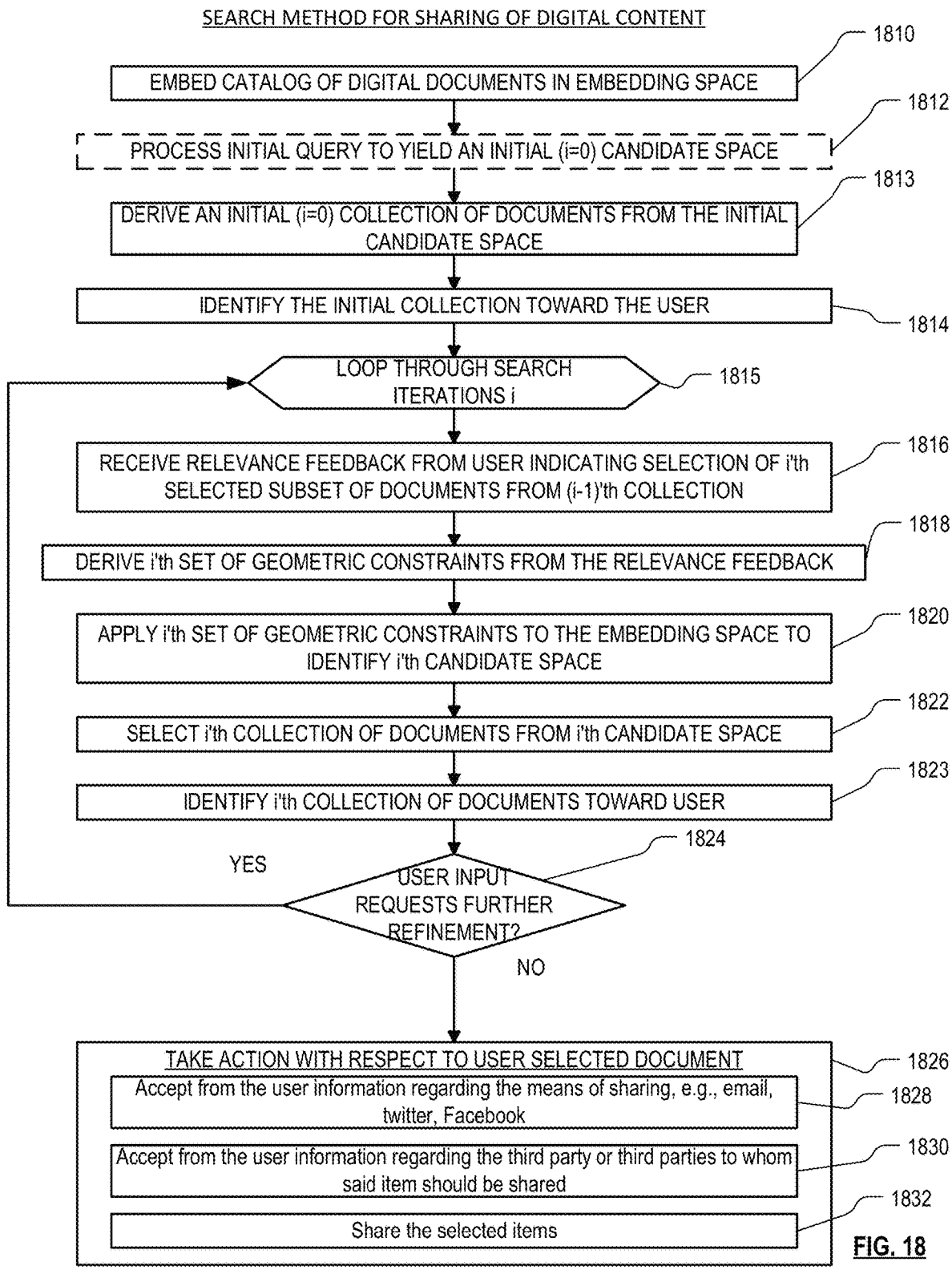
FIG. 18 is a flowchart expanding the various logic phases illustrated in FIG. 4 to implement an identification of content for sharing according to an implementation of the present disclosure.
Figure 19:
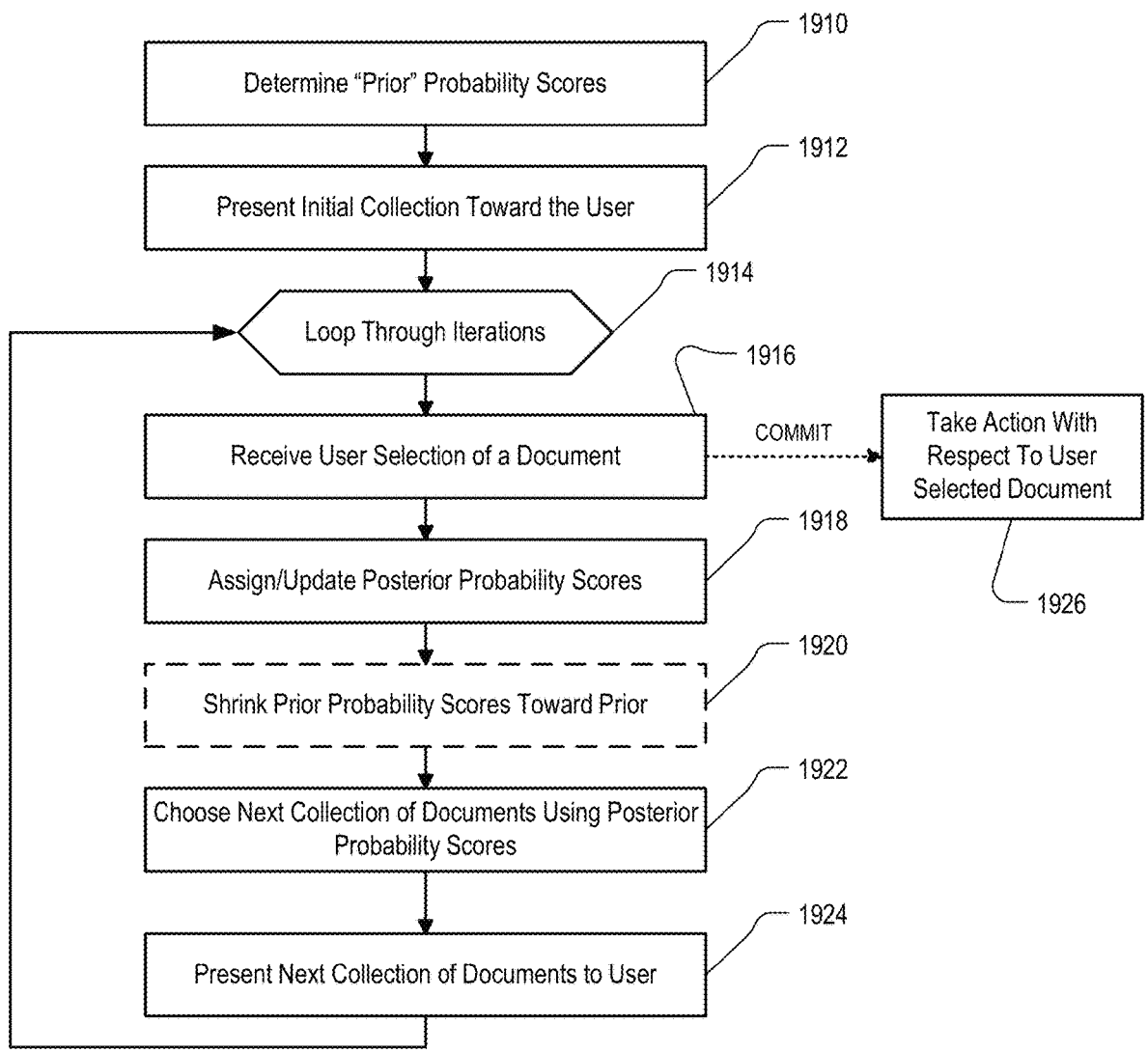
FIG. 19 is a flowchart illustrating Bayesian techniques for choosing and presenting collections of documents according to an implementation of the present disclosure.
Figure 24:
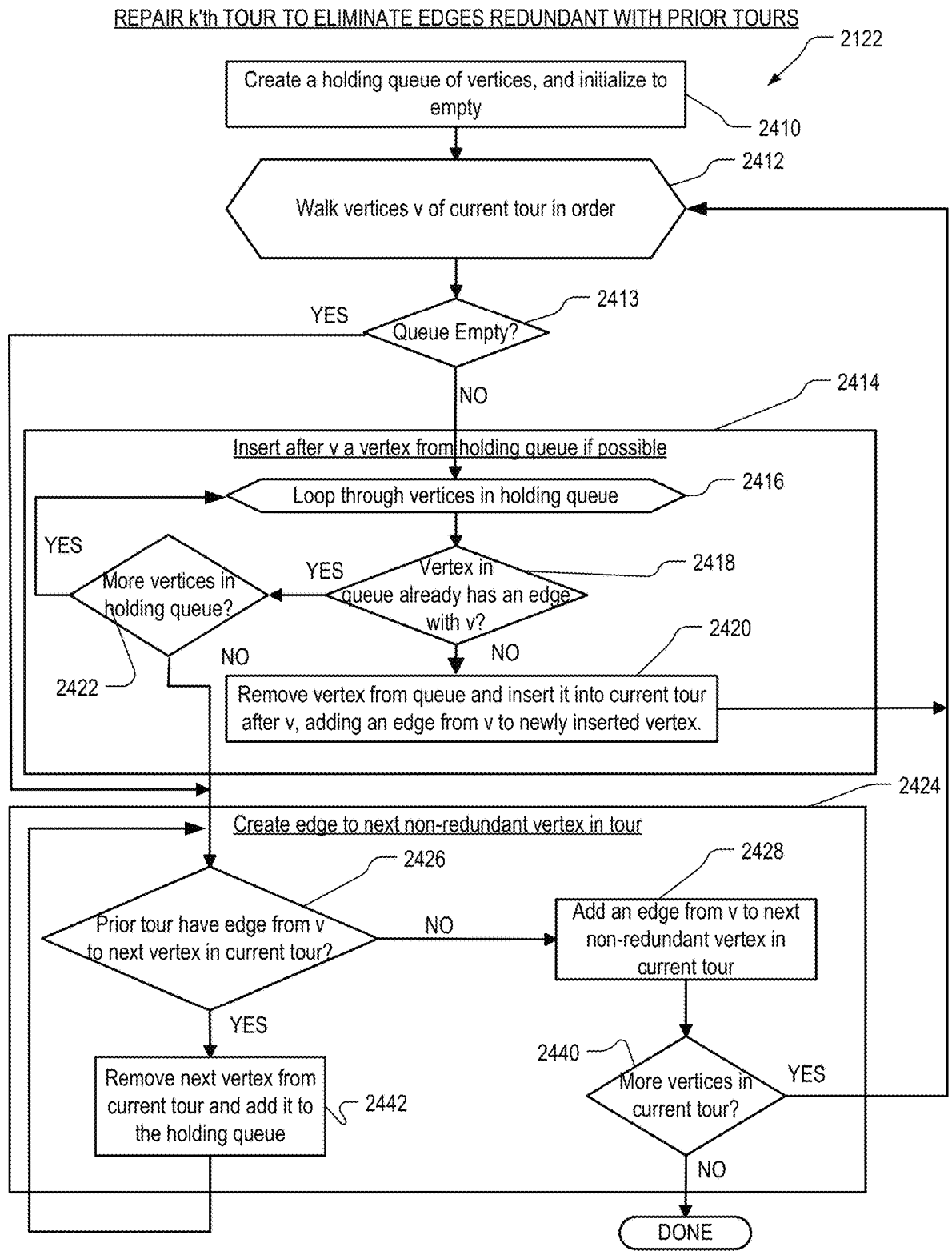
FIG. 24 is a flowchart illustrating a repairing of a k'th tour in a Neighbor Graph to eliminate edges that are redundant with prior tours in the Neighbor Graph according to an implementation of the present disclosure.
Figure 25:
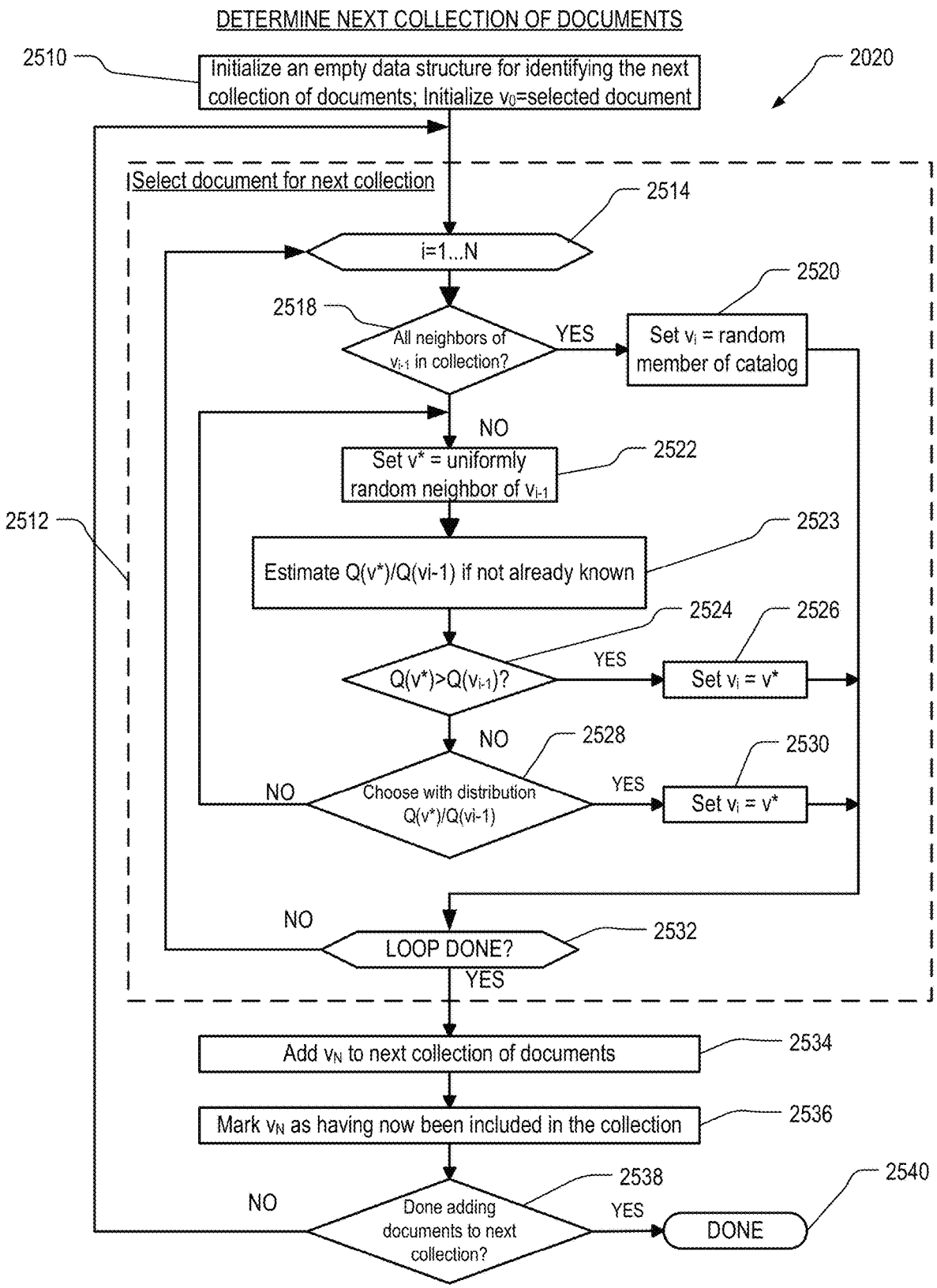
FIG. 25 is a flowchart illustrating a determination of a next collection of documents from a candidate list using Markov Chain Monte-Carlo to complete a walk through the Neighbor Graph according to an implementation of the present disclosure.
Figure 26:
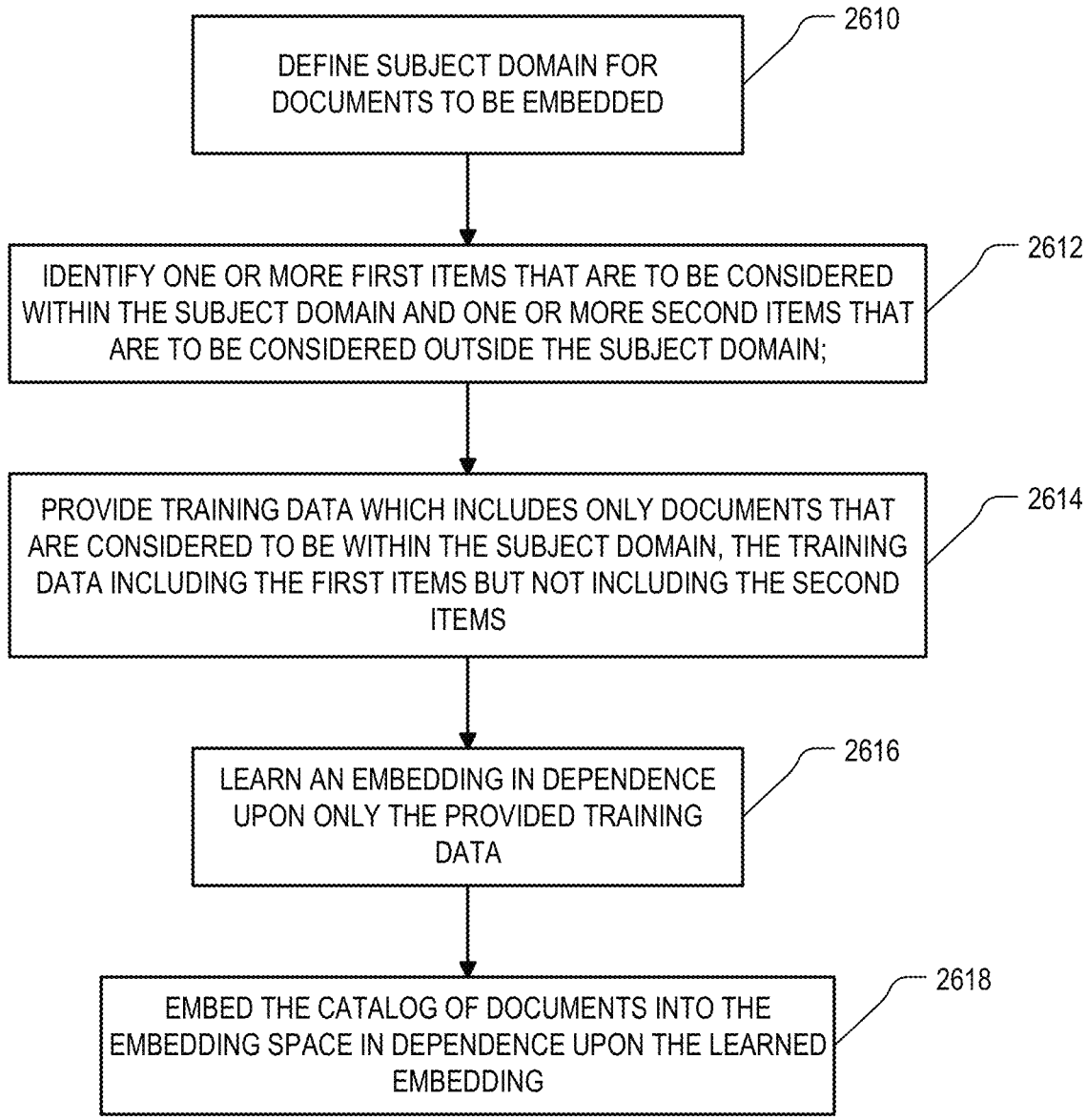
FIG. 26 is a flowchart illustrating various logic phases for learning distances for a subject domain, such as a catalog of documents of an embedding space according to an implementation of the present disclosure.
Figure 27:
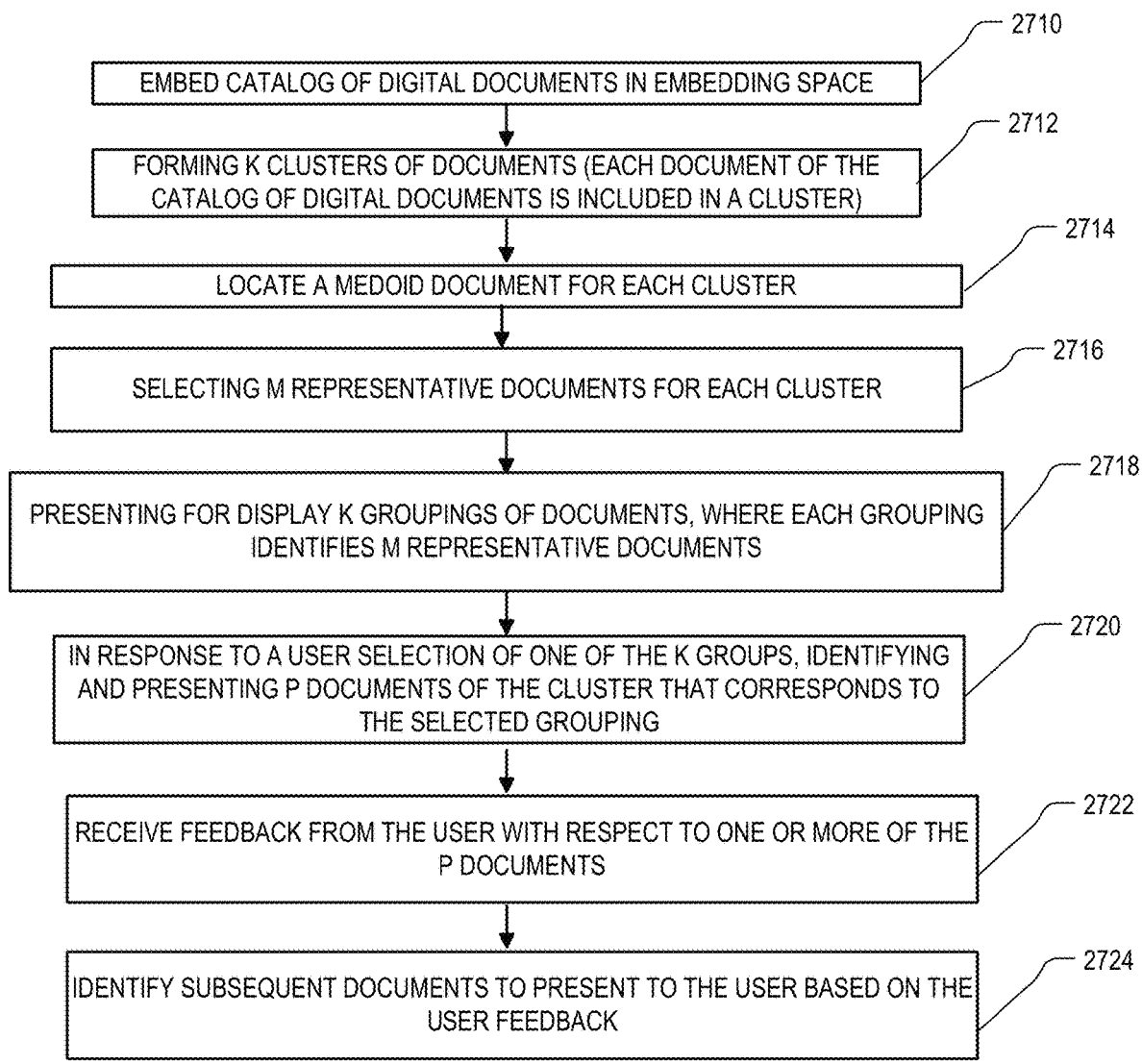
FIG. 27 is a flowchart illustrating various logic phases through which a visual interactive search system may proceed according to an implementation of the present disclosure.

Generally, FIGS. 1-4 illustrate an overall high-level architecture and process flow of a visual interactive search system, FIGS. 5-7 illustrate a mobile device and server implementation of a visual interactive search system, FIGS. 8-13B illustrate specific implementations of embedding documents in an embedding space, FIGS. 14-18 illustrate various implementations of the visual interactive search system for searching for physical and digital products, FIG. 19 illustrates an implementation of Bayesian techniques for identifying collections of documents, FIGS. 20-25 illustrate an implementation of scaled Bayesian techniques for identifying collections of documents, FIG. 26 illustrates a process for learning distances between documents in the embedding space, FIG. 27 illustrates an implementation that groups documents and a visualization of the groups of documents before identifying or presenting single documents to the user and FIGS. 29A-44E illustrate various graphical user interfaces that can be used to display documents and collect information from the user.

Overall Architecture and Process Flow of Visual Interactive Search System

In an implementation of the present disclosure, a system can have several aspects, and different implementation need not implement all of the following aspects: 1) a module for creating an initial query, 2) a module for obtaining a set of candidate results satisfying the initial query, 3) a module for determining the distance or similarity between candidate results or a module for embedding the candidate results in a vector space, 4) a module for sub-selecting a discriminating set of candidate results, 5) a module for arranging candidate results in 2 dimensions, 6) a module for obtaining user input with regard to the candidate results, 7) a module for refining the search query to incorporate information regarding the user input encoded as geometric or distance constraints with respect to the embedding or distance measures of 3, and 8) a module for iteratively obtaining a set of candidate results satisfying the initial query and the geometric or distance constraints accumulated from user input.

Figure 1:
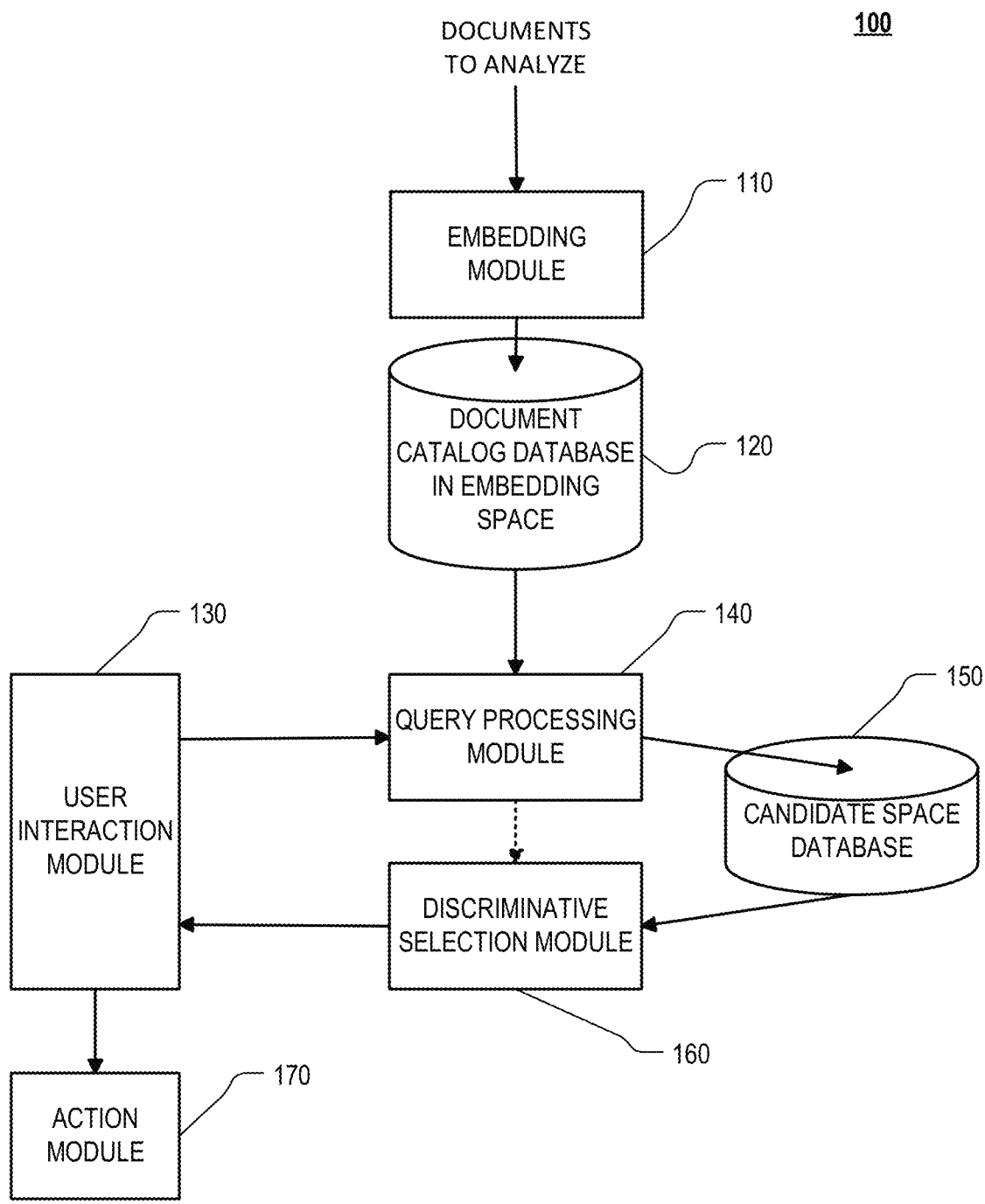
FIG. 1 is a block diagram of various components of a visual interactive search system according to an implementation of the present disclosure.

FIG. 1 is a block diagram of various components of an of a visual interactive search system according to an implementation of the present disclosure.

Referring to FIG. 1, a block diagram 100 of a visual interactive search system includes an embedding module 110 which calculates an embedding of source documents into an embedding space, and writes embedding information, in association with an identification of the documents, into a document catalog database (e.g., document catalog) 120. A user interaction module 130 receives queries and query refinement input (such as relevance feedback) from a user, and provides the received queries and query refinement input to a query processing module 140. In an implementation, the user interaction module 130 includes a computer terminal, whereas in another implementation the user interaction module 130 includes only certain network connection components through which the system communicates with an external computer terminal. The query processing module 140 interprets the queries as geometric constraints on the embedding space, and narrows or otherwise modifies a catalog of documents obtained from the embedding space to develop a set of candidate documents which satisfy the geometric constraints. These candidate documents are written into a candidate space database 150. Candidate spaces as used herein are also embedding spaces, and for example may constitute a portion of the embedding space of the document catalog database 120.

In some implementations, the query processing module 140 may also perform a re-embedding of the candidate documents in embedding space. A discriminative selection module 160 then selects a discriminative set of the documents from the candidate space database 150 and presents the discriminative set of the documents to the user via the user interaction module 130. The user interaction module 130 may then receive further refinement queries from the user, which are handled as above, or the user interaction module 130 may receive a user commit indication, in which case the system takes some action using an action module 170 with respect to the user's selected document. The action taken by the action module 170 could be opening a document for the user, engaging in further search refinement, processing the user's selected document as an order for a product represented by the document, processing the user's selected document as an order for delivery of a digital product represented by the document, processing the user's selected document as an order for a product represented by the document to be manufactured and shipped, or processing the user's selected document as a request for sharing with others digital content represented by the document.

In some implementations the user refinement input may not require a further geometric constraint on the candidate space database 150, but rather may involve only selection of a different discriminative set of documents from the existing candidate space database 150 for presentation to the user. Also, in various implementations, the candidate space database may not be implemented as a separate database, but rather may be combined in various ways with the document catalog database 120. The candidate space database 150 may also be implied rather than physical in some implementations.

Figure 2:
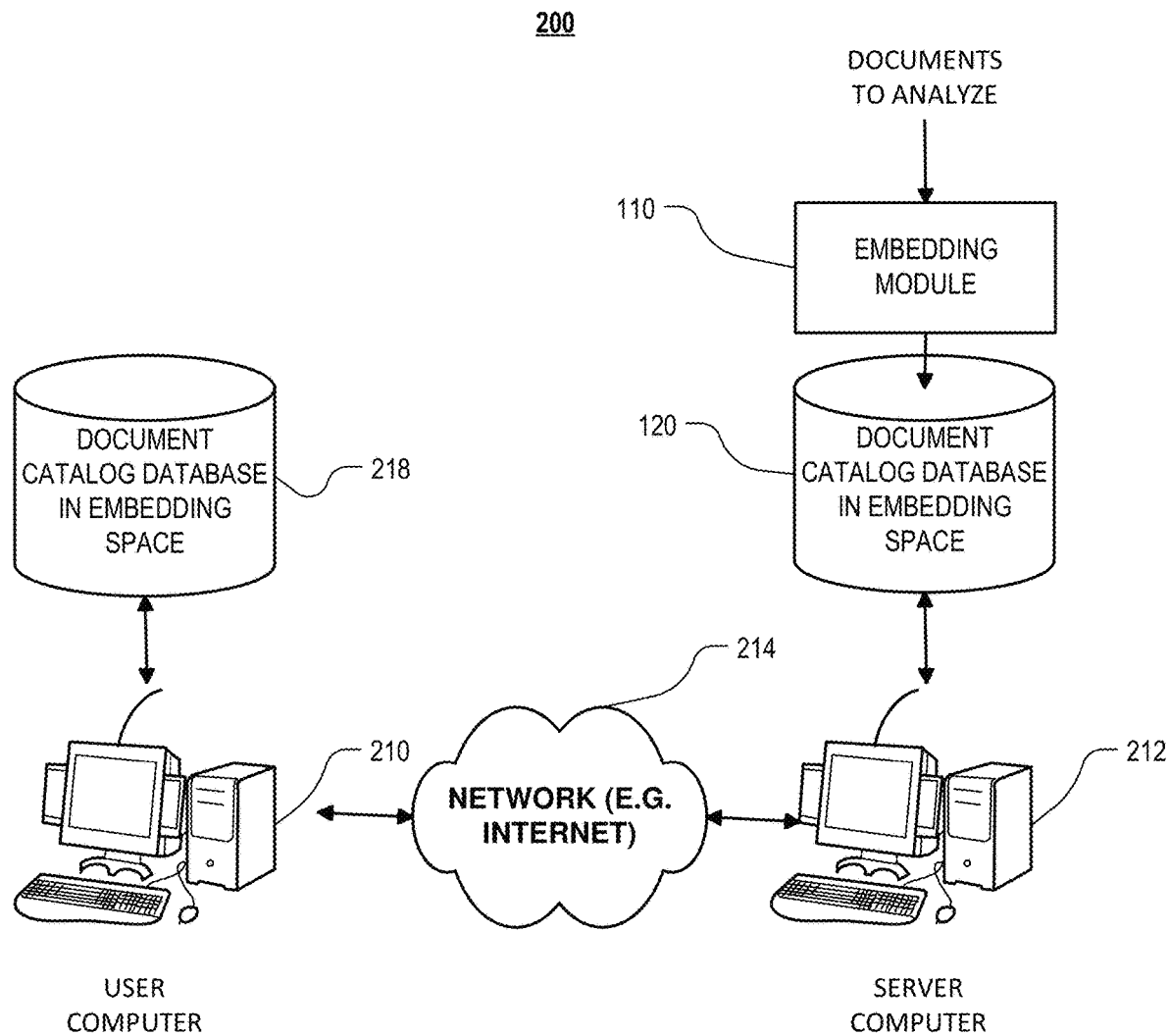
FIG. 2 illustrates a visual interactive search system according to an implementation of the present disclosure.

FIG. 2 illustrates a visual interactive search system according to an implementation of the present disclosure.

Referring to FIG. 2, a system 200 includes a user computer 210 and a server computer 212, connected to each other via a network 214 such as the Internet. The server computer 212 has accessibly thereto the document catalog database 120 (as also illustrated in FIG. 1) identifying documents in association with embedding information, such as relative distances and/or positions of the documents in a vector space. The user computer 210 also in various implementations may or may not have accessibly thereto a document catalog database 218 identifying the same information as identified in the document catalog database 120.

Initially, the embedding module 110 (as also illustrated in FIG. 1), which may for example be the server computer 212 or a separate computer system or a process running on such a computer, analyzes a catalog of documents to extract embedding information about the documents. For example, if the documents are photographs, the embedding module 110 may include a neural network and may use deep learning to derive embedding image information from the photographs.

Alternatively, the embedding module 110 may derive a library of image classifications (axes on which a given photograph may be placed), each in association with an algorithm for recognizing in a given photograph whether (or with what probability) the given photograph satisfies that classification. Then the embedding module 110 may apply its pre-developed library to a smaller set of newly provided photographs, such as the photos currently on the user computer 210, in order to determine embedding information applicable to each photograph. Either way, the embedding module 110 writes into the document catalog database 120 the identifications of the catalog of documents that the user may search, each in association with the corresponding embedding information.

In yet another implementation, the embedding information that the embedding module 110 writes into document catalog database 120 may be provided from an external source, or entered manually.

The iterative identification steps described above can be implemented in a number of different ways. In one implementation, all computation takes place on the server computer 212, as the user iteratively searches for a desired document. For example, the operations of the query processing module 140 and the discriminative selection module 160 may take place on the server computer 212. The user, operating the user computer 210, sees all results only by way of a browser. In this implementation, it is not necessary that the user computer 210 have the document catalog database 218 accessibly thereto. In another implementation, the server computer 212 transmits its entire document catalog database 120 or a subset of thereof to the user computer 210. The user computer 210 can write the document catalog database 120 or the subset thereof into its own document catalog database 218. All computation takes place on the user computer 210 in such an implementation, as the user iteratively searches for a desired document. Many other arrangements are possible as well.

FIG. 3 is a block diagram of a user computer and/or a server computer, as illustrated in FIG. 2, that can be used to implement software incorporating aspects of the visual interactive search system according to an implementation of the present disclosure.

The diagram of FIG. 3 may also generally represent any device discussed in the present disclosure and/or illustrated in any of the figures. When referring to the user computer 210 with reference to FIG. 3, the present disclosure may also be references the server computer 212 or any other type of computer and/or computer system disclosed herein. Further, any of the method, logic steps or modules for carrying out specified operations as discussed in the present disclosure or as illustrated in the figures may be carried out using the some or all of the components illustrated in FIG. 3.

The user computer 210 typically includes a processor subsystem 314 which communicates with a number of peripheral devices via a bus subsystem 312. These peripheral devices may include a storage subsystem 324, including a memory subsystem 326 and a file storage subsystem 328, user interface input devices 322, user interface output devices 320, and a network interface subsystem 316. The user interface input devices 322 and the user interface output devices 320 allow user interaction with the user computer 210. The network interface subsystem 316 provides an interface to outside networks, including an interface to a communication network 318, and is coupled via the communication network 318 to corresponding interface devices in other computer systems. The communication network 318 may comprise many interconnected computer systems and communication links These communication links may be wireline links, optical links, wireless links, or any other mechanisms for communication of information, but typically the communication network 318 is an internet protocol (IP)-based communication network. While in one implementation, the communication network 318 is the Internet, in other implementations, the communication network 318 may be any suitable computer network.

Physical hardware components of network interfaces (e.g., the network interface subsystem 316 and the communication network 318) are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

The user interface input devices 322 may include a keyboard, pointing devices such as a mouse, trackball, touchpad, or graphics tablet, a scanner, a touch screen incorporated into a display, audio input devices such as voice recognition systems, microphones, and other types of input devices. In general, use of the term "input device" is intended to include all possible types of devices and ways to input information into the user computer 210 or onto the communication network 318. It is by way of the user interface input devices 322 that the user provides queries and query refinements to the system.

The user interface output devices 320 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display via audio output devices. In general, use of the term "output device" is intended to include all possible types of devices and ways to output information from the user computer 210 to the user or to another machine or computer system. It is by way of the user interface output devices 320 that the system presents query result layouts toward the user.

The storage subsystem 324 stores the basic programming and data constructs that provide the functionality of certain implementations of the present disclosure. For example, the various software modules implementing the functionality of certain implementations of the present disclosure may be stored in the storage subsystem 324. These software modules are generally executed by the processor subsystem 314.

The memory subsystem 326 typically includes a number of memories including a main random-access memory (RAM) 330 for storage of instructions and data during program execution and a read only memory (ROM) 332 in which fixed instructions are stored. File storage subsystem 328 provides persistent storage for program and data files, and may include a hard disk drive, a floppy disk drive along with associated removable media, a CD ROM drive, an optical drive, or removable media cartridges. Databases and modules implementing the functionality of certain implementations of the present disclosure may have been provided on a computer readable medium such as one or more CD-ROMs, and may be stored by the file storage subsystem 328. The memory subsystem 326 contains, among other things, computer instructions which, when executed by the processor subsystem 314, cause the computer system to operate or perform functions as described herein. As used herein, processes and software that are said to run in or on "the host" or "the computer," execute on the processor subsystem 314 in response to computer instructions and data in the memory subsystem 326 including any other local or remote storage for such instructions and data.

The user computer 210 itself can be of varying types including a personal computer, a portable computer, a workstation, a computer terminal, a network computer, a television, a mainframe, a server farm, or any other data processing system or user device. In particular, it is envisaged that the user computer 210 may be a hand-held device such as a tablet computer or a smart-phone. In another implementation, a "system" performs all the operations described herein, and the "system" can be implemented as a single computer or multiple computers with any desired allocation of operations among the different member computers. Due to the ever-changing nature of computers and networks, the description of the user computer 210 depicted in FIG. 3 is intended only as a specific example for purposes of illustrating the preferred implementations of the present disclosure. Many other configurations of the user computer 210 are possible having more or less components than the user computer depicted in FIG. 3.

FIG. 4 is a flowchart illustrating various logic phases through which a visual interactive search system may proceed according to an implementation of the present disclosure.

Referring to FIG. 4, the various logic phases generally include (i) embedding documents, which requires a defining of distances and similarities between the digital documents and database organization of the embedded digital documents, (ii) an implementation of an initial query to identify an initial candidate space, (iii) selecting an initial collection of documents to present to the user, (iv) an identification of candidate results in dependence on user input, (v) obtaining a discriminative result set in dependence on the user input, (vi) presenting results to the user, and (vii) obtaining user input for further refinement.

Embedding of the Documents

Initially, in operation 410, a catalog of digital documents (e.g., images, text, web-pages, catalog entries, sections of documents, etc.) is embedded in an embedding space and stored in a database. Though this group of documents may be referred to herein as a "catalog," the use of that term is not intended to restricted the group to documents that might be found in the type of catalog that a retail store might provide. In the database, a distance is identified between each pair of the documents in the embedding space corresponding to a predetermined measure of dissimilarity between the pair of documents. Specific implementations of embedding documents are further illustrated in FIGS. 8-13B, discussed below.

The "embedding space," into which (digital) documents are embedded by the embedding module 110 (see FIGS. 1 and 2) as described in operation 410, can be a geometric space within which documents are represented. In one implementation the embedding space can be a vector space and in another implementation the embedding space can be a metric space. In a vector space, the features of a document define its "position" in the vector space relative to an origin. The position is typically represented as a vector from the origin to the document's position, and the space has a number of dimensions based on the number of coordinates in the vector. Vector spaces deal with vectors and the operations that may be performed on those vectors.

When the embedding space is a metric space, the embedding space does not have a concept of position, dimensions or an origin. Distances among documents in a metric space are maintained relative to each other, rather than relative to any particular origin, as in a vector space. Metric spaces deal with objects combined with a distance between those objects and the operations that may be performed on those objects.

For purposes of the present disclosure, these objects are significant in that many efficient algorithms exist that operate on vector spaces and metric spaces. For example metric trees may be used to rapidly identify objects that are "close" to each other. Objects can be embedded into vector spaces and/or metric spaces. In the context of a vector space this means that a function can be defined that maps objects to vectors in some vector space. In the context of a metric space it means that it is possible to define a metric (or distance) between those objects, which allows the set of all such objects to be treated as a metric space. Vector spaces allow the use of a variety of standard measures of distance (divergence) including the Euclidean distance. Other implementations can use other types of embedding spaces.

As used herein, "an embedding" is a map which maps documents into an embedding space. Typically an embedding is a function which takes, as inputs, a potentially large number of characteristics of the document to be embedded. For some embeddings, the mapping can be created and understood by a human, whereas for other embeddings the mapping can be very complex and non-intuitive. In many implementations the latter type of mapping is developed by a machine learning algorithm based on training examples, rather than being programmed explicitly.

In order to embed a document catalog in a vector space each document must be associated with a vector. A distance between two documents in such a space is then determined using standard measures of distance using vectors.

A goal of embedding documents in a vector space is to place intuitively similar documents close to each other. There are many ways to achieve this. For example a common way of embedding text documents is to use a bag-of-words model. The bag of words model maintains a dictionary. Each word in the dictionary is given an integer index, for example, the word aardvark may be given the index 1, and the word zebra may be given the index 60,000. Each document is processed by counting the number of occurrences of each dictionary word in that document. A vector is created where the value at the $i^{th}$ index is the count for the $i^{th}$ dictionary word. Variants of this representation normalize the counts in various ways. Such an embedding captures information about the content and therefor the meaning of the documents. Text documents with similar word distributions are close to each other in this embedded space.

There are many other possibilities by which documents may be embedded into a vector space. For example images may be processed to identify commonly occurring features using, e.g., scale invariant feature transforms (SIFT), which are then binned and used in a representation similar to the bag-of-words embedding described above. Further, embeddings can be created using deep neural networks, or other deep learning techniques. For example a neural network can learn an appropriate embedding by performing gradient descent against a measure of dimensionality reduction on a large set of training data. As another example, a kernel can be learned based on data and derive a distance based on that kernel. Likewise distances may be learned directly. These approaches generally use large neural networks to map documents, words, or images to high dimensional vectors (for example see: A brief introduction to kernel classifiers, Mark Johnson, Brown University 2009, cs.brown.edu/courses/cs195-5/fa112009/docs/lecture_10-27.pdf "Using Confidence Bounds for Exploitation-Exploration Trade-offs, incorporated herein by reference; and Kernel Method for General Pattern Analysis, Nello Cristianini, University of California, Davis, accessed October 2016, www.kernel-methods.net/tutorials/KMtalk.pdf).

In other implementations, an embedding can be learned using examples with algorithms such as Multi-Dimensional Scaling, or Stochastic Neighbor Embedding. An embedding into a vector space may also be defined implicitly via a Kernel. In this case the explicit vectors may never be generated or used, rather the operations in the vector space are carried out by performing Kernel operations in the original space.

Other types of embeddings of particular interest capture date and time information regarding the document, e.g., the date and time when a photograph was taken. In such cases a Kernel may be used that positions images closer if they were taken on the same day of the week in different weeks, or in the same month but different years. For example, photographs taken around Christmas may be considered similar even though they were taken in different years and so have a large absolute difference in their timestamps. In general, such Kernels may capture information beyond that available by simply looking at the difference between timestamps.

Similarly, embeddings capturing geographic information may be of interest. Such embeddings may consider geographic meta-data associated with documents, e.g., the geo-tag associated with a photograph. In these cases a Kernel or embedding may be used that captures more information than simply the difference in miles between two locations. For example, it may capture whether the photographs were taken in the same city, the same building, or the same country.

Often embeddings will consider documents in multiple ways. For example, a product may be embedded in terms of the meta-data associated with that product, the image of that product, and the textual content of reviews for that product. Such an embedding may be achieved by developing Kernels for each aspect of the document and combining those Kernels in some way, e.g., via a linear combination.

In many cases a very high dimensional space would be required to capture the intuitive relationships between documents. In some of these cases the required dimensionality may be reduced by choosing to embed the documents on a manifold (curved surface) in the space rather than to arbitrary locations.

Different embeddings may be appropriate on different subsets of the document catalog. For example, it may be most effective to re-embed the candidate result sets at each iteration of the search procedure. In this way the subset may be re-embedded to capture the most important axes of variation or of interest in that subset.

To embed a document catalog in a metric space requires associating that catalog with a distance (or metric).

Distances Between Digital Documents

A "distance" between two documents in an embedding space corresponds to a predetermined measurement (measure) of dissimilarity among documents. Preferably it is a monotonic function of the measurement of dissimilarity. Typically the distance equals the measurement of dissimilarity. Example distances include the Manhattan distance, the Euclidean distance, and the Hamming distance.

Given the distance (dissimilarity measure) between documents to be searched, or the embedding of those documents into a vector space, a metric space or a manifold there are a variety of data structures that may be used to index the document catalog and hence allow for rapid search. Such data structures include metric trees, kd-trees, R-trees, universal B-trees, X-trees, ball trees, locality sensitive hashes, and inverted indexes. The system can use a combination of such data structures to identify a next set of candidate results based on a refined query. An advantage of using geometric constraints is that they may be used with such efficient data structures to identify next results in time that is sub-linear in the size of the catalog.

There are a wide variety ways to measure the distance (or dissimilarity) between documents, and these may be combined to produce new measures of distance. An important concept is that the intuitive relationships between digital documents may be captured via such a similarity or distance measure. For example, some useful distance measures place images containing the same person in the same place close to each other. Likewise, some useful measures place documents discussing the same topic close to each other. Of course there are many axes along which digital documents may be intuitively related, so that the set of all documents close (with respect to that distance) to a given document may be quite diverse. For example, a historical text describing the relationship between Anthony and Cleopatra may be similar to other historical texts, texts about Egypt, texts about Rome, movies about Anthony and Cleopatra, and love stories. Each of these types of differences constitutes a different axis relative to the original historical text.

Such distances may be defined in a variety of ways. One typical way is via embeddings into a vector space. Other ways include encoding the similarity via a Kernel. By associating a set of documents with a distance we are effectively embedding those documents into a metric space. Documents that are intuitively similar will be close in this metric space while those that are intuitively dissimilar will be far apart. Note further that Kernels and distance functions may be learned. In fact, it may be useful to learn new distance functions on subsets of the documents at each iteration of the search procedure.

Note that wherever a distance is used to measure the dissimilarity between documents a Kernel may be used to measure the similarity between documents instead and vice-versa. In particular, in the sequel we will refer to the use of distances, e.g., in the definition of constraints. However, Kernels may be used directly instead without the need to transform them into distances.

Kernels and distances may be combined in a variety of ways. In this way multiple Kernels or distances may be leveraged. Each Kernel may capture different information about a document, e.g., one Kernel may capture visual information about a piece of jewelry, while another captures price, and another captures brand.

Also note that embeddings may be specific to a given domain, such as a given catalog of products or type of content. For example, it may be appropriate to learn or develop an embedding specific to men's shoes. Such an embedding would capture the similarity between men's shoes be would be uninformative with regard to men's shirts.

Database Organization

The databases used in an implementation of the present disclosure, such as databases 120 and 150 as illustrated in FIG. 1, may use commonly available means to store the data in, e.g., a relational database, a document store, a key value store, or other related technologies. In each case the original document contents (or pointers to them) may be stored and associated with their high dimensional representation, or a set of measures of distance relative to other documents.

In order to achieve scalable and fast search performance indexing structures are critical. When documents are embedded in a vector space indexes may be built using, e.g., kd-trees. When documents are associated with a distance metric and hence embedded in metric space metric trees may be used.

The databases described herein are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein.

Initial Query

Referring to FIG. 4, in operation 412 an initial query is optionally processed to yield an initial candidate space of documents satisfying the query results. The initial query may be a conventional text query, for example. The initial candidate space is within and optionally smaller than the full catalog of documents.

The initial query presented may be created and evaluated using a variety of standard techniques. For example, the initial query may be presented as a set of keywords entered via a keyboard or via speech, the initial query may be a natural language phrase, or sentence entered via a keyboard or via speech, or the initial query may be an audio signal, an image, a video, or a piece of text representing a prototype for which similar audio signals, images, videos, or text may be sought. A variety of means are known by which such an initial query may be efficiently evaluated, e.g., searching a relational database, or using an inverted index. The initial query may also be designed to simply return a random set of results or the initial query may be empty such that it imposes no constraints.

Other interfaces for initial queries allow for faceted search. A faceted search provides a means for users to constrain a search along a set of axes. For example, the faceted search might provide a slider that allows users to constrain the range of acceptable prices.

The search constraints created from the initial query (as well as subsequent user input) can be used to identify a set of candidate results. This may be achieved using a variety of means. For example, the initial query may be performed against a relational database whereby the results are then embedded in a vector or metric space. These results may then be indexed using, e.g., a kd-tree or a metric tree and searched to identify candidates that satisfy both the initial query and the constraints. Alternatively, the initial query may also be converted to geometric constraints that are applied to the set of embedded documents. For example, the geometric representation of the constraints implied both by the initial query and the user input are combined and an appropriate index is used to identify embedded documents satisfying both sets of constraints. Geometric constraints are discussed in more detail below with reference to operation 418.

Selection of Initial Collection of Documents

In operation 413 an initial collection of digital documents is derived from the initial candidate space. This initial collection of documents is a subset of the initial candidate space. As used herein, the term "subset" refers only to a "proper" subset. The initial candidate space is sometimes referred to herein as an "i=0" candidate space, for convenient description hereinafter of the iterative search process. Similarly, the initial collection of documents is sometimes referred to herein as an "i=0" collection. In one implementation the initial collection of documents is selected as a discriminative subset of the catalog, while in another implementation the initial collection of documents is not discriminative.

In operation 414, the initial collection of documents is identified toward the user. In one implementation this operation can include displaying a representation of the documents in the initial collection visibly to the user.

User Feedback, Geometric Constraints and Discriminative Result Set

At the beginning of the i'th iteration, in operation 416, the user provides relative and/or categorical feedback as to the documents in the (i−1)'th collection of documents. Preferably the relative feedback takes the form of user selection of a subset of the documents from the (i−1)'th collection, where selection of a document implies that the user considers that document to be more relevant to a search target than unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset. Relative feedback and categorical feedback both can be considered forms of "relevance feedback."

In operation 418, a set of geometric constraints is derived from the relative feedback, in a manner described elsewhere herein. The set of geometric constraints derived in the i'th iteration is referred to as the i'th set of geometric constraints.

In operation 420, the i'th set of geometric constraints is applied to the embedding space to form an i'th candidate space, and in operation 422 an i'th collection of candidate documents is selected as a subset of the documents in the i'th candidate space. In one implementation the i'th collection of documents is selected as a discriminative subset of the i'th candidate space, while in another implementation the i'th collection of documents is not discriminative.

As used herein, a "geometric constraint" applied to an embedding space is a constraint that is described formulaically in the embedding space, rather than only by cataloguing individual documents or document features to include or exclude. Preferably the geometric constraint is defined based on distance (or similarity) to at least two documents that the user has seen. For example, such a constraint might be expressed as, "all documents which are more similar to document A than to document B."

In a vector embedding space, for example, the constraint can be described in the form of a specified function which defines a hypersurface. Documents on one side of the hypersurface satisfy the constraint whereas documents on the other side do not. A hyperplane may be defined in terms of dot products or Kernels and requires that $k(x,z)>0$ for a fixed vector x and a candidate z. Likewise a conic constraint may require that $k(x,z)>c$ for some constant c. In a metric embedding space, the constraint can be described in the form of a function of, for example, distances between documents. Thus in a metric embedding space, a geometric constraint might take the form of 'all documents within a specified distance from document X', for example, or 'all documents whose distance to document A is less than its distance to document B'. In one implementation, a hyperplane defined for a metric space takes the form of an "m-hyperplane," which, as used herein, is defined by two points a and b in the metric space as follows:

An m-hyperplane specified by the points a and b partitions a metric space (X, d) into two sets A and B where:

$$A=\{x : x \text{ in } X \text{ such that } d(a,x)<=e*d(a,b)*d(b,x)+f*d(b,x)+h*d(a,b)+i\}$$

$$B=X \backslash A$$

Where e, f, g, h, and i are real valued constants which are not all equal to zero.

The geometric constraint is considered satisfied for only those documents which are located in a specified one of the partitions A or B of the metric space.

Geometric constraints also may be combined using set operations, e.g., union, intersection to define more complex geometric constraints. They also may be created by taking transformations of any of the example constraints discussed. For example, a polynomial function of distances, e.g., $d(x,z)*d(x,z)+d(y,z)<d(w,z)$ for given documents x, y, and w can be used, where only those documents z which satisfy the function are considered to satisfy the geometric constraint.

Kernels may be used independently of distances and constraints may be expressed directly in terms of Kernels, polynomials of Kernels, transformations of Kernels, or combinations of Kernels.

In an implementation, each iteration of a user search sequence identifies a new constraint, and the result set at that iteration is defined by the combined effect of all the constraints. For example if a constraint is represented as a hypersurface, where only those candidates on side A of the hypersurface are considered to satisfy the constraint, then the result set at a given iteration might be considered to be all those candidate documents which are within the intersection of the sides A of all the constraint hypersurfaces.

In various implementations, constraints (either as indicated by the user or as converted to geometric constraints) may be "hard" or "soft." Hard constraints are those which must be satisfied in the sense that solutions must satisfy the conditions of all hard constraints. Soft constraints are those which need not be satisfied but candidate solutions may be penalized for each soft constraint that they don't satisfy. Solutions may be rejected in a particular implementation if the accumulation of such penalties is too large. Constraints may be relaxed in some implementations, for example hard constraints may be converted to soft constraints by associating them with a penalty, and soft constraints may have their penalties reduced.

One way in which geometric constraints may be represented is to maintain a list of all unordered pairs of documents. Each entry in the list would be a pair (a,b), where a represents one document and b represents another document. The pair (b,a) may also appear in the list. Each entry is understood to mean that a candidate must be closer to the first element than to the second element in the pair. Thus, the two elements of the pair are sometimes referred to herein as "anchor documents." For example, given document c, the pair (a,b) would be associated with the constraint $d(a,c)<d(b,c)$. A real number can be associated with each pair. In the hard constraint case that number could be 0 or 1 with a 1 meaning that constraint must be satisfied and a 0 meaning that it does not need to be satisfied. Alternatively, in the soft constraint case the number could be any real number representing the penalty associated with breaking that constraint. This information could be maintained in other ways, e.g., using sparse representations. One alternative would be to maintain only those pairs associated with non-zero real numbers.

The goal of each set of geometric constraints derived in operation 418 from the user's relative feedback is to further narrow or modify the prior candidate space so as to form a new candidate space which better approaches the user's desired target. At each iteration, the information that the system has about the user's desired target is provided in the form of the user's relative feedback, which is provided in the form of a selection of documents. In general, therefore, each i'th set of geometric constraints identifies an i'th candidate space such that, according to some predefined definition of collective closeness, the documents in the i'th candidate space are collectively closer in the embedding space to the documents in the i'th selected subset, than are the documents in the (i−1)'th candidate space. This means that the predefined definition of collective closeness is defined such that, at a minimum, a candidate document X is considered closer to a document A than to a document B if in the embedding space, $d(A,X) < d(B,X)$.

For one implementation in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if the fraction of the documents in the given candidate space which are closer in the embedding space to the farthest document in the given selected subset than to the nearest document in the given non-selected subset, is greater than the fraction of the documents in the particular prior candidate space which are closer in the embedding space to the farthest document in the given selected subset than to the nearest document in the given non-selected subset.

For another implementation in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if the count, over all documents Y in the given candidate space and all pairs of documents (A,B), A in the i'th selected subset and B in the i'th non-selected subset, of instances in which $d(A,Y) < d(B,Y)$, is less than the count, over all documents X in the particular prior candidate space and all the pairs of documents (A,B), of instances in which $d(A,X) < d(B,X)$, each of the counts normalized for any difference between the total number of documents Y in the given candidate space and the total number of documents X in the particular prior candidate space.

For yet another implementation in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if the fraction of the documents Y in the given candidate space which are closer to the documents A in the i'th selected subset, averaged over all the documents A in the i'th selected subset, than they are to the documents B in the i'th non-selected subset, averaged over all the documents B in the i'th non-selected subset, is less than the fraction of the documents X in the particular prior candidate space which are closer to the documents A in the i'th selected subset, averaged over all the documents A in the i'th selected subset, than they are to the documents B in the i'th non-selected subset, averaged over all the documents B in the i'th non-selected subset. The term "an average," as used herein, includes both a mean and a median, and optionally includes weighting as well.

For still another implementation in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if an aggregation, over all documents Y in the given candidate space and all pairs of documents (A,B), A in the i'th selected subset and B in the i'th non-selected subset, of penalties associated with each instance in which $d(A,Y) > d(B,Y)$, is less than an aggregation, over all documents X in the particular prior candidate space and all the pairs of documents (A,B), of penalties associated with each instance in which $d(A,X) > d(B,X)$, where each instance in which $d(A,W) > d(B,W)$ is satisfied, for a given document W, is pre-associated with a respective penalty value. "Aggregation," or "aggregate," as used herein, includes sum, percentage, or other normalization, in which the further inclusion of an additional positive number does not decrease the total aggregate.

An advantage of working with geometric constraints is that, in an implementation, the memory and computational resources required to maintain and update the constraints depends on the number of constraints and not on the catalog size. This would, for example, allow constraint management to be performed and maintained on a mobile device such as a phone or tablet, rather than on a server.

Search queries may be ambiguous, or underspecified and so the documents satisfying a query may be quite diverse. For example, if the initial query is for a "red dress" the results may be quite varied in terms of their length, neckline, sleeves, etc. These operations of the present disclosure can be implemented to sub-select a discriminating set of results. Intuitively the objective is to provide a set of results to the user such that selection or de-selection of those results provides the most informative feedback or constraints to the search algorithm. These operations may be thought of as identifying an "informative" set of results, or a "diverse" set of results, or a "discriminating" set of results. The discriminative selection module 160, as illustrated in FIG. 1, may perform operation 418, to select a discriminative subset of results in any of a variety of ways.

In one implementation, a subset of the results may be discriminative as it provides a diversity of different kinds of feedback that the user can select. Diverse images may be selected as in, e.g., van Leuken, et al., "Visual Diversification of Image Search Results," in WWW '09 Proceedings of the 18th international conference on World wide web, pp. 341-350 (2009), incorporated by reference herein. This diverse set is selected in order to provide the user with a variety of ways in which to refine the query at the next iteration. There are a variety of ways in which such a set may be identified. For example, farthest first traversal may be performed which incrementally identifies the "most" diverse set of results. Farthest first traversal requires only a distance measure and does not require an embedding. Farthest first traversal may also be initialized with a set of results. Subsequent results are then the most different from that initial set.

Other means for selecting discriminative subsets of candidate results include using algorithms such as principal component analysis (PCA) or Kernel PCA to identify the key axes of variation in the complete set of results. The discriminative subset is then constructed to contain documents that lie at multiple points along those most discriminating axes.

Another means for selecting discriminative subsets of candidate results might use a clustering algorithm to select discriminative subsets of candidate results. Such a mechanism may use a clustering algorithm such as k-means, or k-medoids to identify clusters of similar documents within the candidate results. See http://en.wikipedia.org/wiki/K-means_clustering (visited 29 Apr. 2015) and en.wikipedia.org/wiki/K-medoids (visited 29 Apr. 2015), both incorporated by reference herein. One or more representative documents would then be selected from each cluster to yield the discriminative subset. In particular, when k-medoids is used the medoid of each cluster may be used as one of the representatives for that cluster.

Still another means might consider the set of constraints that would result from the user selecting or deselecting a given document. This set of constraints may be considered in terms of the candidate results it would yield. A discriminative subset may be selected so that the sets of candidate results produced by selecting any of the documents in that discriminative subset are as different as possible.

As used herein, "discriminativeness" of a particular set of documents in a group of documents is the least number of documents in the group that are excluded as a result of user selection of any document in the set. That is, if user selection of different documents in the particular set results in excluding different numbers of documents in the group, then the set's "discriminativeness" is considered herein to be the least of those numbers. Note that either the discriminative set of documents, or the formula by which user selection of a document determines which documents are to be excluded, or both, should be chosen such that the union of the set of documents excluded by selecting any of the documents in a discriminative set equals the entire group of documents.

Also as used herein, the "average discriminativeness" of a set of size n documents in a group of documents, is the average, over all sets of size n documents in the group of documents, of the discriminativeness of that set. Also as used herein, one particular set of documents can be "more discriminative" than another set of documents if the discriminativeness of the first set is greater than the discriminativeness of the second set.

Preferably the selection module 160, when performing operation 418, selects a set of N1>1 documents from the current candidate space database 150, which is more discriminative than the average discriminativeness of sets of size N1 documents in the candidate space. Even more preferably, selection module 160, when performing operation 418 selects a set which is at least as discriminative as 90% of, or in some implementations all of, other sets of size N1 documents in the current candidate space.

Not all implementations necessarily need to perform operation 418 of selecting a discriminative subset of candidates. In some implementations it is sufficient for the user interaction module 130 to present toward the user a subset of documents that are chosen randomly from the candidate set, or that are chosen in some other way. In such an implementation the discriminative selection module 160 is replaced with simply a selection module.

The selected subset may be chosen to balance discriminativeness with satisfying soft constraints. For example, if soft constraints are used then each document becomes associated with a penalty for each constraint it breaks. The selected subset may be chosen to trade-off the total penalties for all candidates in the selected subset, with the discriminativeness of that subset. In particular, the document with the smallest penalty may be preferentially included in the selected subset even if it reduces the discriminativeness.

In some cases, see below, constraints may be managed and updated using a machine learning algorithm. In particular, this may include active learning algorithms, or bandit algorithms. These algorithms identify "informative" (or discriminative) examples at each iteration. When these algorithms are used to manage constraints, their identification of informative examples may be used as the discriminative subset, or as the basis for determining the discriminative subset. Bandit algorithms are of particular interest as they seek to trade-off maximizing reward (i.e., finding the target document), with identifying discriminative examples.

Any of the above techniques for selecting a discriminative subset may also be used in the selection of an initial collection of candidate documents to be presented toward the user, either before or after the initial query Presenting Results to the User In operation 423 the i'th collection of documents (e.g., the results of operations 418 and 420) is presented toward the user for optional further refinement. These results may be identified as discriminative results, which are presented to the user.

In an implementation, an aim of the discriminative results presentation to the user in operation 420, by the user interaction module 130, is to provide the user with a framework in which to refine the query constraints.

For example the results may be presented as a two-dimensional grid. Results should be placed on that grid in a way that allows the user to appreciate the underlying distances between those results (as defined using a distance measure or embedding). One way to do this would be to ensure that results that are far from each other with respect to the distance measure are also displayed far from each other on the grid. Another way would be to project the embedding space onto two dimensions for example using multidimensional scaling (MDS) (for example see: Jing Yang, et al., "Semantic Image Browser: Bridging Information Visualization with Automated Intelligent Image Analysis," Proc. IEEE Symposium on Visual Analytics Science and Technology (2006), incorporated herein by reference). Yet another way would be to sub-select axes in the embedding space and position results along those axes.

Other layouts contemplated include 2 dimensional organizations not on a grid (possibly including overlapping results), 3 dimensional organizations analogous to the 2-dimensional organizations. Multi-dimensional organizations analogous to the 2 and 3 dimensional organizations with the ability to rotate around one or more axes. In general an M-dimensional layout can be used, where M>1. In implementations in which the embedding space has dimensions, the number of dimensions in the presentation layout need not be the same as the number of dimensions in the embedding space. Yet other layouts include hierarchical organizations or graph-based layouts.

The document placement in the layout space should be indicative of the relationship among the documents in embedding space. For example, the distance between documents in layout space should correspond (monotonically, if not linearly) with the distance between the same documents in embedding space. Also, if three documents are collinear in embedding space, advantageously they are placed collinearly in layout space as well. In particular, collinearity in layout space with a candidate document which the system identifies as the most likely target of the user's query (referred to herein as the primary candidate document) indicates collinearity in the embedding space with the primary candidate document.

It will be appreciated, however, that the embedding space typically has a very large number of dimensions, and in high dimensional spaces very few points are actually collinear. In an implementation, therefore, documents presented collinearly in layout space indicate only "substantial" collinearity in the embedding space. If the embedding space is such that each document has a position in the space (as for a vector space), then three documents are considered "substantially collinear" in embedding space if the largest angle of the triangle formed by the three documents in embedding space is greater than 160 degrees. If the embedding space is such that documents do not have a position in the embedding space, but they do have distances from each other (such as for a metric space), then as used herein, a group of three documents are considered collinear if the sum of the two smallest distances between pairs of the documents in the group in embedding space equals the largest distance between pairs of the documents in the group in embedding space. The three documents are considered "substantially collinear" if the sum of the two smallest distances exceeds the largest distance by no more than 10%. As used herein, "collinearity" and "substantial collinearity" do not include the trivial cases of coincidence or substantial coincidence.

User Input and Further Refinement of Query

In operation 424, a determination is made as to whether the user requests further refinement. If the user is satisfied with one of the candidate results (NO in operation 424), then the user essentially indicates to commit to that result and then in operation 426 the system takes action with respect to the user-selected document. If the user input indicates further refinement (YES in operation 424), then the logic returns to operation 415 for the next iteration of the search loop.

The user interaction module 130, as illustrated in FIG. 1, provides the user with a user interface (UI) which allows the user to provide input in a variety of ways. This UI can provide interactions with the user in operation 424, as well as operation 416 or any other operation that can benefit from the interaction of the user. The user may click on a single result to select it, or may swipe in the direction of a single result to de-select it. Similarly, the user may select or deselect multiple results at a time. For example, this may be done using a toggle selector on each result. The user might also implicitly select a set of results by swiping in the direction of a result indicating a desire for results that are more like that result "in that direction." In this case "in that direction" means that the differences between the primary result and the result being swiped should be magnified. That is, the next set of results should be more like the result being swiped and less like the "primary result." This concept may be generalized by allowing the user to swipe "from" one result "to" another result. In this case new results should be more like the "to" result and less like the "from" result.

Additionally, the UI can provide the user with the ability (e.g., via a double-click, or a pinch) to specify that the next set of results should be more like a specific result than any of the other results displayed. That is, the user selects one of the displayed results to indicate that that result is preferred over all other displayed results. This may then be encoded as a set of constraints indicating for each non-selected document that future candidates should be closer (in the embedding space) to the selected document than to that non-selected document. This form of feedback, in which the user selects documents to indicate they are "more relevant" than the non-selected documents to the user's desired goal, is sometimes referred to herein as "relative feedback." It is distinct from more traditional "categorical feedback," in which users are required to select candidates that are and are not relevant. However, in many cases relevant documents are so rare that there may be no such documents available for the user to select. Conversely, implementations of the system herein allow relative feedback where the user identifies more relevant candidates that may not actually be strictly relevant to the target, but still provide significant information to guide further searching. Relative feedback and categorical feedback both can be considered forms of "relevance feedback."

One way to encode relative feedback is as a set of geometric constraints on the embedding space. For each non-selected image B a constraint is created of the form $d(A,C)<d(B,C)$ where A is the selected image and C is the candidate image to which the constraint is applied (d is the distance in the embedding space). A candidate C then satisfies the constraint only if it satisfies $d(A,C)<d(B,C)$. In this way a single click generates multiple constraints. These constraints may be combined, e.g., such that the combined constraint is their intersection, and further candidate documents can be given a rank which is a monotonic function of the number of individual ones of the constraints that the candidate breaks (with smaller rank indicating greater similarity to the user's target).

Alternatively, the constraints may be used as soft constraints by associating each such constraint with a penalty. In this alternative further candidate documents can be given a rank which is a monotonic function of the sum total of the penalties associated with all of the individual constraints that the candidate breaks. In still further implementations the rank may be made dependent upon the age of a constraint (how early in the iterative search the constraint was imposed). This may be accomplished in one implementations by determining (or modifying) a penalty associated with each given constraint in dependence upon the iteration number in which the given constraint was first imposed. In one implementation the penalty may be designed to increase with the age of the constraint, whereas in another implementation the penalty may be designed to decrease with the age of the constraint.

This approach may be extended to allow the user to select multiple images that are more relevant. This feedback may be interpreted such that each of the selected images is more relevant than each of the non-selected images. In an implementation, the system might then create a different constraint corresponding to each pair of one selected document and one non-selected document. A total of P*Q constraints are created, where P is the number of selected documents and Q is the number of non-selected documents. The constraints may be of the form $d(A_i,C)<d(B_j,C)$, $i=1 \ldots P$ and $j=1 \ldots Q$.

The UI could provide the inverse ability, i.e., it may allow the user to select less relevant rather than more relevant images and the above description would be modified appropriately.

The UI can also provide the ability to specify that the next set of results should be like a particular selection but more diverse than the currently selected set of results.

Furthermore, the UI can provide the user with the ability to remove previously added constraints. In one implementation, a stack (or history) of constraints is maintained. The UI provides the user with the ability to remove constraints from the stack and hence remove constraints that were previously added. Even more particularly, when each piece of user feedback is provided as a single preferred image, i.e., the selected image is preferred over the non-selected images, the UI may display the sequence of selected images and allow the user to remove a single (previously selected image) and its associated constraints, or may allow the user to go back to a previous state by sequentially removing images (and their associated constraints) from the stack. This may be achieved with a "back button," or by displaying the stack on the user interface.

The UI may also provide the ability for the user to specify that a different set of similarly diverse images be provided. Further, the UI may also provide the ability for the user to provide multiple different kinds of feedback.

The system then incorporates the user's input to create a refined query, such as in operation 424, which loops back to operation 416. The refined query includes information regarding the initial query and information derived from the iterative sequence of refinements made by the user so far. This refined query may be represented as a set of geometric constraints that focus subsequent results within a region of the embedding space. Likewise, it may be represented as a set of distance constraints whose intersection defines the refined candidate set of results. It may also be represented as a path through the set of all possible results.

For example, the refined query may include constraints that require subsequent results to be within a specified distance of one of the selected candidate results. Or the refined query may include constraints that require subsequent results to be closer (with respect to the distance measure) to one candidate result than to another. These constraints are combined with the previously identified constraints in a variety of ways. For example, candidates may be required to satisfy all of these constraints, or may be required to satisfy a certain number of all constraints, or, in the case of soft constraints, they may be charged a penalty for each constraint they break.

Another way to manage constraints and refine the query is to use a machine learning algorithm, see below. Further, users may specify incompatible constraints. A system according to the present disclosure may have the ability to relax, tighten, remove, or modify constraints that it determines are inappropriate.

One way in which constraints may be relaxed or removed is with user feedback. In particular, the UI may provide a means for the user to remove previously added constraints, or to remove constraints from a history, i.e., to "go back."

Another way in which the system might relax or tighten constraints is in the context of soft constraints. In particular, if the geometric constraints are treated as soft constraints, i.e., a penalty is charged for each broken constraint, then these penalties may be different for each constraint. Specifically, older constraints may have smaller or larger penalties than newer constraints. Here newer constraints are those which were added in recent iterations, while older constraints are those which were added in earlier iterations. Wherever soft constraints are implemented with penalties, the candidate results may then be documents that have smaller total penalties summed over all such constraints. The candidate result set is then all documents whose total penalty is less than some predetermined value, or only the N documents having the smallest total penalty, where N is a predefined integer.

The geometric constraints may be updated and maintained using the machine learning algorithm, as mentioned above. In such implementations, the user's feedback is treated as training data to which the machine learning algorithm is applied, and the result of that application yields a model (also sometimes referred to herein as a hypothesis) of the user's desired target, that may in some cases be a geometric constraint. However, the resulting constraint is typically not expressed directly in terms of the user's feedback. That is, the resulting model does not explicitly test for the distances between candidate documents and documents for which the user has provided feedback, rather this relationship is indirect or implicit.

While many machine learning algorithms learn to classify documents into two or more classes, e.g., relevant or not relevant, some algorithms rank order documents according to their relevance. Examples of such algorithms include RankBoost (Freund, et al., "An Efficient Boosting Algorithm for Combining Preferences," Journal of Machine Learning Research 4 (2003) 37 pages), or the Ranking Perceptron (Collins, et al., "Convolution Kernels for Natural Language," in Advances in Neural Information Processing Systems, pp. 625-632 (2001)), both incorporated by reference herein. Such algorithms use feedback or training examples where only ordering information is provided. Specifically, they make use of training data where documents (examples) are not classified as relevant or irrelevant, but rather are rank ordered with respect to their relative relevance.

When viewed in the context of FIG. 4, rank order learning algorithms sometimes refer to the geometric constraints developed in operation 414 as a "hypothesis" or "model." Thus in the case of rank order learning algorithms, the development of geometric constraints in operation 414 involves training or updating the current hypothesis or model based on the user feedback combined with the feedback from previous iterations. The subset of candidates presented toward the user in operations 420-423 typically would be some limited number of the highest-ranking documents based on the current hypothesis. This would not necessarily be a "discriminative" subset. However, some learning algorithms also naturally identify informative or discriminative documents as part of their process of hypothesis development. These are typically documents that when labeled as relevant or irrelevant and added to the training set will most improve the model. For these kinds of learning algorithms, operation 418 may select a discriminative subset merely involves selecting the documents already identified naturally in operation 416, and the subset of candidates presented toward the user in operation 423 is indeed discriminative.

One approach to the use of machine learning algorithms to update and maintain geometric constraints is to use a classification algorithms such as Support Vector Machines (e.g. Tong, et al., "Support Vector Machine Active Learning for Image Retrieval," In Proceedings of the ACM International Conference on Multimedia, 12 pages, ACM Press, 2001, incorporated by reference herein; or Tieu et al., "Boosting Image Retrieval," International Journal of Computer Vision 56(1/2), pp. 17-36, 2004, Accepted Jul. 16, 2003, incorporated by reference herein). Support Vector Machines maintain a single hyperplane in the embedding space. Variants of Support Vector Machines may use active learning not only to identify new constraints at each iteration, but also to select an informative set of candidate documents at each iteration.

Alternatively a so-called "online learning algorithm" may be implemented (en.wikipedia.org/wiki/Online_machine_learning, visited 29 Apr. 2015) or a so-called "multi-armed bandit" learning algorithm (en.wikipedia.org/wiki/Multi-armed_bandit, visited 29 Apr. 2015), either of which can be used to accomplish the same result. Both these documents are incorporated by reference herein.

Online learning algorithms, as the term is used herein, maintain a model or hypothesis that is incrementally updated based on training data. That is, these algorithms do not require access to the complete set of training data, or in the present context the complete set of user feedback. When new training data is presented, these algorithms can update their model or hypothesis without having to re-train the system with previously seen training data. Rather these algorithms maintain a model or hypothesis that is updated incrementally based only on the most recent set of feedback. Because of this they can require substantially less memory and/or computational resources, allowing them, for example, to be performed on a mobile device. In the context of the present description the hypothesis may be used to represent the geometric constraints. For example, it may represent a hyperplane in the embedding space, or it may represent a weighted combination of items in a catalog where items with larger weight are understood to be closer to the target item. Users' feedback is interpreted as the training data that the online learning algorithm uses to learn from. That is, the online learning algorithm updates its hypothesis (geometric constraints) based on this feedback.

In one implementation, the online learning algorithm uses the "Prediction with Expert Advice" framework (Cesa-Bianchi et al., Prediction, Learning, and Games, Cambridge University Press, 2006, incorporated by reference herein). In this case each catalog item (document) is interpreted as an expert and assigned a weight. Initially, these weights are all the same. Each catalog item when combined with the associated distance can be understood to provide an ordering of the catalog. Specifically, for a catalog item A, all other items in the catalog, X for example, may be assigned a number corresponding their distance, e.g., d(A, X). The items in the catalog may then be sorted using that number, i.e., d(A, X). For a set of candidates each expert corresponding to a catalog item, e.g., A, recommends the selection of the item, e.g., X, it ranks highest in that set, i.e., the item for which d(A, X) is smallest. The weight of each expert is then increased or decreased depending on whether the user selected that expert's highest ranked item. Proceeding iteratively the item the user is searching for will be correct (i.e., recommend the correct item from the candidate set) more often than any other item and so will obtain the largest weight. Many variations on this general approach are possible. Generally online learning algorithms do not also provide a natural means to yield a discriminative subset. However, they may be combined with a variety of other means to do so including means based on PCA, clustering, or any other means by which a highly discriminative subset can be chosen including brute force search methods.

Multi-armed bandit algorithms are closely related to the "Prediction with Expert Advice" framework. Similarly to online learning algorithms these algorithms maintain a hypothesis that is incrementally updated based on user feedback. Rather than maintain the complete set of user feedback they update their hypothesis based only on the most recent feedback. Again, this means that these algorithms may require fewer computational resources and may therefore be performed on a mobile device. This would allow the constraints to be managed on the mobile device rather than on a separate server. These algorithms likewise maintain a set of experts (referred to as "arms") and seek to identify a good one. The key distinction (in the present setting) is that at each round these algorithms select one or more "arms" (or experts) to play. In the present context "play" means present to the user. Arms are selected so as to balance two goals: play good arms, and learn which arms are good. The user feedback is then interpreted as reward to the selected arms, e.g., if the user clicks on one of the arms that may translate to high reward.

One way such an algorithm may be adapted to maintain and update the geometric constraints, and to select a subset of candidates is described below. Clearly, other adaptations may also be effective. Again each item (document) in the catalog is associated with an arm (expert). Each arm is associated with an estimate of its reward (i.e., its suitability as the solution to the query) and a confidence interval (certainty value) for that estimate. Initially, all of the reward estimates are equal and all of the certainties are identical. At each iteration of the search procedure one or more arms are selected as the "discriminative set" and presented to the user. The user clicks on one of the candidates and the corresponding arm is provided with high reward. The other candidates are provided with low reward. The corresponding reward estimates are updated. The certainty of each of the arms in the candidate set is increased as more data has been collected to estimate its reward. Now the algorithm selects another set of candidates (arms) such that the set contains arms with either high reward or large uncertainty about their reward or both. Proceeding iteratively, the target of the user's search will obtain a highly certain estimate of high reward and be identified as the best arm.

Note that at least operations 410, 412 and 414 can happen in any order. In one implementation, operation 410 occurs continuously in the background, separately from the remainder of the operations, and updates the document catalog in the embedding space asynchronously with the remainder of the operations.

In general, the logic of FIG. 4, as well as other sequences and flowcharts herein, can be implemented using processors programmed using computer programs stored in memory accessible to the computer systems and executable by the processors, by dedicated logic hardware, including field programmable integrated circuits, or by combinations of dedicated logic hardware and computer programs. Each block in the flowchart or phase in a logic sequence describes logic that can be implemented in hardware or in software running on one or more computing processes executing on one or more computer systems. In one implementation, each operation of the flowchart or phase in a logic sequence illustrates or describes the function of a separate module of software. In another implementation, the logic of the operation is performed by software code routines which are distributed throughout more than one module. In addition, as the term is used herein, a "module" can include one or more "sub-modules," which are themselves considered herein to constitute "modules." As with all flowcharts and logic sequences herein, it will be appreciated that many of the operations can be combined, performed in parallel or performed in a different sequence without affecting the functions achieved. In some cases, as a person of ordinary skill in the present field of invention will appreciate, a re-arrangement of operations will achieve the same results only if certain other changes are made as well. In other cases, as the person of ordinary skill in the present field of invention will appreciate, a re-arrangement of operations will achieve the same results only if certain conditions are satisfied. Furthermore, it will be appreciated that the flowcharts and logic sequences herein show only aspects that are pertinent to an understanding of the present disclosure, and it will be understood that in a specific implementation, numerous additional operations for accomplishing other functions for that implementation can be performed before, after and between those operations shown.

In some implementations, the development and maintenance of new or updated constraints is performed on a mobile device, whereas the document catalog in embedding space is maintained on a server which is separated from the mobile device by a network that includes a Wi-Fi or cellular data link or both. The overall arrangement still performs the operations of FIG. 4 (with its variations as described elsewhere herein), but the arrangement embodies a specific and highly advantageous allocation of functions among the two nodes. In particular, the memory and computational resources required to maintain and update the constraints are minimal enough as to allow constraint management to be performed and maintained on a mobile device such as a phone or tablet, rather than on a server.

Mobile Device and Server Implementation of Visual Interactive Search System

FIG. 5 is a block diagram of various components of a server 510 and a mobile device 512 for implementing the visual interactive search system as discussed above with reference to FIGS. 1-4.

Referring to FIG. 5, the server 510 has accessibly thereto a document catalog database 516 previously embedded into an embedding space. The server 510 also includes a candidate space identification module 524, which has access to the document catalog database 516. The candidate space identification module 524 determines the candidate space at each iteration of the search, by applying the initial query and the then-current set of constraints to the documents in the document catalog database 516. The resulting candidate space is stored temporarily into a candidate space database 526. In an implementation, the candidate space database 526 contains pointers to documents in the document catalog database 516, rather than any actual documents. The server 510 also optionally includes a discriminative selection module 528, which selects a discriminative collection of the documents from the candidate space database 526 for transmission to the mobile device 512.

The mobile device 512 includes a user interaction module 522, which presents collections of documents to the user at each iteration, and receives user feedback concerning the collection. The user interaction module 522 forwards the user feedback to a constraints management module 532, which manages content of a constraints database 534. If the user interaction module 522 receives a user commit indication, it notifies an action module 530 which takes some action with respect to the user's selected document such as the actions mentioned elsewhere herein with respect to FIG. 5.

FIG. 6 illustrates content of the constraints database 534 of FIG. 5 according to an implementation of the present disclosure.

Referring to FIG. 6, the constraints database 534 contains a last-in-first-out stack, in which each level corresponds to a respective iteration of the search. Each i'th level stores sufficient information to identify the geometric constraints that resulted from the user's i'th iteration of feedback in response to viewing a collection of documents that were presented to the user. In one implementation, all the constraints in effect for each iteration of the search are described in the stack entry for that iteration. In another implementation, where constraints are cumulative, only the set of constraints that were added in each iteration is described in the stack entry for that iteration, all other constraints applicable to that stack entry being implied due to their presence in stack entries corresponding to prior iterations. In general, each stack entry "identifies" the set of constraints applicable at the corresponding iteration.

Referring to FIG. 6, the stack entry for each i'th iteration contains only two fields: a selected field 610 identifying all of the documents in the i'th iteration that the user selected from a collection of documents with which the user was presented, and a non-selected field 612 identifying all of the documents that were presented to the user for the i'th iteration but which the user did not select. The documents identified in the selected field 610 are sometimes referred to herein as the i'th selected subset of documents, and the documents identified in the non-selected field 612 are sometimes referred to herein as the i'th non-selected subset of the documents that the user selected from a collection of documents. User selection of the i'th selected subset indicates that the user considers the documents selected as being more relevant to a target than the documents in the i'th non-selected subset.

Further, referring to FIG. 6 it is assumed, for clarity of illustration, that only three documents were presented to the user at each iteration, and that the user selected only one of them. For iteration 1 the user was presented with documents A, B and C, and the user selected document A. For iteration 2 the user was presented with documents D, E and F, and the user selected document D. For iteration 3 the user was presented with documents G, H and I, and the user selected document G. For iteration 4 the user was presented with documents J, K and L, and the user selected document J. The system interprets each entry to define a separate geometric constraint for each pair of documents identified in the corresponding level of the stack, where one document of the pair is identified in the selected field 610 and the other document of the pair is identified in the non-selected field 612. Thus level 1 of the stack defines a constraint using the pair (A,B) and another constraint using the pair (A,C). Level 2 of the stack defines a constraint using the pair (D,E) and another constraint using the pair (D,F), and so on. The actual constraint is that a candidate document X, in order to satisfy the constraint, must be closer in the embedding space to the first document of the pair than it is to the second document of the pair. Thus level 1 of the stack defines the constraints that a candidate document X must be closer to A in the embedding space than it is to B, and also closer to A in the embedding space than it is to C. These constraints are abbreviated for purposes of the present disclosure as $$d(X,A)<d(X,C) \text{ and } d(X,A)<d(X,B),$$

where 'd' means distance in the embedding space. Similarly, level 2 of the stack defines the constraints that candidate document X must be closer to D in the embedding space than it is to E, and also closer to D in the embedding space than it is to F. These constraints are abbreviated for purposes of the present disclosure as $$d(X,D)<d(X,F) \text{ and } d(X,D)<d(X,E),$$

and so on. It can be seen that if the selected field 610 in iteration i identifies Pi documents, and the non-selected field 612 in iteration i identifies Qi documents, then the contents of each iteration i define a total of Pi*Qi constraints, one for each combination of a document in the selected field 610 and a document in the non-selected field 612. It will be appreciated that other ways of representing the constraints added in each iteration can be used in different implementations.

FIG. 7 is a diagram illustrating primary types of messages that pass between the mobile device 512 and the server 510, as illustrated in FIG. 6, according to an implementation of the present disclosure.

Referring to FIG. 7, the mobile device 512 acts as a client to the server 510. The mobile device 512 manages the interactions with the user and updates and maintains the constraints in constraints database 534. The server 510 maintains the catalog but retains no state with regard to the user's search (although it may log it for later off-line processing).

Initially, in operation 710, the mobile device 512 receives an initial query from the user via the user interaction module 522, as illustrated in FIG. 5. In operation 712 the mobile device 512 forwards the initial query to the server 510. In operation 714 the candidate space identification module 524 of the server 510, as illustrated in FIG. 5, applies the initial query to the document catalog database 516, as illustrated in FIG. 5, to determine an initial candidate space.

In operation 716 the discriminative selection module 528 of the server 510, as illustrated in FIG. 5, determines a discriminative collection of the documents from the then-current candidate space, though in another implementation, the collection selected in operation 716 need not necessarily be discriminative. By operation 718, the server 510 transmits a message to return the selected collection to the mobile device 512 and discards the constraints or query that it used in operations 714 and 716. The message transmitted in operation 718 includes all information necessary for presentation to the user and maintenance of the constraints, such as document images, meta-data about the documents, and an indication of their embedding in the embedding space.

In operation 720 the mobile device 512 presents the discriminative collection to the user, for example by displaying an image of each document. In operation 722 the mobile device 512 receives relative feedback from the user, in the form of user selection of one or more of the documents that were presented to the user in operation 720. In operation 724 the constraints management module 532 determines new geometric constraints based on the user's feedback, and in operation 726 the mobile device 512 updates the constraints database 534 with the new constraints. In operation 728, the mobile device 512 then sends a message including the then-current set of constraints from the constraints database 534 (which contains all relevant information about the search state) to the server 510, together with the initial query from operation 710. This process now loops back to operation 714 with the server 510 applying the initial query and the then-current set of geometric constraints to the document catalog database 516 to derive the next candidate space.

As can be seen, the server 510 is stateless with regard to a given user's search. This has several benefits, such as: 1) a load on the server 510 and or additional servers is decreased, 2) it is easier to scale by adding more servers as each iteration of a query interaction could go to a different server, 3) since the server 510 is stateless the system is more robust, so for example if a server 510 fails the state is retained on the mobile device 512. Additionally, since the constraints stored in constraints database 534 fully encode the user's feedback during the current and all prior search iteration, they require minimal storage and management.

As mentioned, the message transmitted in operation 718 includes document images. Though these are typically not large, many caching schemes could be implemented that would retain catalog items on the mobile device 512. These include methods that cache popular items, or items that are predicted to be of interest to the user based on demographic information or search histories. Items could also be pre-fetched onto the mobile device 512 by predicting what items might need to be presented in later iterations of the search.

Specific Implementations of Embedding Documents in an Embedding Space

FIGS. 8, 9, 10, 11, 12, 13A and 13B illustrate specific implementations of embedding documents in an embedding space according to an implementation of the present disclosure. Specifically, FIGS. 8-13B illustrate a set of documents embedded in 2-dimensional space. Aspects of the present disclosure envision embedding documents in spaces of large dimensionality, hence two dimensions is for illustration purposes only.

Figure 8:
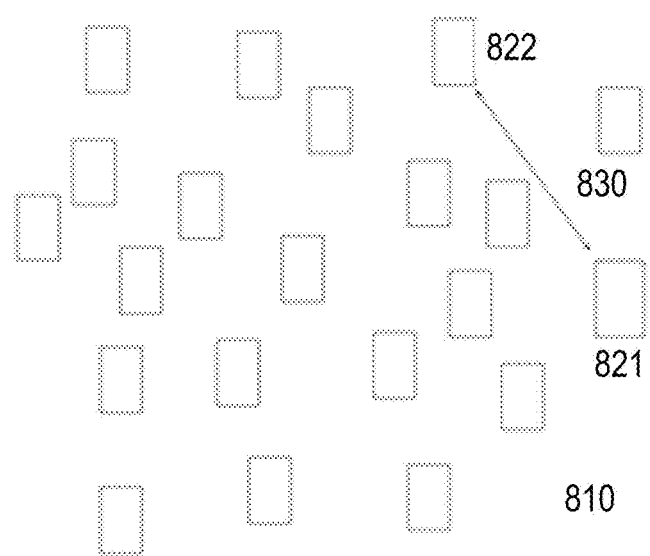
FIGS. 8, 9, 10, 11, 12, 13A and 13B illustrate specific implementations of embedding documents in an embedding space according to an implementation of the present disclosure.

Referring to FIG. 8, a space 810 contains documents, e.g., 821, 822. Each pair of documents has a distance 830 between them.

Figure 9:
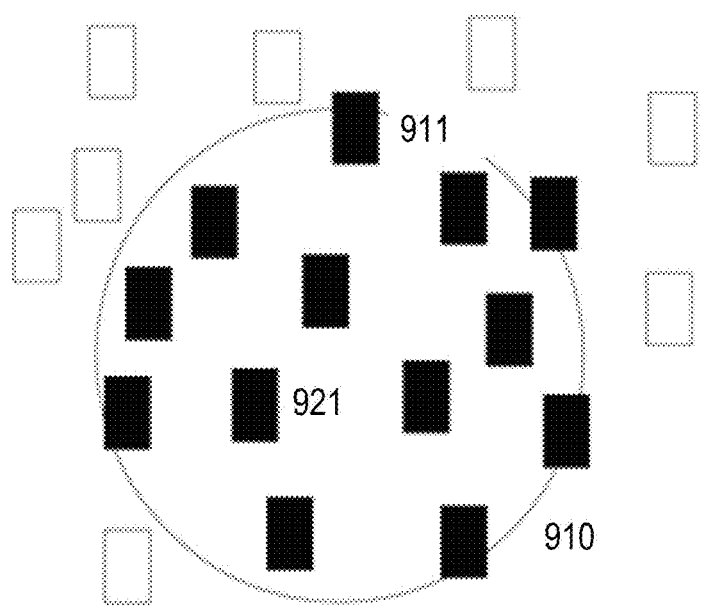

Referring to FIG. 9, the set of documents from FIG. 8 is illustrated in addition to a circular geometric constraint 910. Those documents inside the circle, e.g., 921 and 911 are said to satisfy the constraint. Aspects of the present disclosure express queries and user input in the form of such geometric constraints. The documents that satisfy the constraints are the current results of the query. As the user provides further input additional constraints may be added, or existing constraints may be added or removed.

Figure 10:
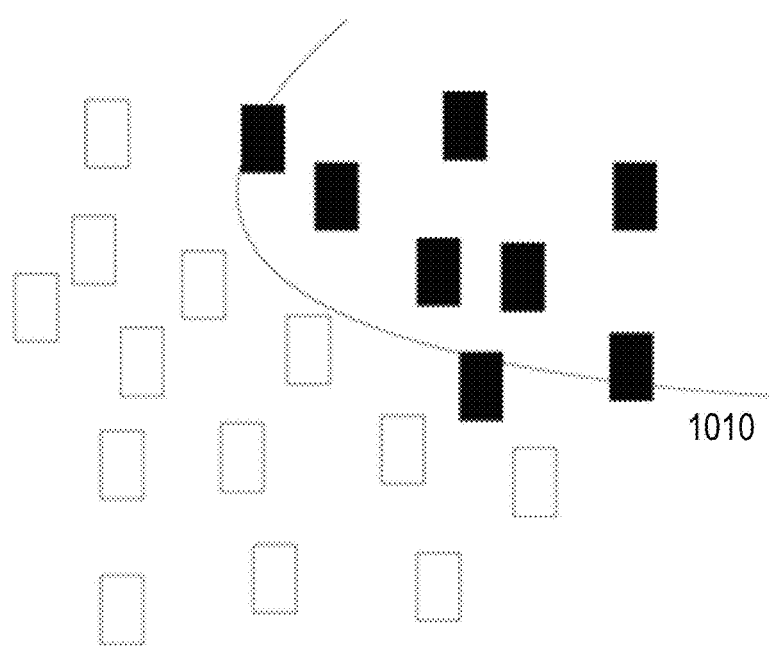

Referring to FIG. 10, the set of documents from FIG. 8 is illustrated in addition to a non-circular geometric constraint 1010. Various implementations may include geometric constraints of an arbitrary shape, and unions, intersections and differences of such constraints.

Figure 11:
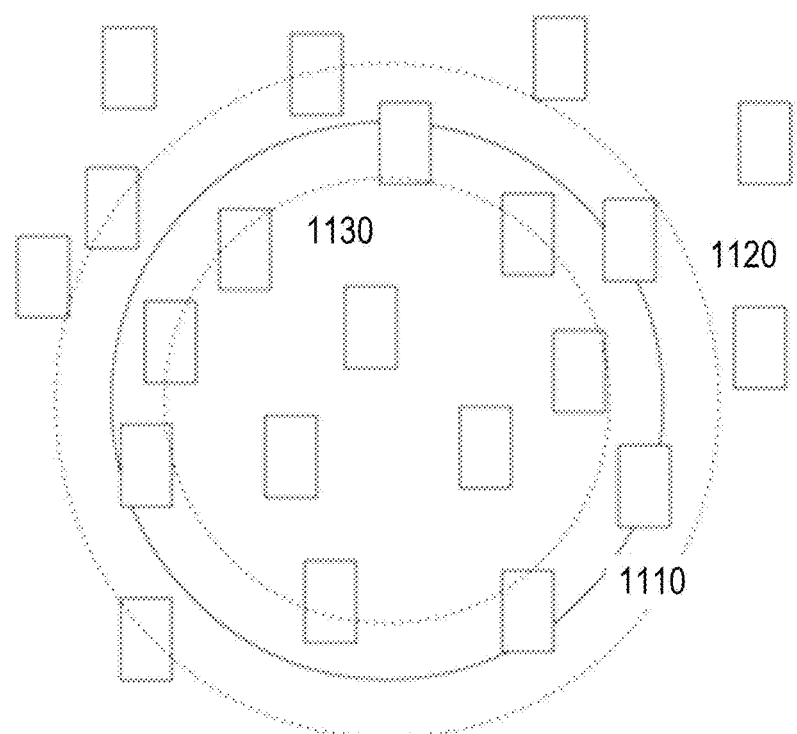

Referring to FIG. 11, a means by which the circular constraint of FIG. 9 may be updated in response to user input is illustrated. An original circular constraint 1110 may be modified by increasing its radius to produce circular constraint 1120, or by decreasing its radius to produce circular constraint 1130. These modifications are done in response to user input. The set of documents satisfying these constraints will change as the constraints are modified thus reducing or expanding the set of images considered for display to the user.

Figure 12:
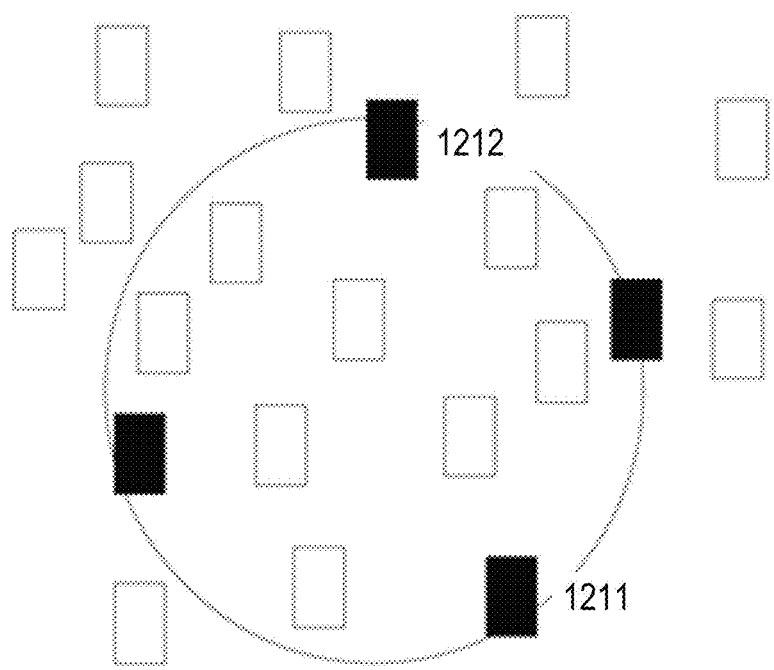

Referring to FIG. 12, a means by which a discriminative subset of documents may be selected for presentation to the user is illustrated. The documents highlighted, e.g., 1211 and 1212, are distinct from each other and from the others contained in the circular constraint region.

Figure 13A:
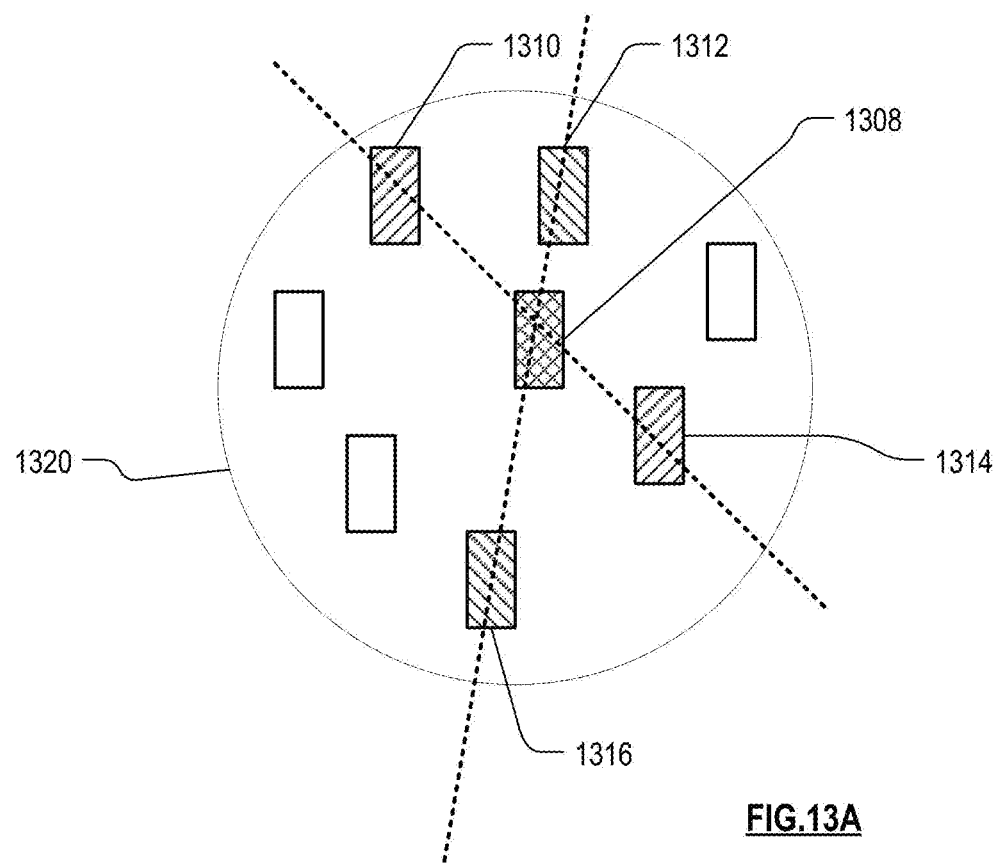

Referring to FIG. 13A, a set of documents in embedding space is illustrated, in which the query processing module 140, as illustrated in FIG. 1, has narrowed the collection to those documents within the circle 1320, and has identified a primary result document 1318. In addition, the discriminative selection module 160, as illustrated in FIG. 1, has selected documents 1310, 1312, 1314 and 1316 as the discriminative set to present to the user. In the embedding space, documents 1312, 1318 and 1316 are substantially collinear, and documents 1310, 1318 and 1314 are substantially collinear.

Figure 13B:
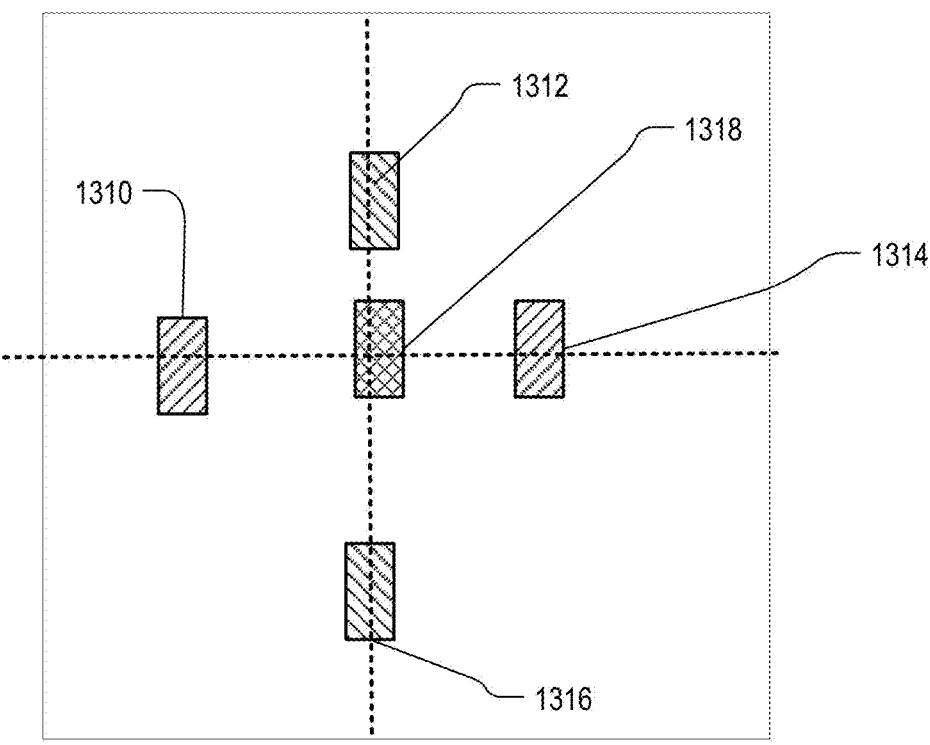

Referring to FIG. 13B, an illustration is provided to describe how the system may present the set of documents in layout space (the broken lines are implied, rather than visible). The specific positions of the documents do not necessarily match those in embedding space, in part because dimensionality of the space has been reduced. However, documents which were substantially collinear in embedding space are collinear in layout space. In particular, if the broken lines in FIG. 13A represent dimensions in embedding space along which the candidate documents differ, the placement of the documents in layout space in FIG. 13B are indicative of those same dimensions. In addition, the relative distances among the documents along each of the lines of collinearity in layout space also are indicative of the relative distances in embedding space.

Figure 14:
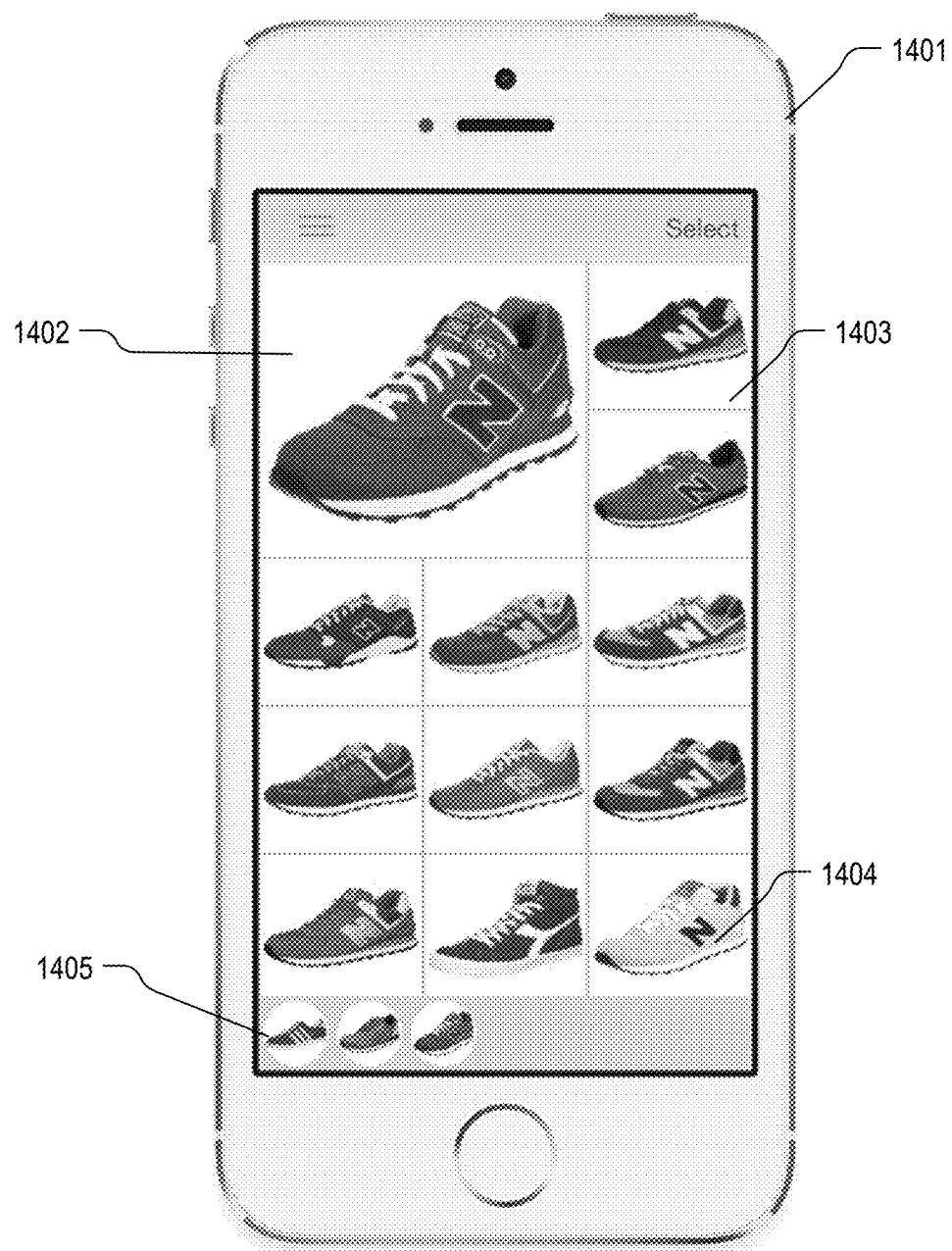
FIG. 14 illustrates a visual interface that enables searching for shoes using a visual interactive search environment on a mobile device according to an implementation of the present disclosure.

Implementations of Visual Interactive Search for Physical and/or Digital Products FIG. 14 illustrates a visual interface that enables searching for shoes using a visual interactive search environment on a mobile device according to an implementation of the present disclosure. In this implementation the catalog (e.g., the document catalog database 120, as illustrated in FIG. 1) is maintained and candidate results are identified on a server (e.g., the server computer 212, as illustrated in FIG. 2), while the constraints are maintained on a mobile device 1401. Implementations of this architecture are also discussed above with reference to FIGS. 5-7.

The shoes are embedded in a high dimensional space by applying a neural network trained to capture the visual similarity between shoes. Other contributions are made to the embedding using Kernels that compare meta-data about the shoe, e.g., its brand. The primary result 1402 is displayed prominently as a large image in the top left corner. The shoe 1403 that is closest to the primary result in the embedded space (i.e., is most similar) is displayed closest to the primary result. A discriminative set of results that satisfies the current constraints is then displayed. These constraints may be hard or soft constraints in different implementations, or some may be hard constraints and others soft constraints. Note that these results retain significant diversity, e.g., the shoe 1404 that is farthest in the embedding space (and displayed farthest from the primary result) is a different color, but the same brand as the primary result. This implementation maintains a stack of constraints. Each constraint requires the candidate to be closer to a user-selected image than one non-selected image. Thus at each iteration multiple constraints, e.g., 11, may be added. In one implementation, these constraints are treated as soft constraints in that each candidate suffers a penalty for each broken constraint. The candidate results are those with smaller penalties. In this implementation the stack of selected images is displayed at 1405 with the oldest user selection at the left and newer ones to the right. The user may click on any image in this stack. This will remove all images (and their associated constraints) to the right of the clicked image off the stack. This has the effect of taking the user back to a previous search state, defined by the set of constraints that were in effect before the clicked image was selected.

The search method of FIG. 4 (including all its variations as mentioned herein) may be used for various purposes, several of which are outlined below with reference to FIGS. 15-18. Many of the operations discussed with reference to FIGS. 15-18 are similar to those discussed above with reference to FIG. 4 and detailed descriptions thereof may be omitted.

Figure 15:
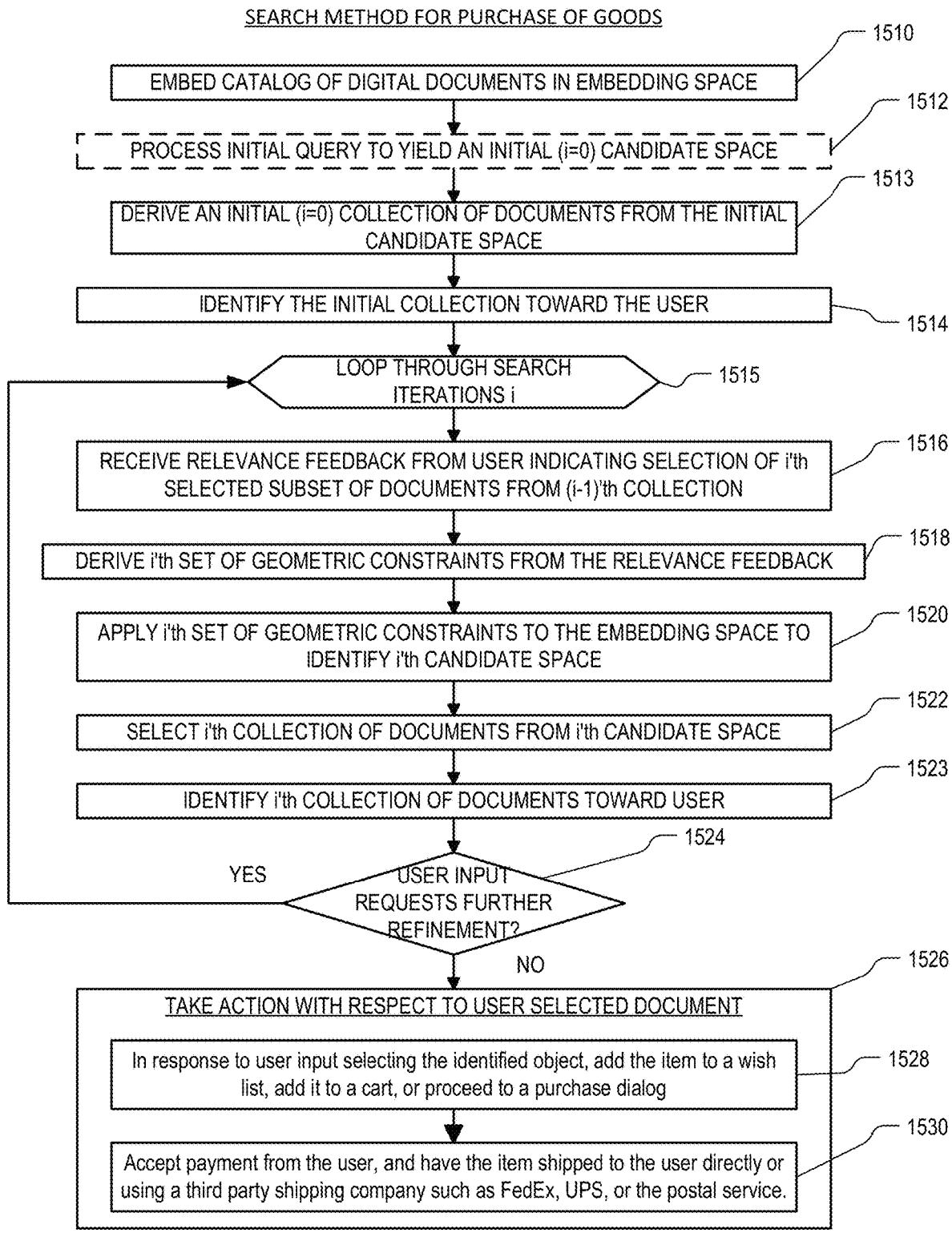
FIG. 15 is a flowchart expanding the various logic phases illustrated in FIG. 4 to implement a purchase of a physical product such as clothing, jewelry, furniture, shoes, accessories, real estate, cars, artwork, photographs, posters, prints, and home decor according to an implementation of the present disclosure.

FIG. 15 is a flowchart expanding the various logic phases illustrated in FIG. 4 to implement a purchase of a physical product such as clothing, jewelry, furniture, shoes, accessories, real estate, cars, artworks, photographs, posters, prints, and home decor, according to an implementation of the present disclosure. All of the variations mentioned herein can be used with the process illustrated in FIG. 15.

Referring to FIG. 15, in operation 1510, a catalog of digital documents is embedded in an embedding space and stored in a database. In the database, a distance is identified between each pair of the documents in the embedding space corresponding to a predetermined measure of dissimilarity between the products represented by the pair of documents.

In operation 1512, an initial query is optionally processed to yield an initial (i=0) candidate space of documents satisfying the query results. The initial query may be a conventional text query, for example. The initial candidate space is within and optionally smaller than the full catalog of documents.

In operation 1513 an initial collection of digital documents is derived from the initial candidate space. This initial (i=0) collection of documents is a subset of the initial candidate space. In one implementation the initial collection of documents is selected as a discriminative subset of the catalog, while in another implementation the initial collection of documents is not discriminative.

In operation 1514, the initial collection of documents is identified toward the user. In one implementation this can include displaying a representation of the documents in the initial collection visibly to the user.

In operation 1515 an iterative search process is initiated beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from operation 1514. If i>1, then this collection of documents is the (i−1)'th collection of documents as presented to the user in operation 1523 of the prior iteration.

At the beginning of the i'th iteration, in operation 1516, the user provides relative feedback as to the documents in the (i−1)'th collection of documents. Preferably the relative feedback takes the form of user selection of a subset of the documents from the (i−1)'th collection, where selection of a document implies that the user considers products represented by that document to be more relevant to a search target than the products represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset.

In operation 1518, a set of geometric constraints is derived from the relative feedback, in a manner described elsewhere herein. The set of geometric constraints derived in the i'th iteration is referred to as the i'th set of geometric constraints.

In operation 1520, the i'th set of geometric constraints is applied to the embedding space to form an i'th candidate space, and in operation 1522 an i'th collection of candidate documents is selected as a subset of the documents in the i'th candidate space. In one implementation the i'th collection of documents is selected as a discriminative subset of the i'th candidate space, while in another implementation the i'th collection of documents is not discriminative.

In operation 1523 the i'th collection of documents is presented toward the user for optional further refinement. In operation 1524, if user input indicates further refinement is desired, then the logic returns to operation 1515 for the next iteration of the search loop. Otherwise the user indicates to commit, and in operation 1526 the system takes action with respect to the user-selected document.

The "take action" operation 1526 of FIG. 15, then involves: (1) in response to user input selecting the identified object, the system to adding the item to a wish list, adding it to a cart, or proceeding to a purchase dialog (operation 1528); and (2) the system, perhaps at a later time, accepting payment from the user, and having the item shipped to the user directly or using a third party shipping company such as FedEx, UPS, or the postal service (operation 1530). The operations of accepting payment and shipping can be performed in any order. For free products payment may not be required. Corresponding submodules for performing these operations may be included in the action module 170, as illustrated in FIG. 1.

Figure 16:
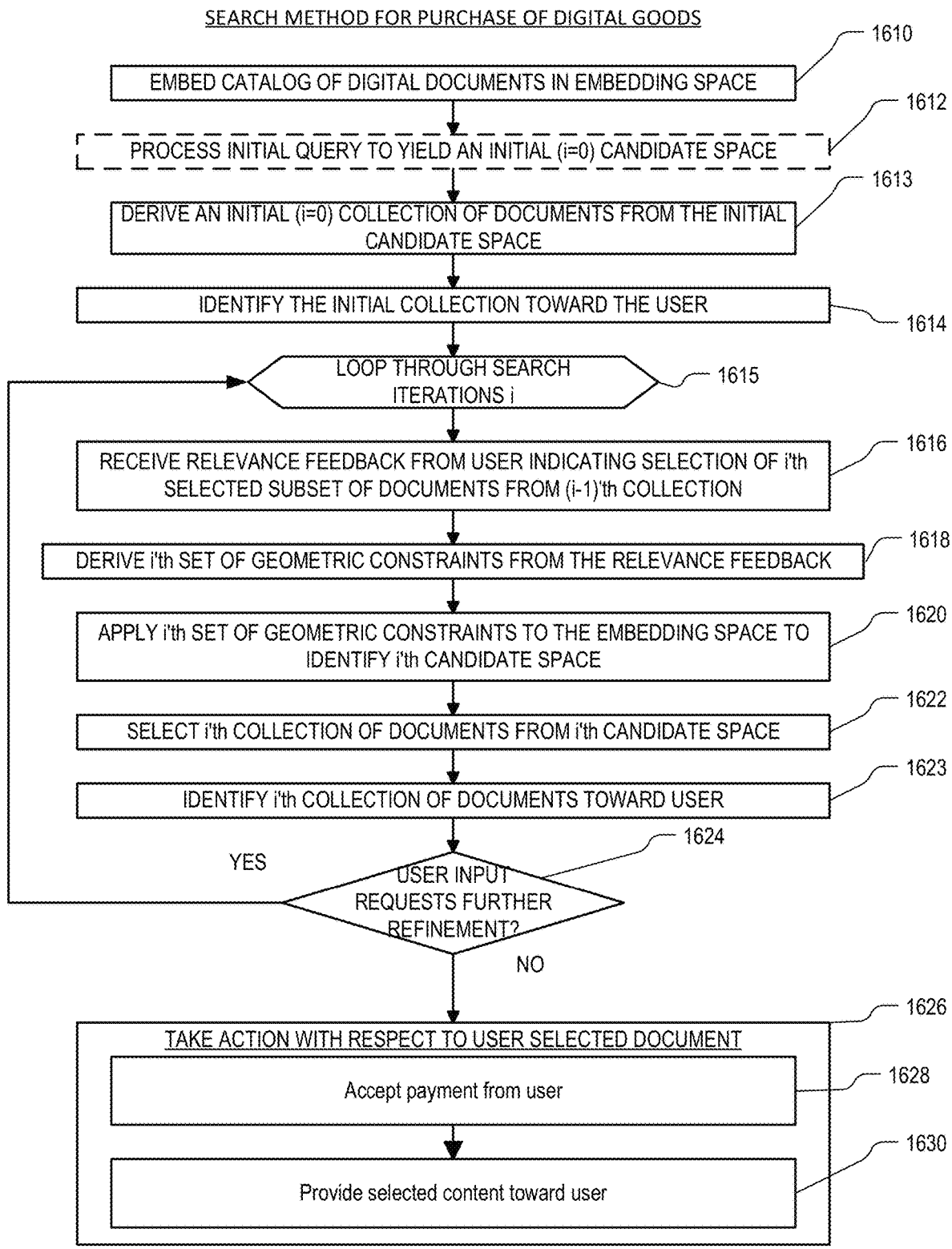
FIG. 16 is a flowchart expanding the various logic phases illustrated in FIG. 4 to implement a purchase of a digital product such as movies, music, photographs and books according to an implementation of the present disclosure.

FIG. 16 is a flowchart expanding the various logic phases illustrated in FIG. 4 to implement a purchase of a digital product such as movies, music, photographs, or books according to an implementation of the present disclosure. All of the variations mentioned herein can be used with the operations illustrated in FIG. 16.

Referring to FIG. 16, in operation 1610, a catalog of digital documents is embedded in an embedding space and stored in a database. In the database, a distance is identified between each pair of the documents in the embedding space corresponding to a predetermined measure of dissimilarity between digital products represented by the pair of documents.

In operation 1612, an initial query is optionally processed to yield an initial (i=0) candidate space of documents satisfying the query results. The initial query may be a conventional text query, for example. The initial candidate space is within and optionally smaller than the full catalog of documents.

In operation 1613 an initial collection of digital documents is derived from the initial candidate space. This initial (i=0) collection of documents is a subset of the initial candidate space. In one implementation the initial collection of documents is selected as a discriminative subset of the catalog, while in another implementation the initial collection of documents is not discriminative.

In operation 1614, the initial collection of documents is identified toward the user. In one operation this can include displaying a representation of the documents in the initial collection visibly to the user.

In operation 1615 an iterative search process is initiated beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from operation 1614. If i>1, then this collection of documents is the (i−1)'th collection of documents as presented to the user in operation 1623 of the prior iteration.

At the beginning of the i'th iteration, in operation 1616, the user provides relative feedback as to the documents in the (i−1)'th collection of documents. Preferably the relative feedback takes the form of user selection of a subset of the documents from the (i−1)'th collection, where selection of a document implies that the user considers the digital product represented by that document to be more relevant to a search target than digital products represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset.

In operation 1618, a set of geometric constraints is derived from the relative feedback, in a manner described elsewhere herein. The set of geometric constraints derived in the i'th iteration is referred to as the i'th set of geometric constraints.

In operation 1620, the i'th set of geometric constraints is applied to the embedding space to form an i'th candidate space, and in operation 1622 an i'th collection of candidate documents is selected as a subset of the documents in the i'th candidate space. In one implementation the i'th collection of documents is selected as a discriminative subset of the i'th candidate space, while in another implementation the i'th collection of documents is not discriminative.

In operation 1623 the i'th collection of documents is presented toward the user for optional further refinement.

In operation 1624, if user input indicates further refinement is desired, then the logic returns to operation 1615 for the next iteration of the search loop. Otherwise the user indicates to commit, and in operation 1626 the system takes action with respect to the user-selected document.

The "take action" operation 1626 in FIG. 16, then involves the system, optionally and perhaps at a later time, accepting payment from the user (operation 1628) and providing the content to the user (or having it provided) using some means of distributing digital content, e.g., email or streaming (operation 1630). The operations of accepting payment and providing content can be performed in any order. For free products payment may not be required. Corresponding submodules for performing these operations can be included in the action module 170, as illustrated in FIG. 1.

FIG. 17 is a flowchart expanding the various logic phases illustrated in FIG. 4 to implement an identification of digital content that can be used to produce a physical product according to an implementation of the present disclosure. For example, the digital content may consist of a catalog of images which may then be printed on a poster, t-shirt, or mug. All of the variations mentioned herein can be used with the operations illustrated in FIG. 17.

Referring to FIG. 17, at operation 1710, a catalog of digital documents is embedded in an embedding space and stored in a database. In the database, a distance is identified between each pair of the documents in the embedding space corresponding to a predetermined measure of dissimilarity between digital content represented by the pair of documents.

In operation 1712, an initial query is optionally processed to yield an initial (i=0) candidate space of documents satisfying the query results. The initial query may be a conventional text query, for example. The initial candidate space is within and optionally smaller than the full catalog of documents.

In operation 1713 an initial collection of digital documents is derived from the initial candidate space. This initial (i=0) collection of documents is a subset of the initial candidate space. In one implementation the initial collection of documents is selected as a discriminative subset of the catalog, while in another implementation the initial collection of documents is not discriminative.

In operation 1714, the initial collection of documents is identified toward the user. In one implementation this can include displaying a representation of the documents in the initial collection visibly to the user.

In operation 1715 an iterative search process is initiated beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from operation 1714. If i>1, then this collection of documents is the (i−1)'th collection of documents as presented to the user in operation 1723 of the prior iteration.

At the beginning of the i'th iteration, in operation 1716, the user provides relative feedback as to the documents in the (i−1)'th collection of documents. Preferably the relative feedback takes the form of user selection of a subset of the documents from the (i−1)'th collection, where selection of a document implies that the user considers the digital content represented by that document to be more relevant to a search target than digital content represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset.

In operation 1718, a set of geometric constraints is derived from the relative feedback, in a manner described elsewhere herein. The set of geometric constraints derived in the i'th iteration is referred to as the i'th set of geometric constraints.

In operation 1720, the i'th set of geometric constraints is applied to the embedding space to form an i'th candidate space, and in operation 1722 an i'th collection of candidate documents is selected as a subset of the documents in the i'th candidate space. In one implementation the i'th collection of documents is selected as a discriminative subset of the i'th candidate space, while in another implementation the i'th collection of documents is not discriminative.

In operation 1723 the i'th collection of documents is presented toward the user for optional further refinement.

In operation 1724, if user input indicates further refinement is desired, then the process returns to operation 1715 for the next iteration of the search loop. Otherwise the user indicates to commit, and in operation 1726 the system takes action with respect to the user-selected document.

The "take action" operation 1726 in FIG. 17, then involves the following steps performed by the system. First the selected digital content is added to a shopping cart, or wish list, or otherwise recording the user's intent to purchase a product based on the selected content (operation 1728). This operation may also include recording the user's selection of a particular kind of product (e.g. a mug or a mouse pad).

In operation 1730, payment is accepted from the user. In operation 1732 a physical product is manufactured based on the selected content, e.g., by reproducing the selected content on a physical artifact. In operation 1734 the physical product is shipped to the user or the physical product is shipped by a delivery service.

The operation 1730 of accepting payment may be performed after the manufacturing operation 1732 or after the shipping operation 1734 in various implementations. Also, corresponding submodules for performing these operations can be included in the action module 170, as illustrated in FIG. 1. Preferably, the sole purpose of the above implementation is to identify content to enable the manufacture and purchase of a physical product.

FIG. 18 is a flowchart expanding the various logic phases illustrated in FIG. 4 to implement an identification of content for sharing according to an implementation of the present disclosure. For example, the digital documents in the embedding space may consist of a catalog of the user's personal photographs or other media. All of the variations mentioned herein can be used with the process illustrated in FIG. 18.

Referring to FIG. 18, in operation 1810, a catalog of digital documents is embedded in an embedding space and stored in a database. In the implementation illustrated in FIG. 15, the catalog may be the user's library of personal photographs, for example. In the database, a distance is identified between each pair of the documents in the embedding space corresponding to a predetermined measure of dissimilarity between content represented by the pair of documents.

In operation 1812, an initial query is optionally processed to yield an initial (i=0) candidate space of documents satisfying the query results. The initial query may be a conventional text query, for example. The initial candidate space is within and optionally smaller than the full catalog of documents.

In operation 1813 an initial collection of digital documents is derived from the initial candidate space. This initial (i=0) collection of documents is a subset of the initial candidate space. In one implementation the initial collection of documents is selected as a discriminative subset of the catalog, while in another implementation the initial collection of documents is not discriminative.

In operation 1814, the initial collection of documents is identified toward the user. In one implementation this can include displaying a representation of the documents in the initial collection visibly to the user.

In operation 1815 an iterative search process is initiated beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from operation 1814. If i>1, then this collection of documents is the (i−1)'th collection of documents as presented to the user in operation 1823 of the prior iteration.

At the beginning of the i'th iteration, in operation 1816, the user provides relative feedback as to the documents in the (i−1)'th collection of documents. Preferably the relative feedback takes the form of user selection of a subset of the documents from the (i−1)'th collection, where selection of a document implies that the user considers content represented by that document to be more relevant to a search target than content represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset.

In operation 1818, a set of geometric constraints is derived from the relative feedback, in a manner described elsewhere herein. The set of geometric constraints derived in the i'th iteration is referred to as the i'th set of geometric constraints.

In operation 1820, the i'th set of geometric constraints is applied to the embedding space to form an i'th candidate space, and in operation 1822 an i'th collection of candidate documents is selected as a subset of the documents in the i'th candidate space. In one implementation the i'th collection of documents is selected as a discriminative subset of the i'th candidate space, while in another implementation the i'th collection of documents is not discriminative.

In operation 1823 the i'th collection of documents is presented toward the user for optional further refinement.

In operation 1824, if user input indicates further refinement is desired, then the process returns to operation 1815 for the next iteration of the search loop. Otherwise the user indicates to commit, and in operation 1826 the system takes action with respect to the user-selected document.

The "take action" operation 1826 illustrated in FIG. 18, then involves the following operations. In operation 1828 information regarding a means of sharing, e.g., email, twitter, Facebook, etc., is accepted from the user. In operation 1830 information regarding a third party or their parties to whom the item should be shared is accepted from the user. In operation 1832 the selected item(s) are shared.

The operation 1828 of accepting from the user information regarding the means of sharing may be performed before or after the operation 1830 of accepting from the user information regarding the third party or third parties to whom said item should be shared. Also, corresponding submodules for performing thee operations can be included in the action module 170, as illustrated in FIG. 1. Preferably the sole purpose of the above implementation is identifying content to be shared.

Bayesian Techniques for Choosing and Presenting Collections of Documents

Bayes theory, or sometimes referred to as Bayes rule, Bayes law or simply Bayesian techniques, is used to determine an estimated probability of an event, based on prior knowledge of conditions that might be related to that event (for example see: "Bayes Theorem," en.wikipedia.org/wiki/Bayes'_theorem, accessed Nov. 23, 2016 and incorporated herein by reference). Essentially, Bayes theory is probability theory that uses "Prior" probabilities (currently known or estimated probabilities) and "Posterior" probabilities (probabilities that take into account the known/estimated probabilities as well as current observations) to estimate the probability of a particular event. This probability of a particular event could be, for example the probability of a user selecting a particular document as a desired (target) document at a particular point in time (e.g., after a certain number of selections or clicks). This probability theory can be implemented in a particular manner to identify and present documents from an embedding space (or from a candidate list encompassing some or all documents from the embedding space) and then continue a process of visual document discovery until the desired document is reached by a user.

FIG. 19 is a flowchart illustrating Bayesian the use of techniques for choosing and presenting collections of documents according to an implementation of the present disclosure.

Referring to FIG. 19, in operation 1910, a system calculates a Prior probability score for some or all documents included in an embedding space. The Prior probability scores can be calculated from a database that is provided to a computer system, where the database identifies a catalog of documents in the embedding space. Again, the scores can be calculated for all documents of the embedding space or a subset of documents of the embedding space, such as a candidate list. Each Prior probability score is a score indicating a preliminary probability that a particular document is a desired document. Examples of calculating the Prior probability scores are discussed in more detail below, after the overall description of the flowchart of FIG. 19.

In operation 1912, the user is presented with an initial collection of images. The initial collection can be developed using any of the techniques described elsewhere herein, or using any other technique. Typically, the initial collection of documents will be determined and presented to the user in dependence on the calculated Prior probability scores.

Operations 1910 and 1912 may be interchanged in some implementations, or may be performed in parallel.

In operation 1914, the system implementing the Bayesian techniques begins a loop through an iterative search process, which is basically a loop through operations 1916, 1918, 1920, 1922 and 1924 that continues until the user indicates that a document selected by the user is the desired document (e.g., commits to the selected document), such that action can be taken in operation 1926 with respect to a selected document. This action could be any action including those described herein, such as performing operation 1526 of FIG. 15.

In operation 1916, the system receives the user's selection of a document from the current collection of documents. In the first iteration of the loop, the user selects the document from the initial collection of documents presented to the user in operation 1912. In subsequent iterations of the loop the user selects a document from the collection of documents presented to the user in operation 1924.

In operation 1918, the system uses the selected document to assign Posterior probability scores to other documents in, for example, the candidate list, or to update previously assigned Posterior probability scores, if Posterior probability scores have already been assigned. In an implementation, the Posterior probability scores for all unselected documents of collections of documents presented to the user can be set to 0, or a very low probability that would almost certainly guarantee that the unselected documents would not be presented to the user at the next iteration or any future iteration. In other words, documents that have been presented to the user but not selected by the user will be eliminated from potentially being presented to the user again in another subsequent collection of documents.

Optionally, in operation 1920, the system may shrink the Prior probability scores toward the Prior, as described in more detail below.

In operation 1922, the Posterior probability scores are used to choose the next collection of documents to present toward the user. The next collection of documents can be determined by identifying a certain number of the highest Posterior probability scores (e.g., the top 10 highest Posterior probability scores) or by using a different technique, such as Thompson sampling, as discussed in detail below.

In operation 1924, the next collection of documents is presented to the user. The iteration then returns to operation 1914 to perform the next loop of the iteration. If in operation 1916, the user indicates satisfaction with the document that he or she is selecting, then in operation 1926, action is taken with respect to the selected document, for example by performing any of the operations 1526, 1626, 1726, or 1826 as illustrated in and described with respect to corresponding FIGS. 15, 16, 17 and 18.

As can be seen, user identification of a desired document may include providing, accessibly to a computer system, a database identifying a catalog of documents in an embedding space, calculating a Prior probability score for each document of a candidate list including at least a portion of the documents of the embedding space, the Prior probability score indicating a preliminary probability, for each particular document of the candidate list, that the particular document is the desired document; a computer system identifying toward the user an initial (i=0) collection of N0>1 candidate documents from the candidate list in dependence on the calculated Prior probability scores for the documents in the candidate list, the initial collection of candidate documents having fewer documents than the candidate list; and for each i'th iteration in a plurality of iterations, beginning with a first iteration (i=1) and in response to user selection of an i'th selected document from the (i−1)'th collection of candidate documents, identifying toward the user an i'th collection of $N_i>1$ candidate documents from the candidate list in dependence on Posterior probability scores for at least a portion of the documents in the candidate list, Ni being smaller than the number of documents in the candidate list, the Posterior probability score for each given document D being given by P(C|D)P(D), where C is the sequence of documents $c_1, \ldots c_i$ selected by the user up through the i'th iteration, where P(C|D) is the system's view of the probability of C if the desired document is D and where P(D) is the calculated Prior probability score for document D.

Further, as can been seen, this user identification may include for each i'th iteration in the plurality of iterations, calculating the Posterior probability score for document of the candidate list in dependence on the user selection of the i'th document from the (i−1)'th collection of candidate documents.

Even more generally, as can be seen, an endpoint document can be located by providing a catalog of documents in an embedding space that can be accessed by a computer system. A Prior probability score can be calculated for each document of a candidate list including at least a portion of the documents of the embedding space. The Prior probability score may indicate a preliminary probability, for each particular document of the candidate list, that the particular document is the endpoint document. Further, a computer can build an initial (i=0) database version of $N0>1$ candidate documents from the candidate list in dependence on the calculated Prior probability scores for the documents in the candidate list, where the initial database version has fewer documents than the candidate list. The initial database version can be stored in a computer system. Additionally, for each i'th iteration in a plurality of iterations, beginning with a first iteration (i=1): (i) an i'th relevant document from the (i−1)'th database version can be identified as the most relevant to the endpoint document of all the documents in the (i−1)'th database version, and (ii) the i'th database version in the computer system can be updated to have $N_i>1$ candidate documents from the candidate list in dependence on Posterior probability scores for at least a portion of the documents in the candidate list, where Ni is smaller than the number of documents in the candidate list. The Posterior probability score for each given document D can be given by P(C|D)P(D), where C is the sequence of documents $c_1, \ldots c_i$ identified as most relevant up through the i'th iteration, where P(C|D) is the system's view of the probability of C if the endpoint document is D and where P(D) is the calculated Prior probability score for document D. The endpoint document can be one of the documents in the last database version after the plurality of iterations. Finally, an action can be taken in dependence upon identification of the endpoint document.

The User Model

Bayes' rule can be used in one or more of operations 1918, 1920 and 1922, and can inform and influence other operations described in FIG. 19. In particular, for example, during a user session in which the user is seeking a desired document, uncertainty about the desired document at a given point in time can be modeled using Bayesian probability theory. If, for example a random document is referred to as document D and all of the clicks up to a given point in time are referred to as C, the resulting goal is to estimate the probability of document D being the desired document given the sequence of clicks up to the given point in time. In Bayesian theory, this probability is represented as P(D|C). This modeling of the uncertainty regarding document D being the desired document, at a given point in time, is described in further detail below as the "user model."

The user model can be designed and implemented to determine a probability that a document D would be chosen, given a set of documents presented to the user and the sequence of selections/clicks up to that point. The set of documents that are presented to the user in, for example, operations 1912, 1922 and 1924 can be determined using various techniques, such as Thompson sampling, as discussed below in greater detail. Given the user model, Bayes' rule holds that P(D|C) is proportional to P(C|D)P(D). In other words, Bayes' rule can be used to estimate P(D|C), given P(C|D) and P(D). P(D) is the system's view, prior to the user's clicks, of the estimated probability that the user is interested in document D. P(D) is the Prior or the Prior probability score. The Prior remains constant through the user's sequence of clicks, while the system's view of P(C|D) changes and adapts in dependence upon the user's clicks. P(C|D) is essentially the system's view of the probability that the sequence of clicks C would have occurred to reach the document D. The sequence of clicks C, may for example, include clicks $c_1, c_2, \ldots$ up to the current point in time. Note that this description refers to the user's selection of a document as a "click." However, it will be understood that any other user input method (e.g., a touch on a screen, etc.) can be to perform the user selection of a document. A wide variety of user input methods are well known to the reader.

The embeddings provided by other modules of the system described herein can be used to determine the behavior of the user model. In one implementation the probability that the user clicks on a document x, given that the target is t, is proportional to exp $(-\lambda d(x,t))$, where $d(x,t)$ is the distance between document x and document t in the embedding space. The value $\lambda$ may be chosen using maximum likelihood, i.e. to maximize the overall probability of the clicks seen in training data. For example, a neural network can be trained to produce embeddings in a way that $\lambda=1$ is the most natural choice. Put another way, the value of $\lambda$ can be built into the process of training embeddings, where changing $\lambda$ has the same effect as scaling all of the embeddings up or down. Another example of this implementation is that training data exists in the form S, t, s, where a judge was given a screen S, a target t, and asked to say which member s of S is closest to the target t. Using a probability model represented as $P(s|S, t) = e^{\lambda d(s,t)} / \text{sum}(s' \text{in } S) e^{-\lambda d(s',t)}$, it is possible to get an expression for a probability that the judge will pick any s that depends on $\lambda$. Furthermore, if it is assumed that the choices made by the judge on different S, t pairs are independent, then the probabilities can be multiplied to get an overall probability that the judge made all of the choices that they did. Choosing a $\lambda$ that maximizes this overall probability is the $\lambda$ chosen using maximum likelihood, as mentioned above.

As described above, suppose that C is a sequence of documents, $c_1, c_2, \ldots$ selected by the user through various iterations and D is a desired document. Then $P(c_1|D)$ would equal $e^{-\lambda d(c1,D)}$ and $P(c_2|D)$ would equal $e^{-\lambda d(c2,D)}$, etc. Then P(C|D) can be calculated as the product of $P(c_1|D)$ and $P(c_2|D)$ and so on for each c in the sequence of clicks C. Mathematically, this can be represented by $P(C|D) = \Pi_{j=1}^{i} P(c_j|D)$, where i is the number of iterations (see operation 1914) until the user commits to a selected document (see operation 1926).

Accordingly, as can be seen, P(C|D) can be dependent upon probabilities determined with respect to the sequence of documents $c_1, \ldots, c_i$ selected by the user up through the i'th iteration, and P(C|D) can be given by $\Pi_{j=1}^{i} P(c_j|D)$, where each $c_j$ is the document selected by the user in the j'th iteration In an implementation, this user model can be viewed as a refinement of a constraint-based method: in such a user model, if the user prefers A to B, this only means that it is more likely that d(D, A)<d(D, B) than d(D, B)<d(D, A), and, furthermore, if d(D, A) is much smaller than d(D, B), this is stronger evidence for D than when they are nearly equal.

The Prior (Prior Probability Score)

The Prior probability scores as calculated in operation 1910 may be uniform. Preferably, however, they are not. In the context of the system, "Prior" refers to what the system knows before the beginning of a user's iterative search session. Typically, a Prior probability score would be calculated for each document within an entire embedding space. In an implementation the Prior probability scores can then be determined for every document in a candidate list (i.e., a subset of the entire embedding space) in dependence on the Prior probability scores determined for the entire embedding space.

Implementations for Determining Prior Probability Scores

In an implementation in which the catalog (e.g., the candidate list) is a catalog of products for sale, and the user searches for a desired product D by selecting an image among an collection of candidate images presented to the user at each pass of the iteration, one source of non-uniform Prior information may be statistics about the previous sales of products. This implementation and the following implementations also hold true not just to products, but for documents, as described herein. One implementation of a system using sales data starts with statistics regarding the rate at which products had previously been sold. These statistics by themselves may not be sufficient, since products which had not yet been sold would never be presented to the user. Preferably, therefore, the sales statistics are hedged by "taking a step toward uniform" before formulating the Prior probability scores. This can be accomplished by adding equal amounts to the sales rate of all of the products. For example, if a catalog has three items, one (A) which has historically sold 2 per month, another (B) which has sold 3 per month, and a third which has sold 10 per month, this data can be smoothed by adding 1 to each, resulting in the following prior probabilities:

$P(A)=(2+1)/((2+1)+(3+1)+(10+1))$;

$P(B)=(3+1)/((2+1)+(3+1)+(10+1))$; and $P(C)=(10+1)/((2+1)+(3+1)+(10+1))$.

Other techniques can be used to smooth raw sales data before formulating the Prior probability scores. For example, in a case in which the system is used for multiple sessions per user, the system determines the Prior probability scores for a particular user in dependence upon the past shopping sessions of the same user. One implementation of the system calculates a mean embedding vector of the user's past purchases, and uses as a Prior probability score, a spherically symmetrical Gaussian centered at this mean. That is, a mean is calculated over the embedding vectors of all the products previously purchased by the user, and the Prior probability score is then based on a spherically symmetrical Gaussian centered at this mean. The width of this distribution is learned by matching the average squared distance between embeddings of products purchased by the user with the parameter describing the spread of the Gaussian.

For a user who has purchased only a small number of products, the average squared distance between embeddings of products purchased by the user may not be sufficient to determine an accurate spread parameter. To accommodate this case, a more robust value for the spread parameter can be obtained by sharing distance-between-purchases data from other users. Further refinements can be obtained by pooling users in various ways. In one implementation, the system pools users from a particular geographical region, thus formulating Prior probability scores, for example, regarding users from San Francisco that are different from the Prior probability scores associated with users from Kansas City. Many possibilities exist. For example, regional Prior probability scores can be blended with the Prior probability scores of the individual-user, with the relatively contributions of the two depending on how much data the system has for the individual user.

In another implementation the system can be given a seed product from which the user will begin searching. For example, a merchant may allow a user to browse the catalog before entering an iterative visual product discovery system. On finding an interesting product, the user enters the visual product discovery system by selecting a "more like this" option. In this case, the system develops Prior probability scores by assigning Prior probabilities that decay as a function of a distance (e.g., a distance based on a predetermined measure of dissimilarity in a vector space) from the product used as the entry point. One implementation can use a spherically symmetrical Gaussian decay. The spread of this Gaussian can be a tunable parameter.

In another implementation, Prior probability scores can be developed to capture pre-designated sub-category hierarchies of products. In this implementation, the sub-categories are pre-designated by identifying some products that are considered prototypical of the sub-category, or all products with, for example, a metadata tag for that sub-category could be chosen. The Prior probability scores can then be determined to be higher on the products in the sub-category, and to decay as a function of the distance from the products in the sub-category. An example of such Prior probability scores is a sum of spherical Gaussians centered at each of the identified products. This approach may serve at least two purposes. First, it may allow merchandisers to create new sub-categories, e.g., disco-boots, simply by identifying to the system a few prototypical examples of the sub-category. Second, it may allow the system to capture concepts that would traditionally be addressed with a faceted search.

Note that the calculation of the Prior probability scores in operation 1910 can also include a preliminary determination, based on circumstances, of which the several above-described strategies or variations thereof should be used to determine the Prior probability scores.

Shrinkage Toward a Prior

An iterative search tool such as that of FIG. 19 can be used to quickly find a desired document or product that the user already has in mind (e.g., a "directed search"), but it can also be used to aid the user in a browsing experience. If the user is browsing, the user's previous clicks are likely to be less consistent with a single product, or even a small region in the space into which the products were embedded. In order to accommodate browsing, FIG. 19 illustrates an optional "shrink toward the prior" operation 1920 after each user selection (click). One implementation of operation 1920 is as follows. If before the shrinkage operation, the system's estimate of the Posterior probability score that the user is interested in product x is $P(T=x|C)=\exp(\text{Posterior-score}(x))$, and the Prior probability score is $\exp(\text{Prior-score}(x))$, then the score after shrinkage is given by $\exp(\text{postshrink-score}(x))=\exp((1-r)\text{Posterior-score}(x)+r\,\text{Prior-score}(x))$, where r is a tunable smoothing parameter between 0 and 1.

Very roughly, this practice of shrinkage toward the prior results in de-emphasizing, or "forgetting", a fraction r of all of the previous clicks. The most recent click has only been exposed to this fractional forgetting once, but the second most recent click has gotten it twice, so that, roughly, only a fraction (1-r)*(1-r) of it is retained. Similarly, the fraction of an example retained decreases exponentially as the system looks further back in time. If the system looks further back than 1/r clicks into the past, the fraction of those clicks that are remembered starts to become very small, so this technique is akin to remembering the most recent 1/r clicks, except that it does this in a graded way that smoothly gives more favor to recent clicks, and it can be implemented in a memoryless way.

This approach may also be implemented in the form:

$\text{postshrink-score}(x)=(1-r)\text{Posterior-score}(x)+r\,\text{Prior-score}(x)$.

In general, past clicks are de-emphasized monotonically with decreasing recency, and preferably this is accomplished in a way that avoids having to remember a value representing such recency. Note that such an approach can be used with any scoring approach such as other scoring techniques discussed elsewhere herein, and this approach is not limited to the Bayesian approach. For example, the approach can be used where the score is a simple count of broken geometric constraints.

As can be seen, for an iteration i>1 the system can give: at least one of the documents $c_1, \ldots, c_{i-1}$ less influence on P(C|D) than the influence given by the system to document $c_i$ on P(C|D); at least one of the documents $c_1, \ldots, c_{i-1}$ less influence on P(C|D) than the influence given by the system to document $c_i$ on P(C|D); each of the documents $c_1, \ldots, c_{i-1}$ less influence on P(C|D) than the influence given by the system to document $c_i$ on P(C|D); each of the documents $c_1, \ldots, c_{i-1}$ less influence on P(C|D) than the influence given by the system to document $c_i$ on P(C|D); and each document $c_j$, j=1, . . . i, an influence on P(C|D) which is related monotonically the iteration number j in which document $c_j$ was selected by the user.

Thompson Sampling

Thompson sampling, often times referred to as probability matching, is a concept of introducing some randomness into selecting a group of items (see en.wikipedia.org/wiki/Thompson_sampling, incorporated herein by reference, accessed Dec. 8, 2016). In an iterative search method, it is usually important to confront what has become known as the exploration-exploitation tradeoff as discussed herein. The exploration-exploitation tradeoff essentially is an attempt to balance exploring new options while taking advantage of options that will exploit a user's previous selections. This can be done by choosing a wide enough range of products that the user's choice exposes a lot about their preferences versus choosing products that are likely to appeal to the user immediately. In order to address this tradeoff, an iterative search method such as that of FIG. 19 can use Thompson sampling in its presentation of candidate documents to the user in each pass (i.e., in either or both of operations 1912 and 1922).

In an implementation, instead of choosing the top N-scoring documents to display (with scores determined in operations 1910, 1918 and/or 1920), a screen of documents is chosen to show to the user by repeatedly choosing a document at random, where the probability of choosing a document is weighted to an estimate of the probability that the document is the desired document resulting from the application of Bayes' rule and the shrinkage (e.g., the Posterior). Thompson sampling progressively enriches the options presented to the user for options that are likely to be of interest to the user. On the other hand, it continues to present the user with opportunities to express preferences for documents that information up to a given point in time suggests might not be of interest. Choosing documents with a probability equal to the probability that they are of interest strikes a delicate balance between these two. In the end, once a certain type of product can be eliminated with high probability, it becomes very unlikely to be presented to the user.

Shrinkage of the Candidate List

In some implementations described herein which do not incorporate Bayes' rule, the system would eliminate some products from consideration after each click. Thus after k clicks, the fraction of the catalog remaining is $s^k$, where s is a tunable parameter. The Bayes system, too, can implement an elimination of some documents, for example by effectively setting Posterior probability scores of the eliminated documents to 0. Eliminated documents can include, for example, documents that have been presented to the user and that have not been selected.

Generalized Thompson Sampling

Generalized Thompson sampling provides for choosing documents at random from a distribution that is not necessarily equal to the Posterior probability scores, but that is derived from it, gives the designer of the iterative search system a richer toolbox from which to choose an exploration-exploitation tradeoff. Analogously to the candidate list shrinkage, a tunable method can be used that concentrates the Posterior probability scores to increase extents before sampling from it. In one implementation, after k clicks, the system chooses product x with a probability proportional to $P(x)^{1+a\,k}$, where P(x) is the Posterior probability score and a is a parameter that gives a handle on the exploration/exploitation evolution. This is akin to the shrinkage of the candidate list mentioned earlier, but graded. A richer implementation has two parameters a and b: $P(x)^{b+a\,k}$. Other analogous implementations will be apparent to a person of ordinary skill in the art.

Weighted K-Medoids

Some implementations described in other sections herein, do not incorporate Bayes' rule, but rather apply k-medoids clustering to choose collections of documents to be presented to the user. K-medoids clustering chooses each next candidate for the collection by minimizing the sum of the distances of the embeddings of the documents in a catalog to a closest embedding of a document already included in the collection. Various k-medoid algorithms, where the weighting w is always 1 can be found at en.wikipedia.org/wiki/K-medoids, previously incorporated herein by reference. Further, various types of weightings can be applied to the k-medoids algorithms, (e.g., see cran.r-project.org/web/packages/WeightedCluster/WeightedCluster.pdf, incorporated herein by reference and accessed on Dec. 8, 2016).

This weighted k-medoid technique of determining the next collection of documents can be applied to the above-described Bayesian techniques using the Posterior probability scores as weights. For example, using a distribution of the Posterior probability scores, the Bayesian system can assign a weight to each document in dependence on a corresponding Posterior probability score of that document. Accordingly, the Bayesian system can minimize a weighted average of distances of the documents of the embedding space or the candidate list to the closest document already included in the collection. Specifically, the Bayesian system can use weighted k-medoids to determine a collection of Ni>1 documents to present to the user independence on the assigned weights, the Posterior probability scores and a distance from each given document to a closest document in, for example a candidate list, such that collection of Ni>1 documents is a collection having a lowest weighted average of distances to closest documents that are weighted based on the corresponding weights and Posterior probability scores.

Using weighted k-medoids allows the system to choose representatives of difference kinds of documents, but in a way that assigns higher priority to finding representatives similar to documents that are likely to be of interest to the user. This technique enriches the chosen collection of documents with more content that is more likely to be of interest to the user. Aside from speeding the user's search, this technique also makes the next collection of documents presented toward the user correspond more clearly to the previous click action, which provides satisfying immediate gratification to the user and may improve engagement.

For example, an implementation of weighted-k medoids is described such that, given a set X of vectors and a weight w(x) for each x that is an element of X, output a subset S of X of size k that minimizes $$\sum_{x \in X} w(x) \min_{s \in S} d(x, s),$$

where d(x, s) is the distance between x and s. This can be achieved by implementing an algorithm that, for a random initial set S and for long as an improvement is found, for each s in the initial set S, (i) defines a cluster $C_s$ to consist of those $x \in X$ that are closest to s, and (ii) replaces s with the member s' of $C_s$ which minimizes $\Sigma_{x \in C_s} w(x) d(s',x)$. Because $\Sigma_{x \in C_s} w(x) d(s',x)$ is evaluated many times for different candidate centers s', this can be slow. However, speed can be improved at a cost of a slight degradation in the achieved value of $\Sigma_{x \in X} w(x)$ $$\min_{s \in S}$$

d(x,s) by reducing a number of candidated that are tried. One implementation is to only try the s' that minimizes the distance from the center of $C_s$, which is $$\frac{1}{|C_s|} \sum_{x \in C_s} x'.$$

Another implementation is to try a few choices for s' that are closest to the center. Moreover, another implementation to use $$\sum_{x \in X} w(x) \min_{s \in S} d(x, s),$$

except replace X with a smaller subset that is chosen at random.

Minimizing Number of Clicks Using Multiple Thompson Samples

Another alternative to Thompson sampling and weighted k-medoids for operation 1922 is an implementation that minimizes an estimate of an average number Y of clicks needed before the desired document is in the screen presented to the user. The probability that the desired document is in the chosen screen (i.e., the probability that the average number of Y clicks equal 0) can be calculated using the Posterior probability scores. For example, a long-term effect of choosing a number of clicks before the desired document is found (i.e., the average value of Y given that Y>0) by using a hypothesis that, at any given time, the average number of clicks needed is proportional to the entropy of a Posterior probability score.

Using the above-described User Model and the Posterior probability scores, this can be achieved for a screen SC to estimate a probability that each document s in screen SC will be clicked, and then, for each document s, estimate a future Posterior probability score. The average future number of clicks is the average value of the entropy of the future Posterior probability score distributions. This implementation can be applied to multiple candidate screens SC that are generated using Thompson sampling, instead of just sampling once and then outputting the result of a single Thompson sampling as the collection of candidate documents. This way, the system is able to consider multiple Thompson samplings and utilize a screen SC having the lowest estimated average number of clicks. The entropy determined for the future Posterior probability score can be an estimate. The formula for the entropy of a distribution $(p_1, \ldots, p_n)$ is $$\sum_{i=1}^{n} p_i \log \frac{1}{p_i}.$$

This can be estimated by taking the average of log $1/p_j$ for several j's chosen randomly using $(p_1, \ldots, p_n)$. Again, for each candidate screen SC, of which the documents are identified using Thompson sampling, this implementation estimates the average number of clicks needed to find the desired document. The candidate screen SC having the lowest average number of clicks is selected as the next collection of documents to present to the user.

If there is a significant probability that the desired document is in the candidate screen SC, by taking into account current Posterior probability scores and estimated future Posterior probability scores, then the average number of clicks is 0. If there is not a significant probability that the desired document in the candidate screen SC, then the average number of clicks for the candidate screen SC is represented by sum_{s in S}=Estimated_P(total number of clicks needed|s clicked first), given the P(s is clicked first). This is based on a working hypothesis that the Estimated_P (total number of clicks need|s clicked first) is proportional to the entropy of the Posterior probability score resulting from clicking on s. The entropy of the Posterior probability score can be used as a proxy for determining the number of clicks for a particular document. Further, in an implementation, certain clicks can be weighted when determining the average number of clicks for the candidate screen SC.

Scaling Bayesian Techniques for Choosing and Presenting Next Collection of Documents Using a Neighbor Graph and Markov Chain Monte-Carlo Walks In the above-described Bayesian Techniques for Choosing and Presenting Collections of Documents, Thompson sampling or a generalized form of Thompson sampling can be used to choose and present the documents to include in the initial collection of documents (see operation 1912 of FIG. 19) and the next collection(s) of documents (see operations 1922 and 1924 of FIG. 19). As described above, the Bayesian techniques, at a high level, combined with Thompson sampling, involve the following two major steps for identifying the next collection of documents:

for each document D in the candidate list of documents included in an embedding space, estimate a probability P(D|C) that the user is interested in document D; and then populate the next collection by choosing documents randomly, so that the probability that document D is chosen is P(D|C) (i.e., repeatedly choosing a document at random, where the probability of choosing a document is weighted to an estimate of the probability that the document is the desired document resulting from the application of Bayes' rule).

As described above, C is the user's sequence of past clicks within a session.

If the candidate list is not too large, then the system can evaluate probabilities for all documents in the candidate list and/or embedding space. However, when the candidate list is larger it is too time consuming and processor intensive to evaluate the probabilities for every document in the candidate list. In such a situation, it is often better to sample documents from the candidate list by (i) creating a Neighbor Graph G and using a close approximation of P(D|C) and then (ii) taking a walk through the Neighbor Graph G using Markov-Chain Monte Carlo (see en.wikipedia.org/wiki/Markov_chain_Monte_Carlo, visited Mar. 7, 2016 and incorporated herein by reference). The Markov-Chain Monte Carlo concept can be implemented in various different ways. One particular implementation is Metropolis-Hasting sampling (en.wikipedia.org/wiki/Metropolis%-E2%80%93Hastings_algorithm, visited Mar. 7, 2016 and incorporated herein by reference). These techniques are described in detail below with reference to FIGS. 20-25.

Generally, Metropolis-Hastings sampling is a technique for choosing a random element of a set X (e.g., choosing a random document of a candidate list X) using a distribution that is close to some distribution Q. This Metropolis-Hastings sampling technique never computes all of the probabilities of elements of X. Instead, it generates a sequence $x_1, x_2, \ldots$. The first draw $x_1$ (e.g., selection of document $x_1$) might come from a distribution that is quite dissimilar to Q, but as this sampling technique progresses, the distribution from which element x, is drawn gets increasingly close to Q. Metropolis-Hastings sampling can be applied to the problems addressed herein by considering X to be the candidate list and Q to be the (not necessarily entirely known) Posterior probability distribution of the candidate list. In very broad terms, after each i'th candidate document is chosen, the idea is to generate $x_{i+1}$ by repeatedly:

generating a candidate $x^*$ using $x_i$ ($x^*$ is generated using a "proposal distribution" depending on $x_i$, which is further described with reference to FIG. 25) and if $Q(x^*) > Q(x_i)$, setting $x_{i+1} = x^*$, thereby "accepting" $x^*$, and otherwise with probability $Q(x^*)/Q(x_i)$, accepting $x^*$ anyway, and with probability $[1-Q(*)/Q(x_i)]$, generating a new $x^*$ and trying again.

The candidates $x^*$ can be chosen according to a "neighborhood" (in the Neighbor Graph G) around $x_i$. For example, in some implementations, the proposal distribution used to choose $x^*$ might be a Gaussian centered at $x_i$. However, for a visual product discovery system, the distribution Q is discrete, not continuous. Thus $x^*$'s are limited to being members of the candidate list.

An implementation of Metropolis-Hastings performs a walk through the Neighbor Graph G using the same Neighbor Graph G for all collections offered to the user or users in all sessions. It is desirable, though, to avoid showing the same document in different collections during the same session. In one implementation, this is achieved by forcing a Posterior probability of a document to 0 after it has been seen by the user (e.g., included in a collection of documents presented to the user). All proposals to walk to this document, in the Metropolis-Hastings walks, will then fail. If this occurs with all neighbors of a particular document, then it becomes possible that a walk gets stuck at that document. Different embodiments can handle this "stuck" situation differently. As one example, the situation is handled by jumping to a random vertex when it happens. The likelihood of this situation occurring reduces when the Neighbor Graph G includes many different tours through the candidate list (e.g., K is large in the flowchart of FIG. 21).

As mentioned above, in an implementation, candidate documents from the candidate list are chosen using a Neighbor Graph G, which can be calculated using all documents in the candidate list, which is a at least a portion of the documents in the embedding space. Each vertex of the Neighbor Graph G, as described is further detail below, represents a document in the candidate list, and an edge is interpreted as indicating that two vertices (documents) are neighbors. The edge is, in other words, a path that can be traveled on a walk from one document (vertex) to another neighboring document (vertex). The vertices are neighbors in the sense that the distance between their corresponding documents in the candidate list is small, as compared to distances between other documents in the candidate list. Ideally the neighbors of a document in the Neighbor Graph G are strictly the nearest neighbors in the candidate list, but this technique allows some relaxation of that ideal in exchange for quicker runtime. Once the Neighbor Graph G is created, a uniform random neighbor is used as the proposal distribution above. Further, once the Neighbor Graph G is created, then the Markov Chain Monte-Carlo sampling, or variations thereof, can be efficiently implemented.

In an implementation, one condition for ensuring that the Metropolis-Hastings algorithm converges to Q is that, for any two members u, v of X, the probability that the algorithm proposes v when it is at u, is the same as the probability that it proposes u when it is at v. By using the Neighbor Graph G, the Metropolis-Hastings technique accomplishes this by ensuring that each vertex has the same number of neighbors. Another condition for Metropolis-Hastings to converge is that, informally, any member of X can reach another member of X through a series of proposals. Put another way, if $x_1, x_2, \ldots$ is viewed as a walk through X (e.g., a walk through Neighbor Graph G), this walk can get from any vertex of X to any other vertex of X. In fact, for Metropolis-Hastings to converge quickly, it should be easy to get from one vertex to another. Example implementations of scaling Bayesian techniques are described below with reference to FIGS. 20-24.

Figure 20:
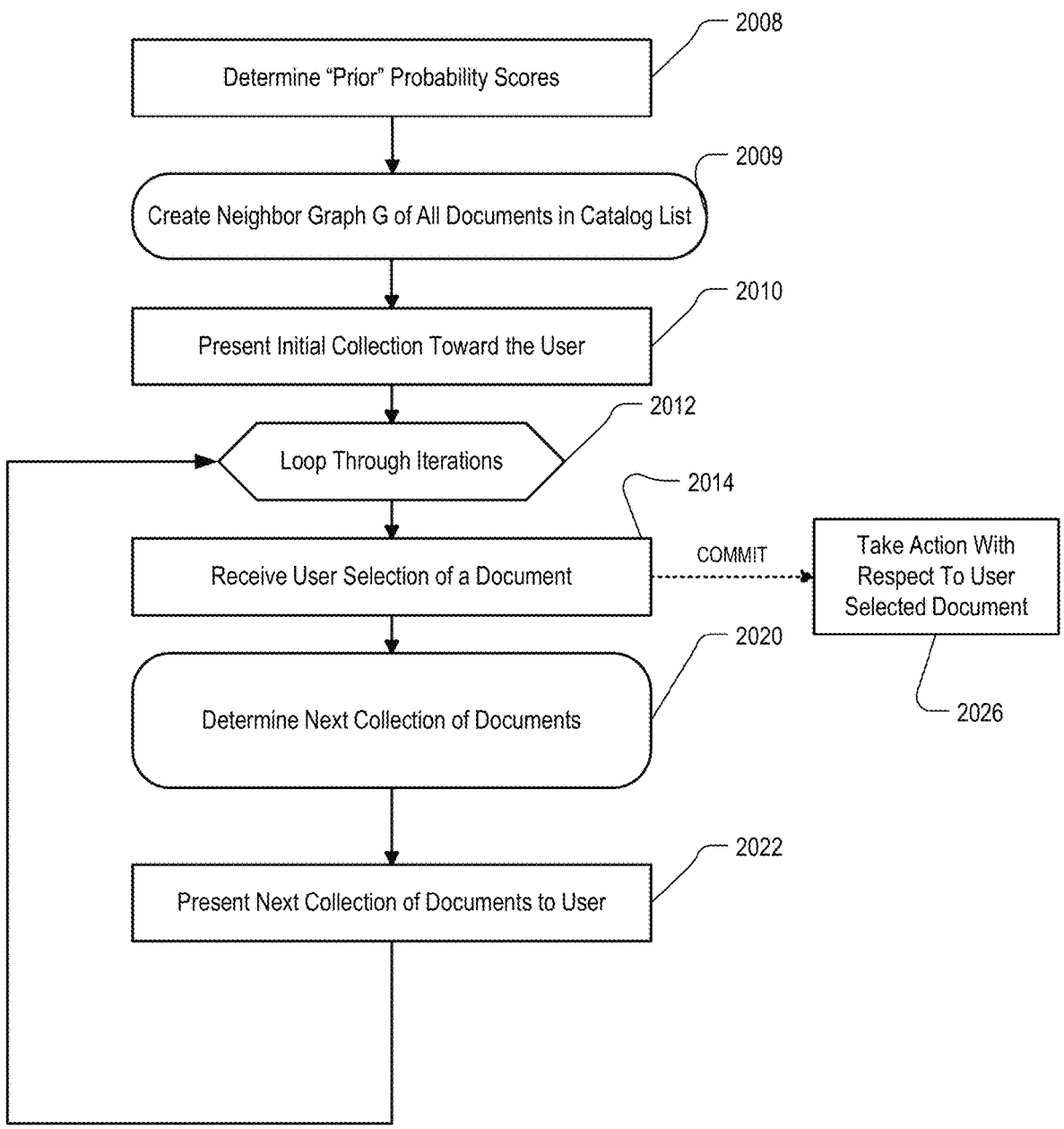
FIG. 20 is a flowchart illustrating scaling Bayesian techniques for choosing and presenting collections of documents using Neighbor Graphs and Markov Chain Monto according to an implementation of the present disclosure.

FIG. 20 is a flowchart illustrating scaling Bayesian techniques for choosing and presenting collections of documents using Neighbor Graphs and Markov Chain Monte-Carlo according to an implementation of the present disclosure. Referring to FIG. 20, a high-level flowchart for scaling Bayesian techniques is illustrated, where operations 2008, 2010, 2012, 2014, 2022 and 2026 are similar to operations 1910, 1912, 1914, 1916, 1924 and 1926 of FIG. 19, respectively.

In operation 2008 of FIG. 20, the Prior probability scores are determined for use in the iterative search as discussed above with respect to operation 1910 of FIG. 19.

In operation 2009, a Neighbor Graph G is created of all documents in the candidate list. The creation of the Neighbor Graph G is further described below with reference to FIGS. 21-22D.

In operation 2010 of FIG. 20, the user is presented with an initial collection of documents, in a similar manner as discussed above with respect to operation 1912 of FIG. 19.

Operations 2008, 2009 and 2010 may occur in different sequences in different implementations.

In operation 2012 of FIG. 20, the system begins a loop through the iterative search process.

In operation 2014 of FIG. 20, the system receives the user's selection of a document from a current collection as discussed above with respect to operation 1916 of FIG. 19, and if the user indicates satisfaction with the document that he or she is selecting, then in operation 2026, action is taken with respect to the selected document, for example by performing any of operations 1526, 1626, 1726, or 1826 of respective FIGS. 15, 16, 17 and 18.

Operations 1918, 1920 and 1922 of FIG. 19 are replaced with operation 2020 in FIG. 20. Specifically, at operation 2020, the system determines the next collection of images to present toward the user. Various implementations of operation 2020 are described in more detail below with reference to FIG. 25.

In operation 2022 of FIG. 20, the determined next collection of documents is presented toward the user as discussed with respect to operation 1924 of FIG. 19. The iteration then returns to operation 2012 for the user to perform the next pass of the iterative search.

Figure 21:
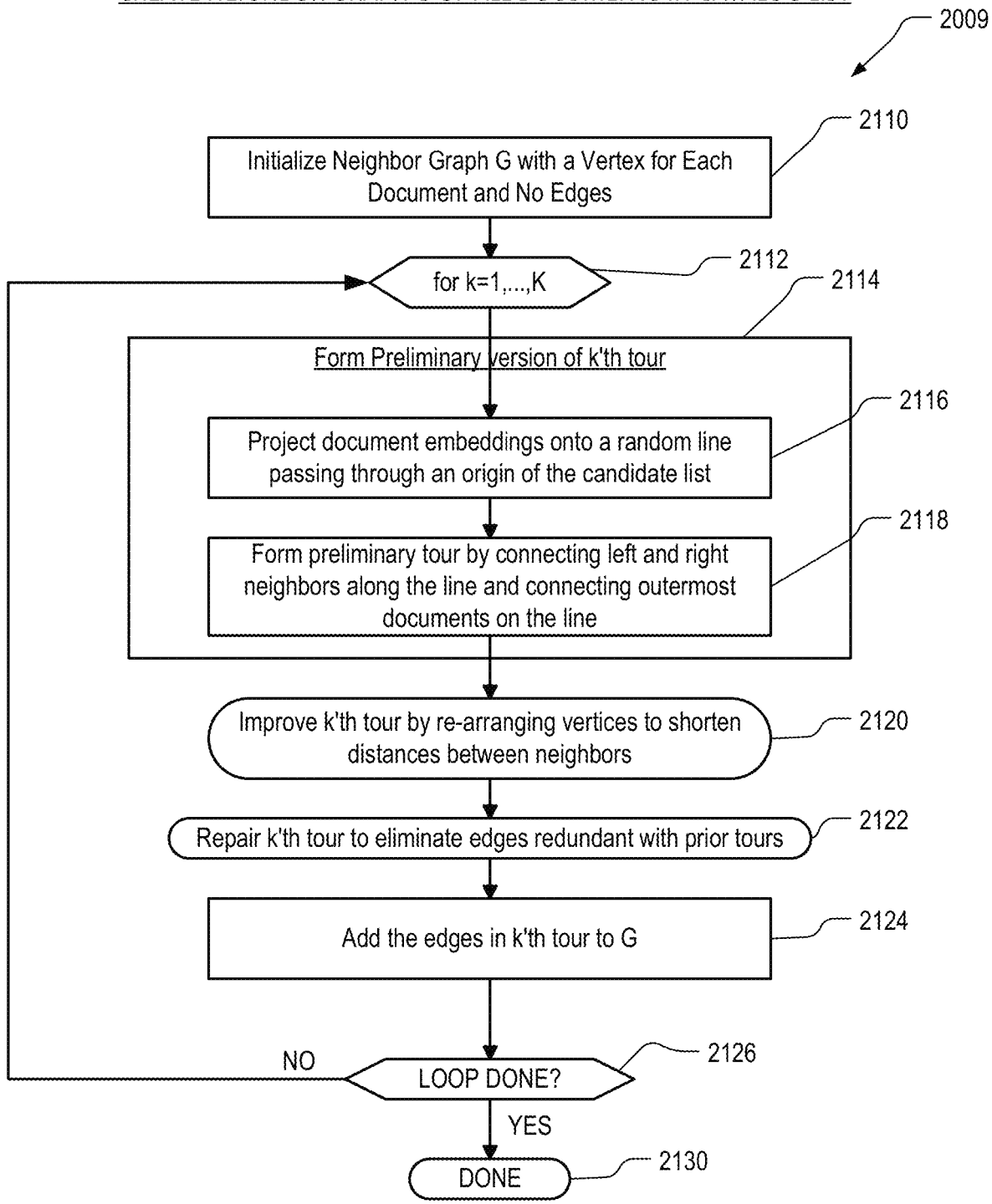
FIG. 21 is a flowchart illustrating a creation of a Neighbor Graph of all documents in a candidate list according to an implementation of the present disclosure.

FIG. 21 is a flowchart illustrating a creation of a Neighbor Graph of all documents in a candidate list according to an implementation of the present disclosure. Specifically, FIG. 21 is a flowchart that provides additional details for operation 2009 of FIG. 20, regarding the creation of the Neighbor Graph G of all documents in the candidate list. In an implementation, the Neighbor Graph G is created in the stages discussed below.

In operation 2110 of FIG. 21, a Neighbor Graph G is initialized with a vertex for each document in the candidate list. This initialized version of the Neighbor Graph G does not include any edges (paths) connecting the vertices. The edges (paths) are inserted between the vertices at a later point.

In an implementation, the Neighbor Graph G can be a list of all the documents of the candidate list, with each document having 2K fields to identify its neighbors as determined by K tours discussed below. These neighbors are usually but not always the nearest 2K neighbors in embedding space, and the system is tolerant of any that are not. Initially, all of the fields identifying neighbors are empty. K is a configurable parameter. Each vertex of the Neighbor Graph G will eventually be connected by edges to 2K other vertices. The process of creating the Neighbor Graph G using the candidate list is further illustrated in FIGS. 22A-22D.

Figure 22A:
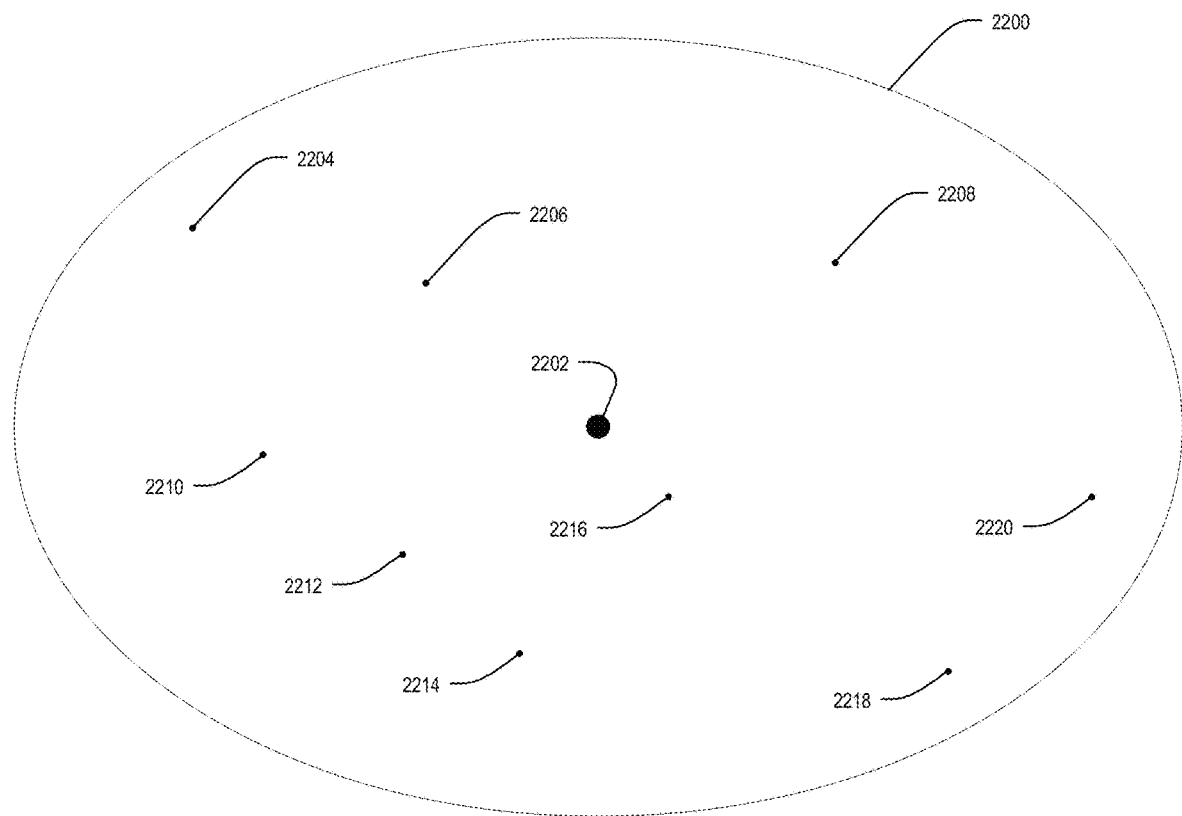
FIGS. 22A, 22B, 22C and 22D illustrate the creation of the Neighbor Graph in a candidate list from a perspective of a two-dimensional embedding space.

Referring to FIG. 22A, a candidate list 2200 is illustrated as including documents 2204, 2206, 2208, 2210, 2212, 2214, 2216, 2218 and 2220 and an origin 2202. The Neighbor Graph G is initialized to include a vertex for each of the documents 2204, 2206, 2208, 2210, 2212, 2214, 2216, 2218 and 2220. Note that candidate list 2200 is represented in FIG. 22A in a two-dimensional embedding space for ease of illustration and explanation. In many implementations the embedding space is a multi-dimensional space.

In operation 2112 of FIG. 21, a loop is begun to create K tours. For purposes of this description, the tours are numbered k=1, . . . , K. In each stage, one tour is completed and then edges are added to Neighbor Graph G, such that in each tour every document of the candidate list is traversed.

In operation 2114 a preliminary version of the k'th tour is formed using the candidate list 2200. The preliminary tour can be formed in a number of different ways. A goal is to form a tour that preferably has neighbors as near each other as possible in the embedding space. The resulting tours need not be perfect, and the preliminary tours can be even less perfect if tour improvement and repair steps such as those described below are implemented.

In an implementation, operation 2116 forms the preliminary version of the k'th tour by projecting the document embeddings onto a k'th random line which passes through an origin of the candidate list 2200, and operation 2118 forms the preliminary version of the k'th tour by connecting left and right neighbors along the line with edges and then wrapping back around to a beginning of the line.

This concept of making projections onto random line which passes through the origin is sometimes referred to as "random projections" (en.wikipedia.org/wiki/Random_projection, visited Mar. 7, 2016, and incorporated herein by reference). This is a standard technique for quickly finding pairs of similar elements (e.g., documents in the candidate list). In one implementation, this technique generates the k'th random line by generating a direction u by sampling from a spherically symmetrical Gaussian, and then drawing an imaginary line from the origin through u. The projections are then accomplished by taking the dot product of each embedding with u.

Figure 22B:
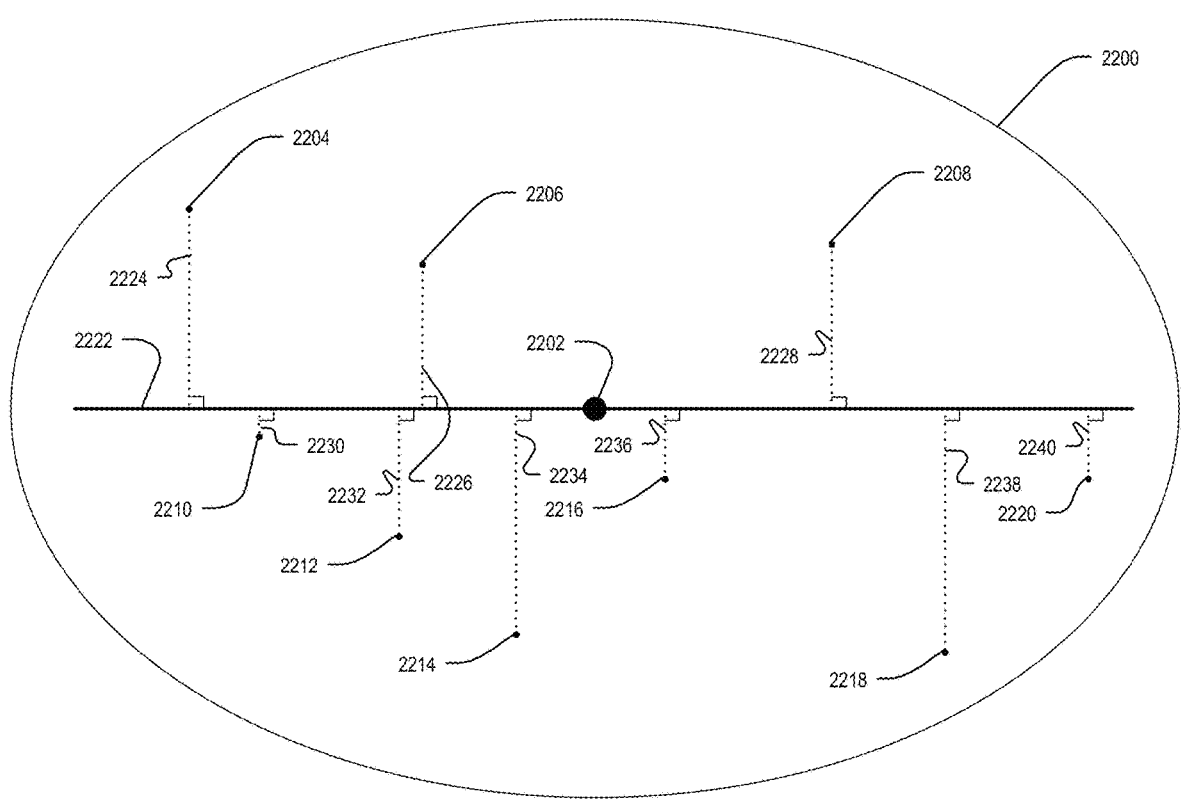
Figure 22C:
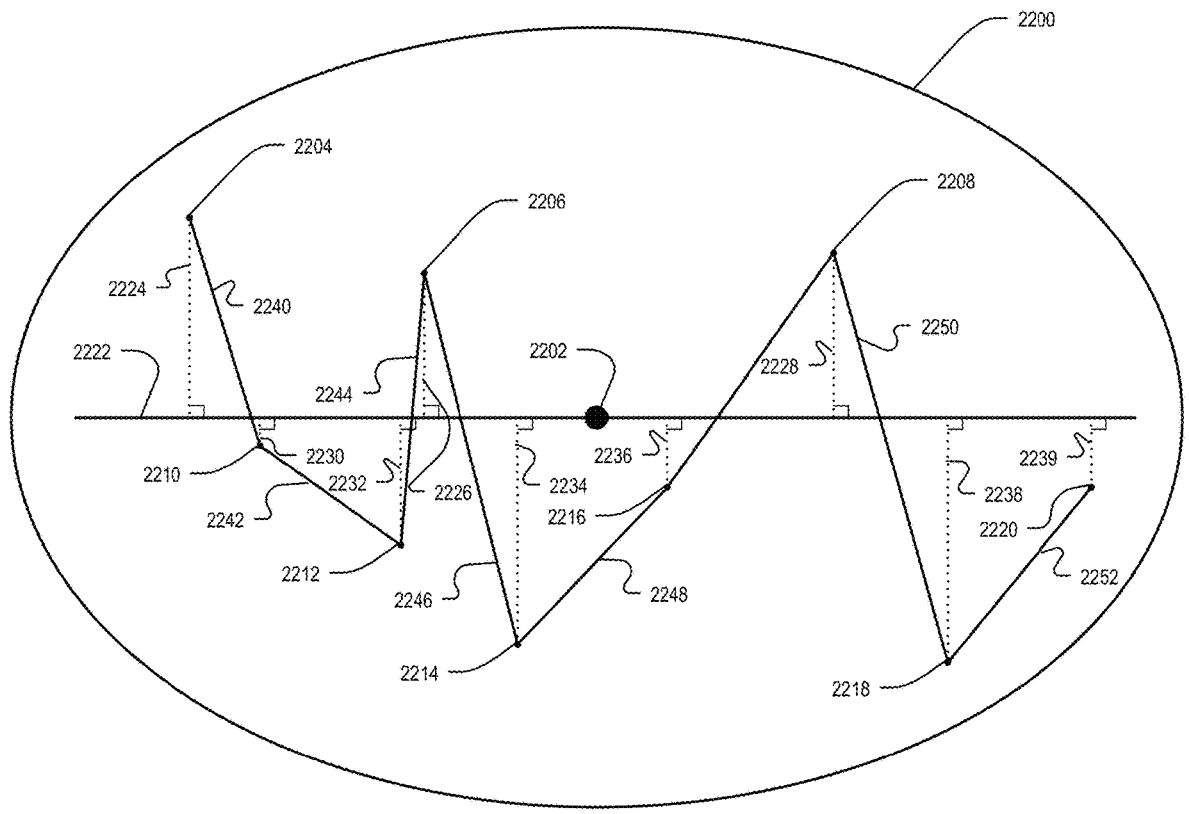
Figure 22D:
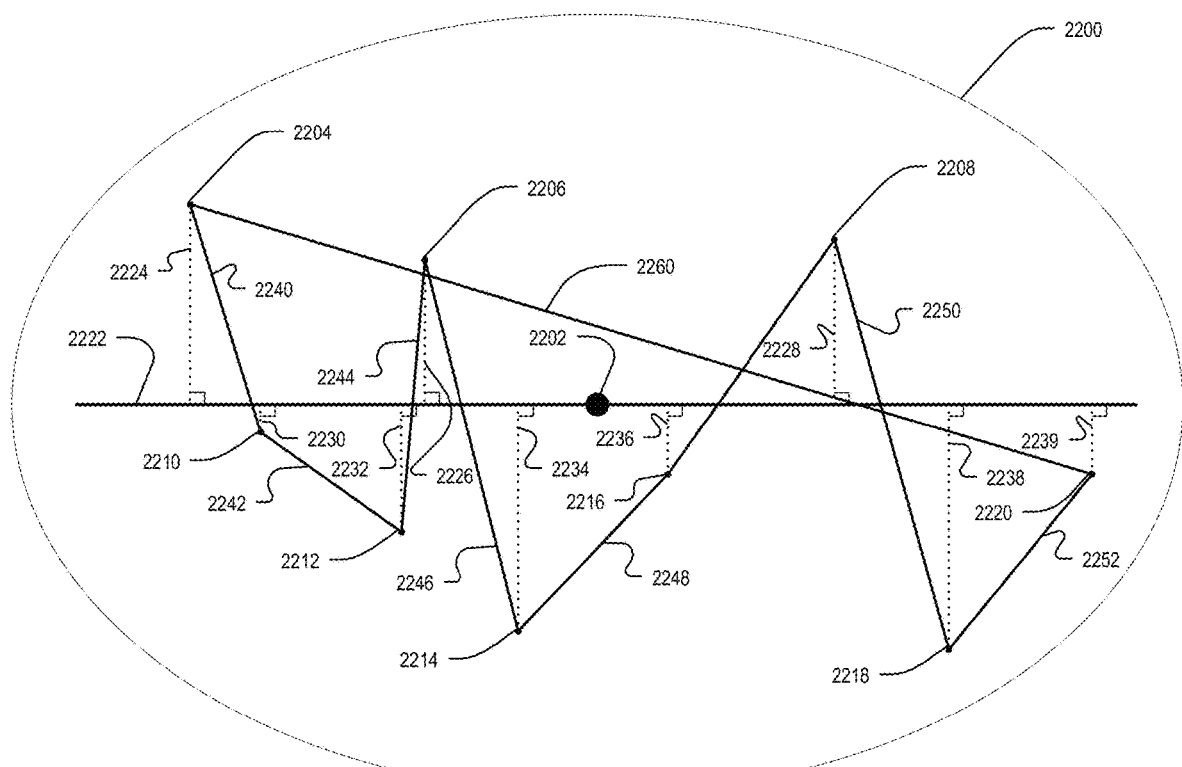

The preliminary version of the k'th tour is illustrated in FIGS. 22B, 22C and 22D. Referring to FIG. 22B, the k'th line 2222 with random orientation and which passes through the origin 2202 of the candidate list 2200 is illustrated. The perpendicular projections are formed on the k'th line 2222 via paths 2224, 2226, 2228, 2230, 2232, 2234, 2236, 2238 and 2239 illustrated therein. Specifically, the projections from the document embeddings of the candidate list 2200 are located on the k'th line 2222 at a point where the paths 2224, 2226, 2228, 2230, 2232, 2234, 2236, 2238 and 2239, as respectively perpendicularly projected from documents 2204, 2206, 2206, 2210, 2212, 2214, 2216, 2218 and 2220, meet the k'th line 2222.

Referring to FIG. 22C, the preliminary version of the k'th tour starts at document 2204 because the projection onto the k'th line 2222 from document 2204 is, for example, the first (leftmost) projection onto the k'th line 2222. Then, the k'th tour continues to the next document 2210 whose projection is next long the k'th line 2222. This "walk" from document 2204 to document 2210 creates an edge 2240. The walk then continues (i) from document 2210 to document 2212 to create edge 2242, (ii) from document 2212 to document 2206 to create edge 2244, (iii) from document 2206 to document 2214 to create edge 2246, (iv) from document 2214 to document 2208 to create edge 2248, (v) from document 2208 to document 2218 to create edge 2250, and (vi) from document 2218 to document 2220 to create edge 2252.

Referring to FIG. 22D, the preliminary version of the k'th tour then continues from document 2220, which forms one of the two outermost projections on the k'th line 2222, back to the starting document 2204, which forms the other of the two outermost projections on the k'th line 2222, to create edge 2260. Edge 2260 is the edge created by wrapping back around from the end to the beginning. Now that each of the documents has been touched by the walk, each of the documents has two edges connected thereto. Note that the k'th tour need not start on the leftmost projection, but can also start at the rightmost projection or at a middle projection. The k'th tour need only start at some document and continue to an outermost projection on the k'th line 2222 and then wrap back around to the other outermost projection on the k'th line and then continue until each of the documents has been touched. Now the preliminary version of the k'th tour is complete.

It still remains possible that two documents (vertices) that are next to each other in the Neighbor Graph G are actually much farther apart in the multiple dimensions of the embedding space. For example, the projections corresponding to documents 2212 and 2206 are very near each other on the random k'th line 2222, but documents 2212 and 2206 are actually very far from each other in the embedding space. Further, document 2214 is actually closer to document 2212 in the embedding space than document 2206 is. In order to improve the Neighbor Graph G as a representation of distances in embedding space, the preliminary tour can be iteratively improved and repaired.

Accordingly, after the preliminary version of the k'th tour is formed in operation 2114, then in operation 2120 the preliminary version of the k'th tour can optionally be "improved" to reduce distances between neighboring documents, and in operation 2122 the k'th tour can optionally be "repaired" to eliminate edges redundant with prior tours. Operation 2120 helps to ensure that documents inserted into the next collection to be presented toward the user, really do have a high likelihood of being the user's desired target document given the user's prior sequence of selection clicks. However, it will be appreciated that operation 2120 can be omitted in an implementation in which strict adherence to that goal is not essential. Operation 2122 is important in order to ensure that the Metropolis-Hastings algorithm converges to Q, as previously explained. However, as with operation 2120, it will be appreciated that operation 2122 can be omitted in an embodiment in which certainty of such convergence is not essential.

After the preliminary k'th tour has been formed in operation 2114, and improved and/or repaired in operations 2120 and/or 2122, then in operation 2124 all of the edges of the k'th tour are inserted into Neighbor Graph G. In a list implementation of the Neighbor Graph G, the edges inserted in operation 2124 for a given one of the documents in the preliminary k'th tour can be transferred into the Neighbor Graph G by inserting identifications of the two neighbors, into two of the neighbor fields for the given document.

In operation 2126 the process returns to operation 2112 for creating the next tour. If all K tours have been completed (or another termination condition has been reached), then in operation 2130 the creation of the Neighbor Graph G (operation 2009) is complete. In an implementation, this same Neighbor Graph G is used for all screens of all user sessions and need not be updated unless the catalog (e.g., candidate list) changes.

Figure 23:
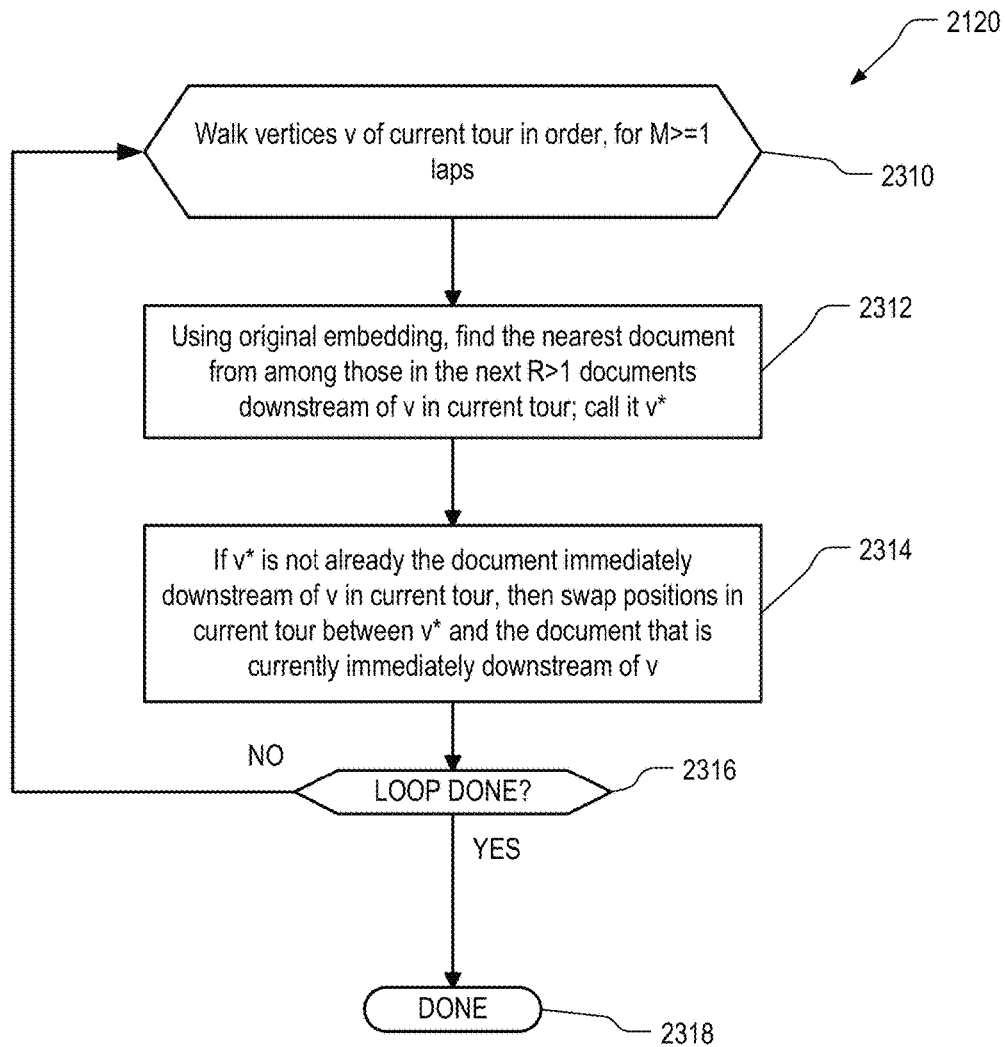
FIG. 23 is a flowchart illustrating improving a k'th tour in a Neighbor Graph by re-arranging vertices to shorten distances between neighbors in a Neighbor Graph according to an implementation of the present disclosure.

FIG. 23 is a flowchart illustrating an implementation of operation 2120 for improving a k'th tour in a Neighbor Graph by re-arranging vertices to shorten distances in the embedding space between neighbors in the Neighbor Graph according to an implementation of the present disclosure.

In general the preliminary k'th tour is iteratively improved by repeating the following steps:
choose a document u;
look at the some number R of documents "downstream" of u in the current tour; and
whichever document v of these is closest to u in the embedding space, v is swapped in the tour with the document immediately downstream of u.

Both the number of passes in the above iteration, and the number of documents R to look downstream in each pass, are configurable values. At the end of the final pass, the tour is walked in its then-current sequence, and an edge is inserted into the graph between the vertices corresponding to each sequential pair of documents in the tour. A final edge is inserted between the vertices corresponding to the first and last documents on the line.

As can be seen, identification of a desired document may include providing, accessibly to a computer system, a database identifying a catalog of documents in an embedding space, calculating a Prior probability score for each document of a candidate list including at least a portion of the documents of the embedding space. The Prior probability score indicates a preliminary probability, for each particular document of the candidate list, that the particular document is the desired document. A computer system identifies toward the user an initial (i=0) collection of N0>1 candidate documents from the candidate list in dependence on the calculated Prior probability scores for the documents in the candidate list, the initial collection of candidate documents having fewer documents than the candidate list. For each i'th iteration in a plurality of iterations, beginning with a first iteration (i=1) and in response to user selection of an i'th selected document from the (i−1)'th collection of candidate documents, the system identifies toward the user an i'th collection of Ni>1 candidate documents from the candidate list in dependence on Posterior probability scores for at least a portion of the documents in the candidate list, Ni being smaller than the number of documents in the candidate list, the Posterior probability score for each given document D being given by $P(C|D)P(D)$, where C is the sequence of documents $c_1, \ldots c_i$ selected by the user up through the i'th iteration, where $P(C|D)$ is the system's view of the probability of C if the desired document is D and where $P(D)$ is the calculated Prior probability score for document D.

Additionally, as can be seen, the identification may include initializing a neighbor graph G to include a corresponding vertex for each document of the candidate list; and developing a plurality of tours each touching all the vertices in the neighbor graph G corresponding to documents of the candidate list, including, for each k'th tour of the plurality of tours, beginning with a first (k=1) tour: determining a perpendicular projection of each document of the candidate list onto a k'th randomly oriented projection line that passes through an origin of the embedding space, inserting into the neighbor graph G an edge from each particular vertex of G, to all vertices of the particular vertex whose projections onto the k'th line neighbor the projection of the particular vertex onto the k'th line, and inserting into the neighbor graph G an edge between the vertices corresponding to two documents of the candidate list having the outermost projections onto the k'th line, wherein identifying toward the user an i'th collection of candidate documents comprises inserting documents into the i'th collection of candidate documents in dependence on a walk through the neighbor graph G beginning with the vertex in the graph corresponding to the i'th selected document and guided by Posterior probability scores calculated for documents corresponding to vertices encountered during the walk.

Further, as can be seen, for each k'th tour, an edge can be inserted from each vertex of the neighbor graph G to each of two other vertices of the neighbor graph G; and the identification may include taking action in response to user behavior identifying, a selected document in one of the collections of documents, as the desired document, as well as after each i'th iteration of the plurality of iterations, removing a predetermined fraction of vertices and connecting edges from the neighbor graph G.

Specifically, an implementation of the tour improvement process is illustrated in FIG. 23, which details operation 2120 of FIG. 21. Other ways to improve the k'th tour will be apparent to a person of ordinary skill in the technology disclosed herein. Depending on the implementation, the specific goal may be to minimize the total length of the tour, or to minimize the average distance between neighbors in the tour, or to satisfy some other length minimization criterion. In an implementation, however, it is not essential that the specific goal ever be fully realized.

Referring to FIG. 23, in operation 2310, a loop begins to walk the vertices v of the k'th tour in order. The loop can continue for some configurable number M≥1 laps of the tour, or in another implementation the loop can terminate when the number of swaps made in a loop (operation 2314) falls to zero or to some epsilon greater than zero. Other termination criteria will be apparent to a person of ordinary skill in the technology disclosed herein.

In operation 2312, using the original embedding of the candidate list, the system finds the vertex v* corresponding to the nearest document from among those in the next R>1 documents downstream of vertex v in the current tour. As previously mentioned, R is a configurable value.

In operation 2314, if v* is not already the vertex (document) immediately downstream of v in the current tour, then this implementation swaps the positions in the current tour between v* and the vertex (document) that is currently immediately downstream of v. The swap is executed by deleting and re-adding edges to the tour. For example, if the tour has vertices in sequence $x_0$, $x_1$, $x_2$, $x_3$, where $x_0$ is the current vertex and v* has been determined to be vertex x2, then the sequence of documents $x_1$ and $x_2$ are swapped by removing the edges from $x_0$ to $x_1$, $x_1$ to $x_2$ and $x_2$ to $x_3$, and adding edges from $x_0$ to $x_2$, $x_2$ to $x_1$ and $x_1$ to $x_3$.

In operation 2316, if the loop is not yet done, then the implementation returns to operation 2310 to consider the next vertex of the current tour; this may be a vertex just moved from a position downstream. Once the loop of operation 2310 is complete, then in operation 2318 the improvement process of the k'th tour is considered complete. It can be seen that the process of FIG. 23 gradually replaces longer edges with shorter ones. Other processes can be used either instead of or additionally to the process illustrated in FIG. 23 to improve the tour if desired in a particular implementation.

As can be seen, the improvement process may include the database identifying a distance between each pair of the documents in the embedding space and the distance corresponds to a predetermined measure of dissimilarity between the pair of documents. Developing of a plurality of tours comprises, for each k'th tour in the plurality of tours: walking the vertices of the k'th tour for a plurality of laps; and at each current vertex encountered in the walk, determining whether the document corresponding to the next vertex of the tour is farther away in the embedding space from the document corresponding to the current vertex than the document corresponding to a vertex further downstream in the tour is from the document corresponding to the current vertex, and if so then swapping the next vertex with the downstream vertex in the tour.

FIG. 24 is a flowchart illustrating a repairing of a k'th tour in a Neighbor Graph to eliminate edges that are redundant with prior tours in the Neighbor Graph according to an implementation of the present disclosure.

In general, in order to ensure that each document in the Neighbor Graph G has the same number of neighbors, it is important to avoid inserting redundant edges. In an implementation, this is accomplished by generating the k'th tour, as discussed above, "improving" the k'th tour and then "repairing" the k'th tour as follows:

Walk through the new tour in a particular direction;
Whenever a redundant edge is encountered, say from vertex u to vertex v, remove vertex v and put it into a holding queue to be re-inserted later;
Then, at each step of the walk, before checking for redundancy at the current position, the holding queue is checked for available vertices. Note that this implementation considers inserting the first vertex in the holding queue into the current position of the tour, if that vertex is not redundant in its new position, then it is inserted, otherwise it is put at the end of the holding queue, and the next vertex in the holding queue is considered (another implementation may also check whether the vertex to be inserted has an edge with the vertex after v); and
Once the holding queue is exhausted, the edge between the current and the next vertex in the tour is checked for redundancy, and so on.

Specifically, FIG. 24 details operation 2122 of FIG. 21 to repair the k'th tour to eliminate edges redundant with prior tours.

In operation 2410, a holding queue for holding vertices is created and initialized to empty.

In operation 2412, a loop is begun to walk all of the vertices v of the current tour (the k'th tour) in order. The walk follows the tour in one direction, where either direction can be used.

In operation 2413, a determination is made as to whether the queue is empty. If this is the first loop of the walk, then the queue will be empty. Accordingly, if the queue is empty, then the flowchart leads to process 2424 of creating an edge to a next non-redundant vertex in the tour. Otherwise the flowchart leads to process 2414 of inserting after v, a vertex from the holding queue.

In operation 2416, a loop through the vertices in the holding queue is begun.

In operation 2418, if the current vertex from the holding queue does not already have an edge with vertex v from a prior tour, then in operation 2420 the vertex is removed from the queue and inserted into the current tour after vertex v and before the vertex that follows v, splitting the edge after v into two edges. Note that in another implementation, operation 2418 may also check whether the vertex to be inserted has an edge with the vertex after v; if so then the flowchart proceeds to operation 2420 and if not then the flowchart proceeds to operation 2422 as discussed in more detail below. The implementation then returns to operation 2412 to walk to the next vertex v of the current tour. This will be the vertex just inserted from the holding queue.

If in operation 2418 the current vertex from the holding queue does already have an edge with vertex v from a prior tour, and if there are more vertices in the holding queue in operation 2422, the implementation returns to operation 2416 to consider the next vertex in the holding queue.

If in operation 2418 the current vertex from the holding queue does already have an edge with vertex v from a prior tour and if there are no more vertices in the holding queue to consider in operation 2422, then no vertices from the queue will work. In this case an edge is created from the current vertex v of the current tour to the next non-redundant vertex in the current tour in process 2424.

Within process 2424, operation 2426 determines whether a prior tour already has an edge from vertex v to the next vertex in the current tour. If not, then in operation 2428 an edge from current vertex v is added to the next vertex in the current tour. Operation 3440 then determines whether there are more vertices in the current tour. If there are more vertices in the walk of the current tour, then process 2424 returns to operation 2412 to advance to the next vertex of the tour (which, again, will be the vertex to which an edge was just added). If there are no more vertices in the current tour in operation 2440, then process 2424 ends and operation 2122 also ends.

If operation 2426 determines that a prior tour does already have an edge from current vertex v to the next vertex in the current tour, then in operation 2442 the next vertex of the current tour is removed from the current tour and added to the holding queue. The edges are changed such that the subsequent vertex of the current tour becomes the "next" vertex of the current tour, and the implementation loops back to operation 2426 to consider whether a prior tour already has an edge from v to that "next" vertex, and so on.

As can be seen, developing a plurality of tours can involve removing redundant edges from the neighbor graph G belonging to different ones of the plurality of tours.

Additionally, as can be seen, the above-described "improving" and "repairing" can be performed as follows. The database may identify a distance between each pair of the documents in the embedding space, where the distance corresponds to a predetermined measure of dissimilarity between the pair of documents. The above-described developing of the plurality of tours comprises, after inserting into neighbor graph G all the edges of each k'th tour in the plurality of tours: walking the vertices of the k'th tour for a plurality of laps; at each current vertex encountered in the walk, determining whether the document corresponding to the next vertex of the tour is farther away in the embedding space from the document corresponding to the current vertex than the document corresponding to a vertex further downstream in the tour is from the document corresponding to the current vertex, and if so then swapping the next vertex with the downstream vertex in the tour; and removing edges from the neighbor graph G belonging to the k'th tour which are redundant with edges belonging to prior tours in the plurality of tours.

FIG. 25 is a flowchart illustrating a determination of a next collection of documents from a candidate list using Markov Chain Monte-Carlo to complete a walk through the Neighbor Graph according to an implementation of the present disclosure. Specifically, FIG. 25 further illustrates operation 2020 of FIG. 20.

Referring to FIG. 25, in operation 2510 an empty data structure is initialized for identifying the next collection of documents, and a vertex $v_0$ is set equal to the vertex corresponding to the document most recently selected by the user.

In process 2512, a document is selected for the next collection, based on the posterior probabilities P(v*|C) (C being the complete prior sequence of user clicks in the current search session). Process 2512 includes operations 2514, 2518, 2520, 2522, 2523, 2524, 2526, 2528, 2530 and 2532, each of which is described in detail below.

To select a document for the next collection, operation 2514 begins a Metropolis-Hastings walk of duration N beginning at a random position in the candidate list. N is a configurable value. A larger value of N requires more time, but also selects the next document with a probability that better matches the desired probability distribution Q. Thus the walk iterates from vertex i=1, ..., N. In one implementation, the probability distribution Q is equal to the system's estimate of the posterior probabilities P(v*|C). In another implementation the probability distribution Q can be a modified version of P(v*|C). For example, Q can be varied to implement a "shrinking toward the prior", as described above with respect to operation 1920 of FIG. 19.

In order to avoid repeating a document that has already been added to the collection, as explained below, the vertices corresponding to those documents are marked as having already been added. Thus in operation 2518, the system next determines whether all neighbors of $v_{i-1}$ have already been added to the collection. If so, then in operation 2520, the i'th vertex of the walk, $v_i$, is set to a random member of the candidate list.

If at least one neighbor of $v_{i-1}$ has not yet been added to the collection, then in operation 2522, a vertex v* is chosen from all the immediate neighbors of $v_{i-1}$ with a uniformly random probability distribution. This is a proposed next step in the walk.

In operation 2523, a ratio $Q(v^*)/Q(v_{i-1})$ is calculated (or estimated) for the current proposed neighbor v* of the current vertex $v_{i-1}$, if this has not been previously calculated. It is not necessary to calculate the actual probabilities Q for any of the documents, because the user model used in this implementation is such that the probability Q(u) for any document u is proportional to exp(score(u)). Since the user model is such that score(u) is easy to calculate, so is the ratio of probabilities for two of the documents. In another implementation, it may be necessary to calculate the actual probabilities Q for of the documents corresponding to each of the vertices v* and $v_{i-1}$.

In operation 2524, Q(v*) is compared with $Q(v_{i-1})$. This comparison can be made simply by determining whether $Q(v^*)/Q(v_{i-1})>1$. If Q(v*) is higher, then v* is accepted as the i'th vertex of the walk and in operation 2526 $v_i$ is set equal to v*. If Q(v*) is not greater than $Q(v_{i-1})$, then in operation 2528 a choice is made with probability $Q(v^*)/Q(v_{i-1})$ to accept v* anyway (use of this probability $Q(v^*)/Q(v_{i-1})$ balances exploitation and exploration of the candidate list) (note that in an implementation, if v* is not accepted anyway, then $v_i$ can be set to equal $v_{i-1}$); and in operation 2530 $v_i$ is set equal to v*. If the choice fails in operation 2528, then the process returns to operation 2522 to choose another vertex v* from the immediate neighbors of $v_{i-1}$ with a uniformly random probability distribution. It is possible that the same v* can be chosen as before, but it could also be a different v*. The loop of operations 2522/2523/2524/2528 repeats until $v_i$ is set equal to some vertex.

Once $v_i$ has been selected, if the number of vertices walked is still less than N in operation 2532), then the process 2512 returns to operation 2514 to find the next vertex of the walk. Otherwise, the document corresponding to the last vertex of the walk, i.e. the document corresponding to $v_N$, is added to the collection of documents in operation 2534 to present toward the user.

In operation 2536 vertex $v_N$ is marked as having now been included in the collection, thereby precluding its use in a future walk during the development of the current collection of documents in operation 2518. This can be accomplished by forcing its probability Q to zero, which prevents operations 2526 and 2530 from ever being reached if $v^* = v_N$. It will be recalled that after this collection of documents is presented to the user and the user responds with a click, Q changes anyway in dependence upon the updated sequence of clicks C. The values of Q for vertices that were previously forced to zero then will be assigned non-zero values.

In operation 2538 the system determines whether it is finished adding documents to the next collection. If not, then it returns to operation 2514 to begin a new random walk, again beginning from the user's most recently selected document (vertex), to pick a different document to add to the collection.

If operation 2538 determines that the next collection of documents is complete, then the operation 2020 completes at operation 2540 and the collection of documents is presented toward the user in operation 2022 of FIG. 20.

It can be seen that not only is it unnecessary to calculate the actual probabilities Q in the implementations illustrated in FIG. 25, but only a few of the probability ratios are calculated in the FIG. 25 implementations. This greatly improves the scalability of the system to very large catalogs of documents.

Learning Distances

User behavior data may be collected by a system according to the present disclosure and the collected user behavior may be used to improve or specialize the search experience. In particular, many ways of expressing distances or similarities may be parameterized and those parameters may be fit. For example, a similarity defined using a linear combination of Kernels may have the coefficients of that linear combination tuned based on user behavior data. In this way the system may adapt to individual (or community, or contextual) notions of similarity.

Similarly, such Kernels or distances may be learned independently of the search method. That is, the Kernels or distances may be learned on data collected in different ways. This data may, or may not, be combined with data captured during the search process.

Of particular interest is the use of deep learning, e.g., neural networks with more than 3 layers, to learn distances or similarity.

In some implementations, distances are learned specifically for specific applications. For example, an implementation uses the method (process) to search for potential partners (e.g., on a dating site) and may learn a Kernel that captures facial similarity. The process may also learn a Kernel that captures a similarity of interests based on people's Facebook profiles. These Kernels (or distances) are learned specifically to address the associated search problem and may have no utility outside of that problem.

FIG. 26 is a flowchart illustrating various logic phases for learning distances for a subject domain, such as a subject catalog of products or type of content, according to an implementation of the present disclosure. For example, it may be appropriate to learn or develop an embedding specific to men's shoes. Such an embedding would capture the similarity between men's shoes be would be uninformative with regard to men's shirts.

Referring to FIG. 26, in operation 2610 the subject domain is defined. Examples of subject domains include clothing, jewelry, furniture, shoes, accessories, vacation rentals, real estate, cars, artworks, photographs, posters, prints, home decor, physical products in general, digital products, services, travel packages, or any of a myriad of other item categories.

In operation 2612 one or more items that are to be considered within the subject domain are identified, and one or more items that are to be considered outside the subject domain are identified.

In operation 2614, a training database is provided which includes only documents that are considered to be within the subject domain. This training database includes the first items but not the second items.

In operation 2616 an embedding is learned in dependence upon only the provided training data, i.e. not based on any documents that are considered to be outside the subject domain. A machine learning algorithm can be used to learn this embedding.

In operation 2618, the catalog of documents is embedded into the embedding space using the learned embedding. Preferably the catalog of documents embedded into the embedding space is itself limited to documents within the subject domain. Subsequently processing can later continue with operations 412 or 414 of FIG. 4 or its variants as described herein.

Adjusting Thresholds and Other Variations

Described herein are implementations of the technology disclosed that adjust thresholds (of non-geometric or geometric constraints) throughout the process of the visual interactive search, and perform the embeddings at different points of the overall visual interactive search.

As previously described, documents are encoded in an embedding space such as a vector space or metric space (via a distance). Searches proceed as a sequence of query refinements. Query refinements are encoded as geometric constraints over the vector space or metric space. Discriminative candidate results are displayed to provide the user with the ability to add discriminative constraints. User inputs, e.g., selecting or deselecting results, are encoded as geometric constraints.

One variation of the overall visual interactive search may include embedding the documents after the initial query is performed and only those documents satisfying the query may be embedded. Similarly, the documents may be re-embedded using a different embedding at any point in the process. In this case, the geometric constraints would be re-interpreted in the new embedding.

Another variation of the overall visual interactive search may include augmenting the geometric constraints at any point with non-geometric constraints. In this case the candidate results can be filtered in a straightforward way to select only those satisfying the non-geometric constraints. In this way the interaction can be augmented with faceted search, text, or speech inputs. At each iteration of the process the geometric constraints can be managed together with a set of non-geometric constraints.

An example implementation may proceed through these steps:
 1. Obtaining and identification of one or more prototype documents (e.g., images) from a user (the identification can identify one or more prototype documents or may include a text string identifying the one or more prototype documents);
 2. Identifying, as candidate documents, all documents in a catalog of documents with a distance less than a threshold T1 from the one or more prototype documents (the distance can correspond to a predetermined measure of dissimilarity with respect to the one or more prototype documents, where the predetermined measure of dissimilarity can be defined using any of the techniques defined in the present disclosure or any other technique that would be apparent to a person of ordinary skill in the present technology);

3. Optionally identifying a discriminative subset of the documents collected in (2);
4. Presenting the discriminative subset of documents to the user in a 2-dimensional layout or presenting a collection of fewer than all of the candidate documents;
5. If the user is satisfied with one or more of the presented documents, receiving an indication of such satisfaction and taking desired action with respect to the one or more selected documents;
6. If the user is not yet satisfied, obtaining from the user a selection of one or more of the presented documents that are more like the desired result;
7. Optionally producing a revised collection of prototype documents;
8. Changing (e.g., increasing or decreasing) the threshold T1 and adjusting the candidate documents to exclude or include additional documents based on the adjusted threshold T1;
9. Goto 2.

It is assumed in the above implementation that a database identifying a catalog of documents in the embedded space is provided or that a catalog of documents in the embedded space is provided. The above implementation may be viewed either from the viewpoint of the user interacting with a computer system, or the viewpoint of a computer system interacting with a user, or both.

The documents may include images, audio, video, text, html, multimedia documents and product listings in a digital catalog.

The concept may also be generalized so that the identification of the one or more prototype documents obtained at step 1 is obtained as the result of the user performing a search (query) within another information retrieval system or search engine.

The concept may also be generalized so that step 8 is replaced with an option to provide a user interface that allows the user to decide whether to increase the threshold T1, decrease the threshold T1 or to leave the threshold T1 unchanged.

The concept may also be generalized so that at steps 1, and 6 there are two collections of documents including one or more prototype images. The first collection of documents including the one or more prototype images obtained at step 1 and the second collection of documents including another collection of one or more prototype documents. At step 2 the system identifies images having both (i) a distance that is less than a threshold T1 of the first collection of documents and (ii) a distance that is greater than a threshold T2 of the second collection of documents. This concept may be further extrapolated in step 8, where the thresholds T1 and T2 are adjusted and the candidate documents are updated accordingly.

The concept may also be generalized so that at one iteration of step 6 the user selects one or more of the presented documents along a first subset of at least one axis, and at another iteration of step 6 the user selects one or more of the presented documents along a second subset of at least one axis, where the second subset of axes contains at least one axis not included in the first subset of axes.

Advantages of the Technology Disclosed Over Prior Systems

Various implementations described herein may yield one or more of the following advantages over prior systems.

One advantage is that an implementation of the technology disclosed need not be limited to a single fixed hierarchy of documents. More specifically, an implementation does not require an explicit determination of a taxonomy by which the document catalog is described. Nor does it require a clustering of documents into a static hierarchy. That is, the sequence of refinements that a user may perform need not be constrained to narrowing or broadening in some pre-defined taxonomy or hierarchy.

Another advantage is that implementations of the technology disclosed can be extremely flexible and may be applied to images, text, audio, video, and many other kinds of data.

Another advantage is that implementations are based on intuitions about the relationships among documents, which are often easier to express using notions of similarity or distance between documents rather than by using a taxonomy or tags.

A further advantage is that selecting and deselecting candidate results in a visual way is a more facile interface for performing search on a mobile device or a tablet.

Another advantage is that encoding query refinements in terms of geometric constraints allows for a more flexible user interaction. Specifically, in an implementation, the user is not required to be familiar with a pre-defined tagging ontology, or with a query logic used to combine constraints. Furthermore, in an implementation such geometric constraints can be more robust to errors in a feature tagging or annotation process.

An additional advantage is that the ability to incrementally refine a search is helpful to a productive user experience.

Another advantage is that the use of a discriminative subset of candidate results makes more effective use of limited display space. The clutter on the display is minimized while simultaneously capturing a high proportion of the information available in the complete results set and providing a wide variety of options for the user to refine a query.

Furthermore, given that distances, embeddings, and similarities may be machine learned, another advantage is that a system using this approach can provide the ability to specialize the search experience to individuals, groups, cultures, and document categories.

Compared to content-based image retrieval (CBIR) techniques, an advantage is that an implementation of the present disclosure can be more amenable to incremental refinement of a search. Specifically, a user may take a photograph and use a CBIR system to identify related or highly similar photographs. However, if the user is dissatisfied with the results the CBIR system does not provide them with a way to refine search goals.

An Example Implementation

One implementation allows users to search a catalog of personal photographs. Users are initially shown an arbitrary photograph (the primary result), e.g., the most recent photograph taken or viewed. This is displayed in the center of a 3×3 grid of photographs from the catalog. Each of the photographs is selected to be close (defined below) to the primary result but different from each other along different axes relative to the primary result. For example, if the primary result is a photograph taken with family last week at home, then other photographs may be a) with the family last year at home, b) with the family last week outdoors, c) without the family last week at home, etc. In some situations, the system may place two photographs on opposite sides of the primary result which are along the same axis but differ from each other in their positions along that axis. For example, the photo placed on the left side may show family member A more prominently than in the primary result, while the photo placed on the right side may show family member A less prominently than in the primary result.

The user selects one of the 9 photographs which then becomes the primary result. This is then laid out in an updated 3×3 grid of photographs again "close" to it but different from each other.

If at any point the user double clicks on the primary result then the definition of "close" changes to a "smaller scale" (defined below). If the user uses a "pinch out" gesture then the definition of "close" changes to a "larger scale" and the result set is updated. In this way a user may navigate a catalog of photographs to find specific ones.

In this example photographs may be considered similar with respect to a number of criteria, including: GPS location of the photograph; time of the photograph; color content of the photograph; whether the photograph was taken indoors or outdoors; whether there are people in the photograph; who is in the photograph; whether people in the photograph are happy or sad; the activity depicted in the photograph; and the objects contained in the photograph.

These criteria are captured into a numerical "distance," or as a vector locating photographs in some space. In the latter case a standard notion of similarity or distance may be used, e.g., the dot product or Euclidean distance. In an implementation, a normalization function can be applied in order that distances along different axes are comparable to each other.

As the user navigates a catalog of photos the "scale" at which the user is searching changes. This scale specifies how "close" the photos in the result set are to the primary result. More precisely all photos in the result set must have a "distance" less than some threshold. As the scale increases or decreases this threshold increases or decreases.

Considering this example with respect to the steps described above:

Embedding: For each photograph in a user's catalog of personal photographs a vector is produced that has indices corresponding to, e.g., the longitude, the latitude, the time of day, the day of week, the number of faces, whether a given activity is depicted, among many others.

Initial Query: In this case the initial query is empty, that is all photos are candidate results and the one presented to the user is arbitrary.

Initial Query as geometric constraints: The initial query produces an empty set of geometric constraints The geometric constraints are applied to the set of embedded photographs to identify those that satisfy the constraints, i.e., the candidate results A discriminative subset of 9 photographs is selected from the candidate results using farthest first traversal.

The 9 photographs are presented to the user in a 3×3 grid

The user selects one of the photographs to indicate a desire to see more photographs like that one.

The user selected photograph is processed to yield a new geometric constraint which can be represented as a sphere around the selected photograph in the embedding space. This new constraint is added to the current set of constraints. The combined constraint is the intersection of spheres around all photographs selected so far.

Another Example Implementation

Another implementation looks at searching for accessories (apparel, furniture, apartments, jewelry, etc.). In this implementation the user searches using text, speech, or with a prototype image as an initial query. For example, a user searches for "brown purse" using text entry. The search engine responds by identifying a diverse set of possible results, e.g., purses of various kinds and various shades of brown. These results are laid out in a 2-dimensional arrangement (for example a grid), whereby more similar results are positioned closer to each other and more different results are positioned relatively far from each other. The user then selects one or more images, for example using radio buttons. The image selections are then used by the search engine to define a "search direction" or a vector in the embedding space along which further results may be obtained.

Considering this example with respect to the steps described above:

Embedding: For each entry in an accessories catalog a vector is produced using deep learning techniques trained to differentiate accessories.

Initial Query: In this case the initial query is a textual search that narrows further results to be within a portion of the full catalog. This restricted is the set of initial candidate results.

Initial Query as geometric constraints: The initial query produces an empty set of geometric constraints The geometric constraints are applied to the set of embedded accessories in the restricted set (i.e., the initial candidate results) to identify those that satisfy the constraints, i.e., the candidate results A diverse subset of 9 catalog entries is selected from the candidate results using farthest first traversal.

The 9 catalog entries are presented to the user in a 3×3 grid

The user selects one of the catalog entries to indicate a desire to see more accessories like that one.

The user selected accessory is processed to yield a new geometric constraint which can be represented as a sphere around the selected accessory in the embedding space. This new constraint is added to the current set of constraints. The combined constraint is the intersection of spheres around all accessories selected so far.

Intelligently Driven User Interface

As previously explained, e-commerce conversion rates on mobile and tablet platforms are approximately half to a third of that on desktop platforms. It is believed that a major contributing factor to this lower conversion rate on mobile and tablet platforms is that the screen size of the device, from which the user is viewing documents (e.g., products), drastically constrains how many products a customer can view. Further, when mobile and tablet devices simply implement or display interfaces that are originally designed for desktop platforms or that are poorly converted or poorly designed to work on a mobile or tablet device, the user still feels constrained and uncomfortable with the interface. This leaves the user or potential customer feeling a bit unsettled and with the feeling that they have not selected the best possible product.

This intelligently driven user interface addresses this issue by addressing these problems and by showing the customer more items that are relevant to what they have indicated they wish to purchase on that session. For example, most e-commerce interfaces try to allow the customer to narrow their search realm with categories, such as, for example, narrowing shoes to only show the customer 'sneakers,' or 'heels.' Such an approach is not very productive because it relies on the customer's own categorization of the item to match the categorization of retailers. Additionally, categories have a tendency to be overly broad or overly narrow, which in turn winds up offering customers not enough filtering of products (e.g., product overload) or offering customers too limited of a selection.

Figure 29A:
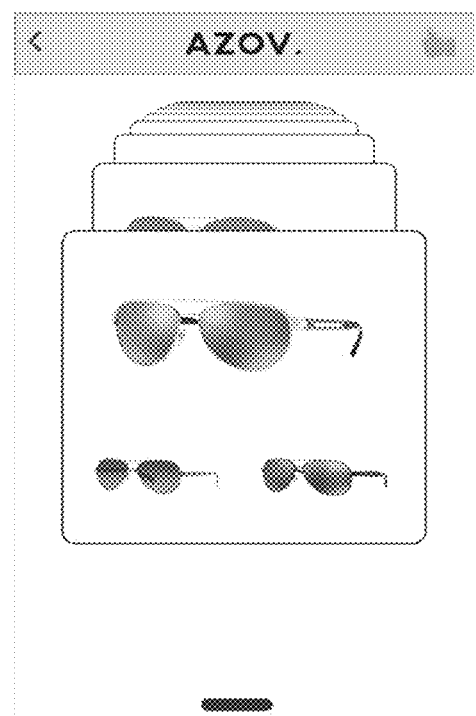
FIGS. 29A and 29B illustrate a dynamic carousel of products which allows a user to quickly and easily scroll (flip) between products.

The intelligently driven user interface implements machine learning to help give documents (e.g., products, images, etc.) an embedding in a high dimensional space. This concept is described in detail above. From the embedding space, the intelligently driven user interface can use the information from the embedding space and information collected from the user to compute similarity of the products. Briefly explained, the intelligently driven user interface uses the embedding space and whatever information is known about the customer as a starting point. Then K clusters of products are formed from the embedding space by splitting an entire catalog of products into K dissimilar groups. The intelligently driven user interface then presents (to the user) certain products that are representative of K clusters in groups, for example as illustrated in FIG. 29A. This allows the user to quickly find an area (group) of the catalog they wish to browse in more detail. Then user is then presented items one at time, for example, as illustrated in FIG. 29B, giving the user the opportunity to "like," "dislike" or skip certain products.

Figure 29B:
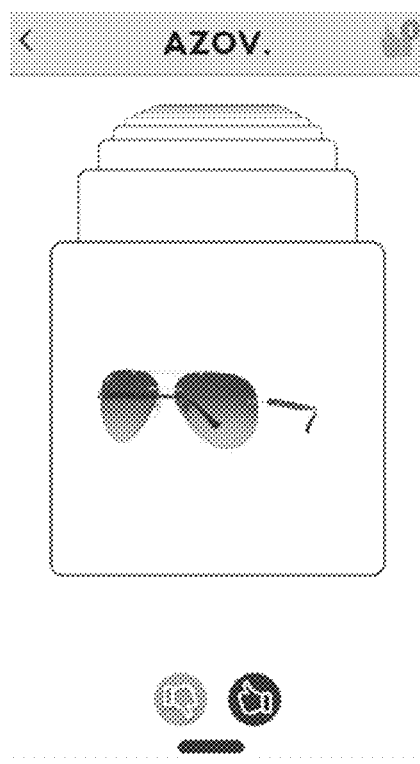

FIGS. 29A and 29B illustrate a dynamic carousel of products which allows the user to quickly and easily scroll (flip) between products while also being able to have a preview of the product behind or in front of the main product. This gives the user a better sense of what type of products are coming up next and which products they have previously seen. Every interaction from the user updates a set of recommended products that are subsequently prepared for being presented to the user. To the user this appears as a continual stream of items that converge on the desired product with each interaction. However, the subsequent products that are prepared for presentation to the user are intelligently obtained based on all of the user's interactions with the interface. Specifically, the product catalog presented to the user is processed by artificial intelligence-based models described above and in the documents incorporated by reference, giving the best products for that particular user the best chance of being viewed by the user.

FIG. 27 is a flowchart illustrating various logic phases through which a visual interactive search system that provides an intelligently driven user interface may proceed according to an implementation of the present disclosure.

Referring to FIG. 27, the various logic phases generally include (i) embedding documents, which requires a defining of distances and similarities between the digital documents and database organization of the embedded digital documents, (ii) forming clusters of documents from the catalog of documents and identifying a center (e.g., medoid) document of each cluster, (iii) presenting the groups of documents to the user using a certain number of representative documents for each cluster, (iv) receiving a selection of one of the groups from the user, (v) presenting to the user a selection of documents from the cluster that is represented by the selected group, where the user can indicate whether the like, dislike or are unsure/neutral as to the particular documents and (vi) intelligently identifying subsequent documents from the cluster to present to the user based on their previous indications and interactions.

The documents may be presented to the user in any manner discussed with reference to FIG. 4. Further, the documents may be presented to the user using in any manner (or reasonable variation thereof) illustrated in FIGS. 29A-43. In implementations that include mobile or portable devices, graphical user interfaces including carousels of documents provides the user with an interface that works well with the methods and techniques described herein. Further, dual carousels can be implemented to include one carousel converging to the center from one direction and another carousel converging to the center from another direction giving the user the feeling as if they are shopping through the aisles (or racks) of a brick-and-mortar store.

Initially, in operation 2710 illustrated in FIG. 27, a catalog of digital documents (e.g., images, text, web-pages, catalog entries, sections of documents, etc.) is embedded in an embedding space and stored in a database. Though this group of documents may be referred to herein as a "catalog," the use of that term is not intended to restrict the group to documents that might be found in the type of catalog that a retail store might provide. In the database, a distance is identified between each pair of the documents in the embedding space corresponding to a predetermined measure of dissimilarity between the pair of documents.

The embedding of the documents is further described, at least in part, in the "Embedding of the Documents" section of this document; the distances between the documents is described, at least in part, in the "Distances Between Digital Documents" section of this document; and the organization of the database is described, at least in part, in the "Database Organization" section of this document.

In operation 2712, K clusters are formed from the catalog of documents. The number represented by K can be predetermined, can be dependent upon the platform of the user, the screen size of the user, the total number of documents in the catalog of documents, etc. Ideally, the K clusters are formed such that each of the documents in the catalog of documents is included in one of the K clusters, so that none of the documents of the catalog are left out. There should be more than 1 cluster (e.g., K should be greater than 1). Alternative implementations could include excluding outlier documents from being in a cluster and/or could include having certain documents included in multiple clusters. The clusters can be formed based on a (predetermined) anchor document of the documents in the embedding space. The anchor document can be at a center (centroid) of the cluster, it can be a medoid of the cluster or it can have any other relationship with the cluster according to which the cluster can be formed.

Furthermore, the K clusters can be formed by identifying K documents from the catalog and essentially drawing equidistant lines between adjacent documents of the K documents. These "equidistant lines" are not actually drawn, but they are simply used as a tool to separate the catalog of the embedding space into K areas. Each of the K areas is a cluster.

To separate the documents of the catalog into K clusters, a standard clustering algorithm can be used, such as k-medoids or k-means. K-medoids is similar to k-means except that for k-medoids the center (i.e., medoid) of the cluster is a specific catalog item. In contrast, in k-means the cluster center is based on an average of the coordinates (or other aspects) of the documents in the cluster. K-medoids and k-means are described above in this document and additional information regarding these concepts is incorporated by reference. Operation 2714 describes finding the center (centroid) or medoid of each cluster formed in operation 2712. This operation corresponds to an implementation of the intelligently driven user interface that uses k-medoids rather than k-means. Operation 2714 can be replaced by an operation that uses k-means to identify the center of each of the K clusters. Once the medoid is determined the boundaries of the cluster can be updated in dependence on the location of the medoid.

Ideally operations 2712 and 2714 can be repeated a number of times until the clusters are stabilized using a predefined convergence criterion, meaning that eventually after iterating operations 2712 and 2714 the same clusters and cluster centers are identified. In other words, if after iterating operations 2712 and 2714 two times and the clusters and the cluster centers do not change, then the clusters are stabilized. The clusters can be stabilized by, for each j'th one of the clusters (and after the medoid, centroid, etc. has been located) repeating the clustering for the j'th cluster using for example, a medoid document or a centroid document located for the j'th cluster as the anchor document and then repeating the medoid locating for the j'th cluster. This can be repeated until the same medoid document is identified a predetermined number of times, consecutively (e.g., until the same medoid document is identified for a consecutive number of iterations).

In operation 2716, ideally after the K clusters are stabilized, M documents must be selected or identified to represent each particular cluster to be presented to the user. The number of M documents can be dependent on the type of platform or device that the user is using. Or the user might have the option to select the value of M. The value of M can be the same for each K cluster or the value of M can be different for some clusters. The value of M could vary between clusters in dependence upon the number of documents in each cluster or in dependence upon other information such as a user's previous interest in previous clusters of documents, or in dependence upon any other mechanism that would be clear to a person of ordinary skill in the art. For example, the value of M for a specific cluster K can be designated as $M_k$, wherein the value of $M_k$ can be varied for each cluster based on the criteria described above or the value of $M_k$ can be the same for all clusters. FIG. 29A illustrates a display of a particular cluster, where M=3, such that three representative products are presented to the user to represent each cluster. The M documents can be selected randomly from the corresponding cluster. Alternatively a clustering algorithm, such as k-medoids can be further ran on each cluster to get M sub-clusters, and then the center (medoid) document of each of the M sub-clusters can be selected as the M documents. Further, the M documents can simply be selected as the M documents that are nearest to the center (centroid) of the particular cluster. If a particular cluster of the K clusters does not include M documents, then the value of M should be changed or the number of clusters should be reduced by combining the cluster having less than M documents with an adjacent cluster.

In operation 2718, K groups of documents are presented to the user, where each of the K groups includes the corresponding M documents. The user is given the ability to view the K groups and eventually pick the group that appears to be the most similar to what they are searching for.

According to operation 2720, in response to the user selecting one of the K groups, the documents from the cluster corresponding to the selected K groups are presented to the user. Once the user selects the K group, a determination can be made as to whether the corresponding cluster is too large (i.e., the cluster includes too many documents). If the cluster is too large, the likelihood of the user finding the document they are looking for can decrease. In order to avoid this problem, an operation can be performed to see if the number of documents is too large or exceeds a certain threshold. For example, the threshold can be determined as K×P, where P is a number of documents to be displayed (individually, simultaneously or a combination thereof) from the particular cluster selected by the user. Just like M, the value of P for a specific cluster K can be designated as $P_k$, wherein the value of $P_k$ can be varied for each cluster based on the criteria described above regarding the value of M or the value of $P_k$ can be the same for all clusters. Alternatively, the threshold can be determined as K×M or can be a predetermined number or any other calculation. If the threshold is exceeded by, for example Nc, which is the number of documents in the selected cluster, then the entire cluster can be re-clustered using K-medoids or K-means as described above. The concept of using this threshold can also be implemented right after operation 2712, to ensure that none of the K clusters is too large. This would eliminate the need for adjusting the cluster in operation 2720. In operation 2720, if further clustering is necessary because of the threshold being exceeded, then the further groups identifying M documents will be presented to the user. Essentially, operations 2714, 2716 and 2718 will be performed again. Otherwise, if the threshold is not exceeded, then for the selected cluster, k-medoids (or k-means) can be performed on the selected cluster to identify P clusters and then the centers (centroids) (documents) of the P clusters can be presented to the user for further interaction. By performing this additional clustering, the user will be given a good sample of representative documents, without overwhelming the user.

In operation 2722 the user is given the opportunity to like, dislike or pass over (e.g., remain neutral) for any of the P documents. FIG. 29B illustrates an example of an intelligently driven user interface that allows the user to view the P documents and provide feedback. Each time a document is liked or disliked (or even passed by) the intelligently driven user interface will then in operation 2724 identify a subsequent document or a group of subsequent documents to present to the user. Operations 2722 and 2724 can collectively repeat until the user finds the document that they are searching for and then make, for example, a purchase. The goal here of the intelligently driven user interface is to find a measure of how much a user would like any unseen item based on their previous likes and dislikes, and then suggest items that the user is most likely to like. A specific example of determining subsequent documents is described below.

Given a set of liked documents (Sl) and a set of disliked documents (Sd), the intelligently driven user interface can compute for each document x of the catalog the average distance between the document x and the liked documents as Dl and the average distance between document x and the disliked documents as Dd. Example formulas for determining Dl and Dd is provided below:

$$\forall x \in \text{Catalog}, Dl(x) = \frac{\sum_{y \in Sl} d(x, y)}{\text{Card}(Sl)}$$

$$\forall x \in \text{Catalog}, Dd(x) = \frac{\sum_{y \in Sd} d(x, y)}{\text{Card}(Sd)}$$

Card(S) is a number of documents set S (e.g., the number of documents in the set of liked documents and the number of documents in the set of disliked documents).

Then, for example, a final score S can be computed based on these average distances Dl and Dd as follows:

$$\forall x \in \text{Catalog}, S(x) = Wl*Dl(x) - Wd*Dd(x)$$

Wl and Wd are weighting coefficients, where Wl should be greater than Wd (e.g., Wl=1 and Wd=0.5). A weighting coefficient and a distance calculation can also be performed using neutral documents (i.e., documents that the user specifically identified as being neutral or that the user simply made a pass on). This could be represented as $Wn*Dn(x)$ and added to the $S(x)$ score calculation provided above. Regarding the weightings, if Wd is too high or higher than Wl, then a document x would be essentially pushed too far away from the liked documents.

Then, the documents presented to the user in operation 2744 are the documents having the lowest $S(x)$ scores.

A unique situation may arise where no documents have been liked, and documents have been disliked. In this case, the intelligently driven user interface can temporarily use an neutral documents as liked documents (potentially with a lower weighting Wl). Otherwise the recommended documents would be the items furthest away from the disliked documents which will be too far away from all the previous suggestions.

As more likes and dislikes accumulate, the recommendations get closer and closer to the user's desired document. Accordingly, the user will quickly hone in the more appropriate and productive documents. This will give the user further confidence that their final selection is the best possible document.

Some other variations of the intelligently driven user interface can be implemented to force a user to like, dislike (or identify as neutral) every document to drive better recommendations. Additionally, the user may be given the opportunity to scroll between documents before liking or disliking or even changing their like to a dislike or changing their dislike to a like after further consideration.

A further variation of the operations 2722 and 2744 described above is to implement cluster zooming. For example, if a cluster C has been selected, and the user is forced to like, dislike, or skip every document the user sees without scrolling. Using such an implementation, the intelligently driven user interface essentially only displays one item at a time to the user for user feedback.

In this implementation, the score $S(x)$ can be calculated for each item in cluster C, as described above. Initially all scores will be the same and a zoom will equal 1. Then candidate documents are identified from the cluster C to equal a set of N*zoom items in cluster C with the lowest score $S(x)$ that have NOT been displayed before. N is the number of items in cluster C. Then the intelligently driven user interface will pick a random document I from the candidate documents, add the document to the liked set of documents if it was liked, add the document to the disliked set of documents if it was disliked and add the document to the neutral set of documents if it was skipped.

If a document was liked, then zoom=zoom*shrinkFactor and if a document was disliked, then zoom= zoom*unshrinkFactor. The shrinkFactor can be a number between 0 and 1 and the unshrinkFactor can be a number that is greater than or equal to 1. This allows for zooming in and zooming out of the cluster to ensure that appropriate documents are considered for presentation to the user. This approach ensures that every time a document is liked, the size of candidates shrinks, ensuring convergence towards documents similar to the liked ones. If documents are disliked, the size of the candidates expands to ensure more diversity.

This zooming process is repeated, meaning that $S(x)$ is calculated for every document of the cluster C, a new set of N*zoom candidates with the lowest scores is created, and then a document is selected from the new set of candidates and presented to the user.

Implicit User Actions

As previously explained, document recommendation engines generally use cohort analysis to segment customers into groups based on past/current behavior (e.g., grouping based on "like" and/or "dislike" criteria). Then recommendations are provided to a user based on user actions and based on that user being in a particular group. This is not an accurate way to make recommendations to users because it places too much weight on past sessions, and not enough on what the user is looking for in a current session, and it misses all the information that can be collected based in implicit actions taken by the user. Implicit actions are discussed in more detail below, but briefly they refer to actions that are not explicitly solicited from the user, such as asking or forcing the user to indicate whether they like or dislike a particular document (e.g., product). In addition to considering implicit user actions, weights can be assigned to different types of implicit user actions and even to explicit user actions.

As described in the background section, previously, product catalogs have been navigated on portable and desktop devices based on explicit likes and dislike of products. There are a significant proportion of users who will decide against liking and disliking products for a myriad of reasons. Such an interface, which by necessity includes like, dislike or neutral icons or buttons, especially on smaller portable devices can take up too much real estate on the screen which can be used more productively.

By adding the capability to collect and consider, and even weight all of the user's implicit actions without necessitating explicit feedback from the user, it is possible to provide subsequent product recommendations to the user in a more productive and efficient manner (e.g., product recommendations that are more aligned with what the user is actually looking for, which leads to the user finding the desired product or products faster). Briefly, these implicit user actions, the weighting of the implicit user actions and even the weighting of explicit user actions can be used to better identify products from the embedding space in any of the ways or combinations of ways described in this entire document. Specific examples are provided below with respect to identifying products from the embedding space, but these are only examples of using implicit user action weighting and the use of this information should not be limited to these examples, but rather can be implemented using any of the other techniques described in this document.

Figure 28:
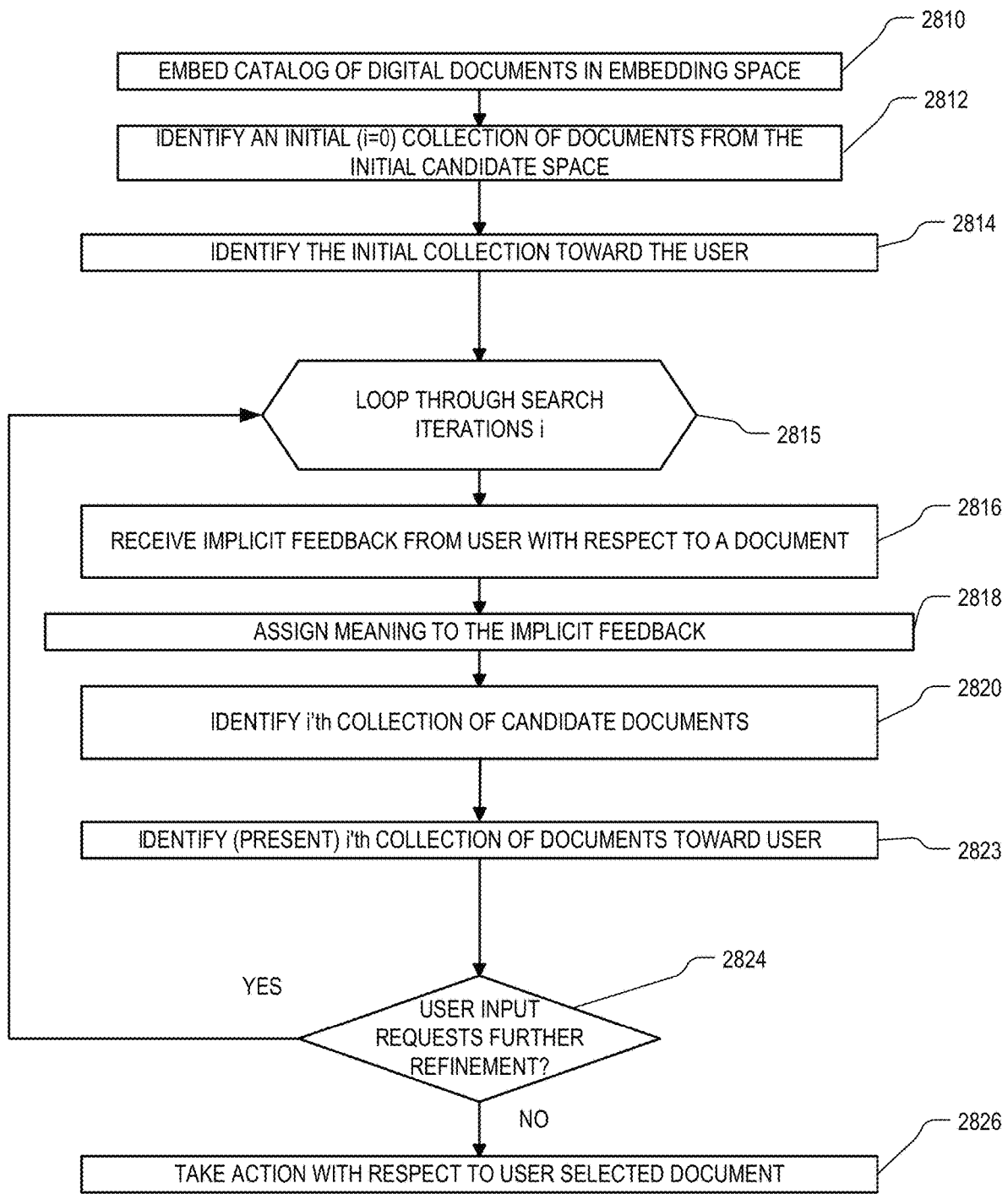
FIG. 28 is a flowchart illustrating various logic phases through which a visual interactive search system may proceed according to an implementation of the present disclosure and considers implicit user actions and/or weights user actions.

FIG. 28 is a flowchart illustrating various logic phases through which a visual interactive search system may proceed according to an implementation of the present disclosure.

Referring to FIG. 28, the various logic phases generally include (i) embedding documents, which requires a defining of distances and similarities between the digital documents and database organization of the embedded digital documents, (ii) identifying an initial collection of documents to present to the user, (iii) presenting the initial collection of documents to the user, (iv) detecting an implicit user action with respect to a displayed document and determining a meaning of the implicit user action, (v) identify a collection of candidate documents to display to the user based on the meaning of the implicit user action, (vi) presenting the identified collection of candidate documents to the user, and (vii) obtaining user input for further refinement and/or selection of a particular document.

Initially, in operation 2810 illustrated in FIG. 28, a catalog of digital documents (e.g., images, text, web-pages, catalog entries, sections of documents, etc.) is embedded in an embedding space and stored in a database. Though this group of documents may be referred to herein as a "catalog," the use of that term is not intended to restrict the group to documents that might be found in the type of catalog that a retail store might provide. In the database, a distance is identified between each pair of the documents in the embedding space corresponding to a predetermined measure of dissimilarity between the pair of documents.

The embedding of the documents is further described, at least in part, in the "Embedding of the Documents" section of this document; the distances between the documents is described, at least in part, in the "Distances Between Digital Documents" section of this document; and the organization of the database is described, at least in part, in the "Database Organization" section of this document.

In operation 2812 an initial collection of digital documents is identified from the catalog of documents in the embedding space. This initial collection of documents is a subset of the catalog of documents. As used herein, the term "subset" refers only to a "proper" subset. The initial collection of documents is sometimes referred to herein as an "i=0" collection. In one implementation the initial collection of documents is selected as a discriminative subset of the catalog, while in another implementation the initial collection of documents is not discriminative.

In operation 2814, the initial collection of documents is identified (for dynamic display on a graphical user interface) toward the user. In one implementation this operation can include displaying a representation of the documents in the initial collection visibly to the user. Operation 2815 includes beginning the process of searching for documents until the desired document is found by the user. As described herein, the term dynamic display refers to a display that is not static and is updated in response to user selection. Alternatively, dynamic display can refer to a display that can change contents and the arrangement of contents in dependence upon screen space, a display of other items on a screen and/or user selection of items on the screen.

At the beginning of the i'th iteration, in operation 2816, the user provides implicit feedback (i.e., implicit user actions) with respect to at least one of the documents in the (i−1)'th collection of documents. The implicit feedback, as briefly described above, is feedback that is not explicitly solicited by the graphical user interface, such as, for example requesting that the user "like" or "dislike" a document or that the user identify themselves as being "neutral" with regard to the product. Examples of implicit user actions include viewing a product description page of a particular document, adding a document to a cart, adding a document to a wish list or a shopping list, rotating or manipulating the view of a document, a duration of time for which the document was viewed or observed, opening an email from a retailer related to a document, clicking on an off-site advertisement related to a document, facial expressions observed while the user views a document, audio heard while the user views a document, eye movement of the user observed by eye tracking while the user views a document, other implicit actions (e.g., hovering over a document for a period of time) and/or explicit actions taken by the user in a previous session or previous actions taken by the user in the current session, a location of the user or the device displaying a document while the user views a document, relative times with respect to a length of a user session, a length of time focused on a particular document, a time of day, day of week, and month of year at which the user currently views a document, heat mapping of documents, etc. Other types of implicit user actions will be apparent to a person of ordinary skill in the art.

In operation 2818 a meaning is assigned to the user action. This meaning can be any of the types of user interactions described above. A score or value can then be determined for a document based on various types of implicit user actions associated with the document. A weighting can also be assigned based on the type of implicit user action. For example, opening up a product display page could be given a 0.5 weighting, adding a document to a wish list, a favorites list or the cart could be given a 1.0 weighting, lingering on a product in a carousel of displayed products or extending a mouse hover can be given an initial weighting of 0.1 which could increase over time, scrolling past a document, which would be similar to disliking a document, could be given a rating of 0.

All of the weights can be compiled for a given document using various types of calculations. For example, all of the weights could be summed and then used to adjust a distance calculation in the embedding space with respect to that document. A more complex computation can be implemented as: $B_i(tw_i e^{-1})dw_i(1+\log(d-d_i))$ for $d > d_i$; and 0 for $d < d_i$ where: $B_i$ is the base weight for an interaction type (i.e., type of implicit user action) type; $tw_i$ is the time weighting coefficient for an interaction type; t is the elapsed time since the event; $dw_i$ is the duration weighting for an interaction type, d is the duration of the event and $d_i$ is the duration required for the interaction to count.

Every time a document is weighted, the weighting or a score determined based on the weighting can be used to determine dissimilarity, collective closeness or any other computation implemented to identify documents that are more similar or less similar to the document for which the weighting was determined. This can be done to exploit similar documents or to explore new types of documents. Any of the techniques described in this document can be implemented in a meaningful way to make use of the weighting to locate additional documents.

In operation 2820 an i'th collection of candidate documents is identified from the catalog of documents of the embedding space. This i'th collection of candidate documents can be identified using any of the concepts described in this document including, for example collective closeness to the displayed document for which the implicit user action was received and/or according to the meaning of the implicit user action. Other implementations of such techniques are discussed with reference to FIG. 4.

In operation 2823 the collection of i'th documents are identified toward (presented to) the user. The documents may be presented to the user in any manner discussed with reference to FIG. 4. Further, the collection of i'th documents may be presented to the user using in any manner (or reasonable variation thereof) illustrated in FIGS. 29A-43. In implementations that include mobile or portable devices, graphical user interfaces including carousels of documents provides the user with an interface that works well with the methods and techniques described above. Further, dual carousels can be implemented to include one carousel converging to the center from one direction and another carousel converging to the center from another direction giving the user the feeling as if they are shopping through the aisles of a brick-and-mortar store.

In operations 2824 and 2826 a determination is made based on the user's actions as to whether or not they would like to continue to search for new documents. If they would like to continue searching, then operations 2816, 2818, 2820 and 2823 are iterated again. If the user is done searching, then a specific action (e.g., head towards purchase) is performed in operation 2826. This is similar to the operations described in the section "User Input and Further Refinement of Query" that describes FIG. 4.

Some of the variations of the "Implicit User Actions" include desktop implementations that assign different meanings and weightings to certain implicit user actions. The "weighting" can also be applied to explicit user actions based on any of the factors described above. Further variations include creating a software developer kit (SDK) that enable online retailers to collect information related to implicit user actions, explicit user actions and weighting, or any combination thereof. The information received from the online retailers in conjunction with the SDK can be used to carry out the above described operations as described with reference to FIG. 28. Another implementation allows the mobile device or desktop implementation perform any or all of the operations described above (e.g., as described in FIG. 28). By having the mobile device or desktop implementation to compute the weights, etc., any delay potentially cause by waiting for a server would be eliminated. However, some implementations can take advantage of the processing capabilities of both the local computing device and the server. In other words, some implementations merely send the raw data obtained, for example, from the SDK to a server that determines the weights and the subsequent documents to display. Other implementations include having the local devices perform some preprocessing of the data or complete processing of the data, so as to eliminate or significantly reduce the role of the server to make subsequent document recommendations. A yet further implementation includes gathering implicit and/or explicit user actions from multiple users of multiple devices (e.g., a group of users) and make determinations for the next set of candidate documents based on the activities of the group as a whole with regard to implicit (weighted or non-weighted) and/or explicit (weighted or non-weighted) user actions.

Various Examples of Dynamic Graphical User Interfaces

FIGS. 29A and 29B illustrate a dynamic carousel of products which allows a user to quickly and easily scroll (flip) between products and FIGS. 30, 31, 32, 33, 34, 35, 36, 37, 38, 39, 40, 41, 42, 43, 44A, 44B, 44C, 44D and 44E illustrate various types of graphical user interfaces that provide for dynamic display of documents in dependence on user actions.

As mentioned above regarding the Intelligently Driven User Interface, FIG. 29A illustrates certain products that are clustered into groups. Specifically, presenting the user certain products that are representative of K clusters in groups. FIG. 29A illustrates in a vertical carousel various groups of products, where each group displays a representative number of products that belong to that group. The user can partially see the representative products for the next group that is located behind the front group. As the user begins to move the front group the user can view more of the next group. This gives the user the ability to decide if they are more interested in the group behind the front group. Once the user selects the group that they are interested in the dynamic display will present to the user a screen similar to that illustrated in FIG. 29B.

FIG. 29B allows the user to view some or all of the products from the group of products they selected from FIG. 29A. As the user scrolls or flips through the products, as illustrated in FIG. 29B, the user can select thumbs up, select thumbs down, or just move on to the next product. As explained in detail above with reference to the Intelligently Driven User Interface, additional products will be presented to the user based on their level of interest or disinterest in the presented products. FIG. 29B does not specifically illustrate that the user is able to view the products behind the front product, but just like FIG. 29A, the user does have the ability to get a glimpse of the product behind the front product as the user moves the front product (without completely moving past the front product).

Figure 30:
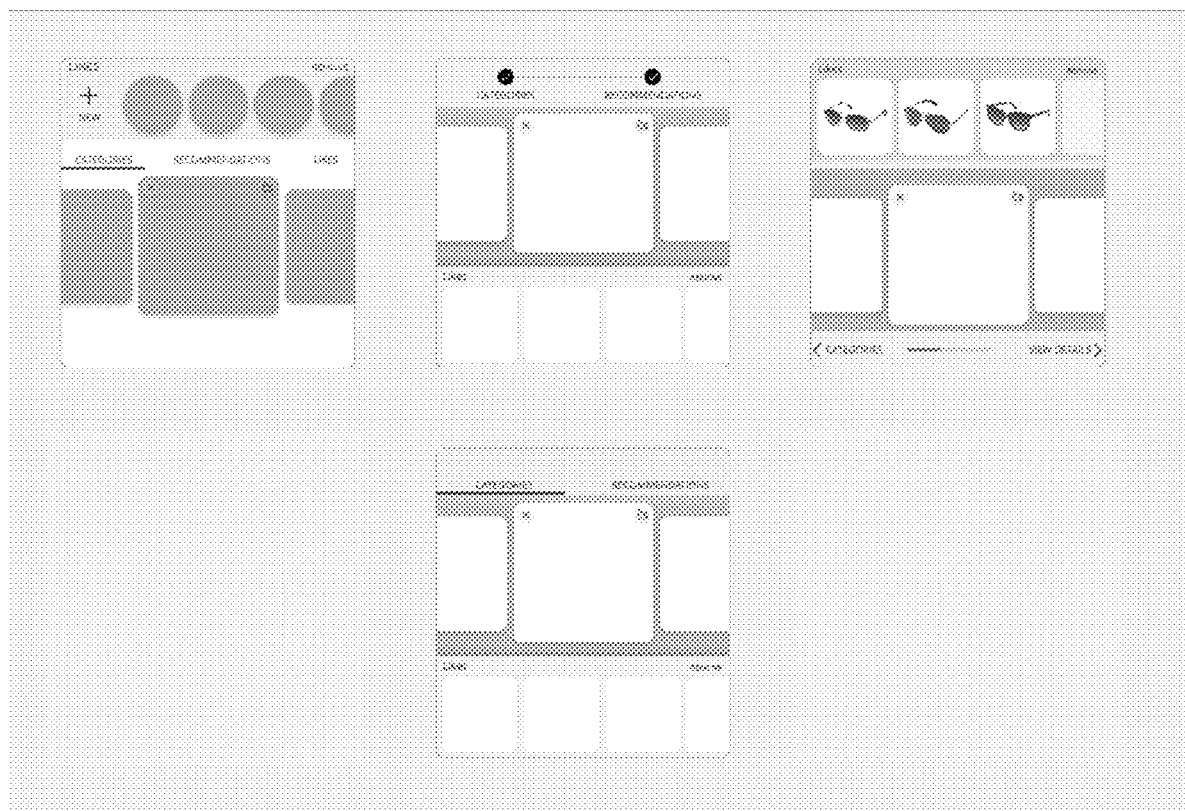
FIGS. 30, 31, 32, 33, 34, 35, 36, 37, 38, 39, 40, 41, 42 and 43 illustrate various types of graphical user interfaces that provide for dynamic display of documents in dependence on user actions.

FIG. 30 illustrates various different examples of graphical user interfaces that provide for dynamic display. These examples illustrate different possible locations for placement of liked products and different menu options such as removing, liking, scrolling, etc., in a manner consistent with the previously described Intelligently Driven User Interface and Implicit User Actions.

Figure 31:
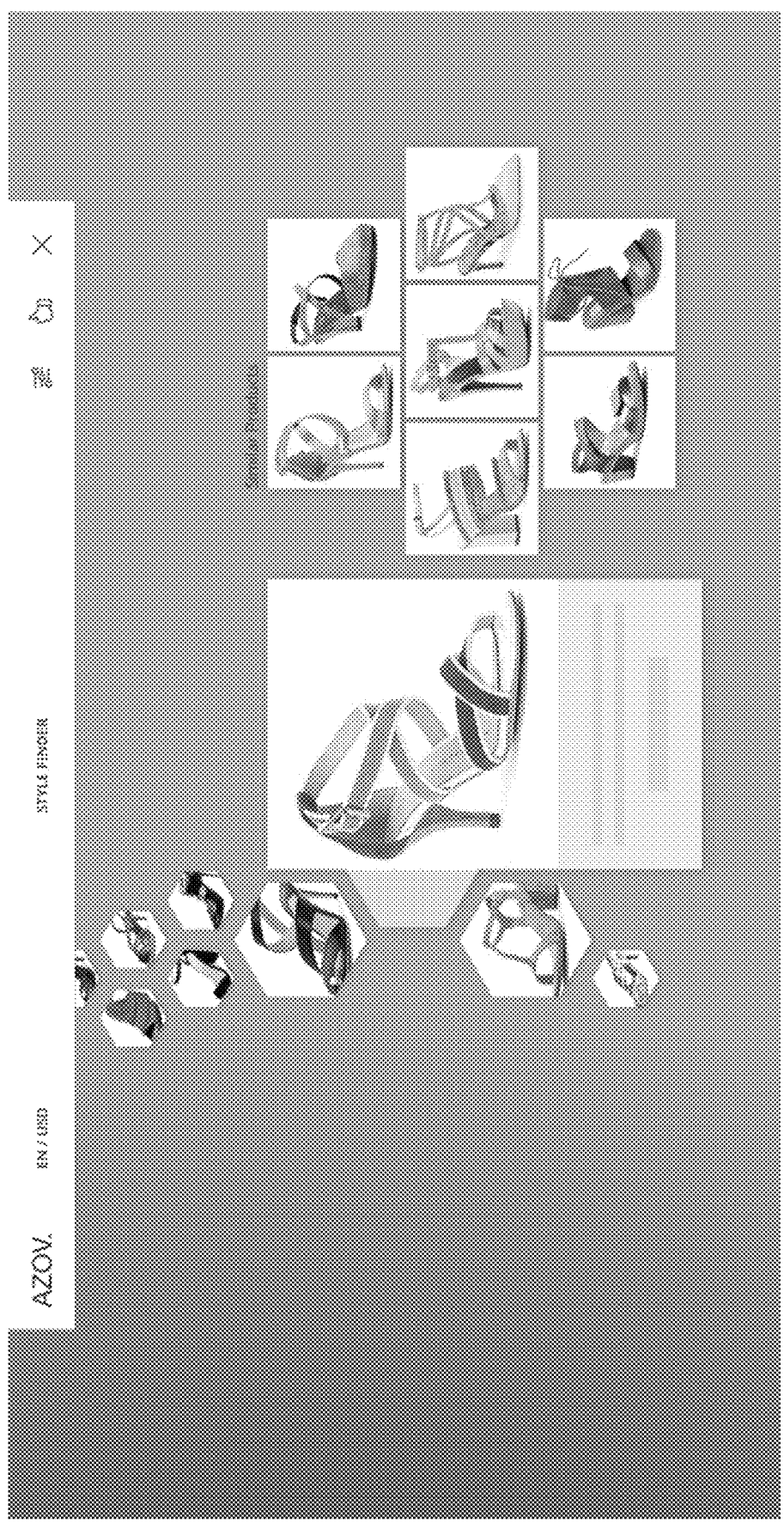
Figure 32:
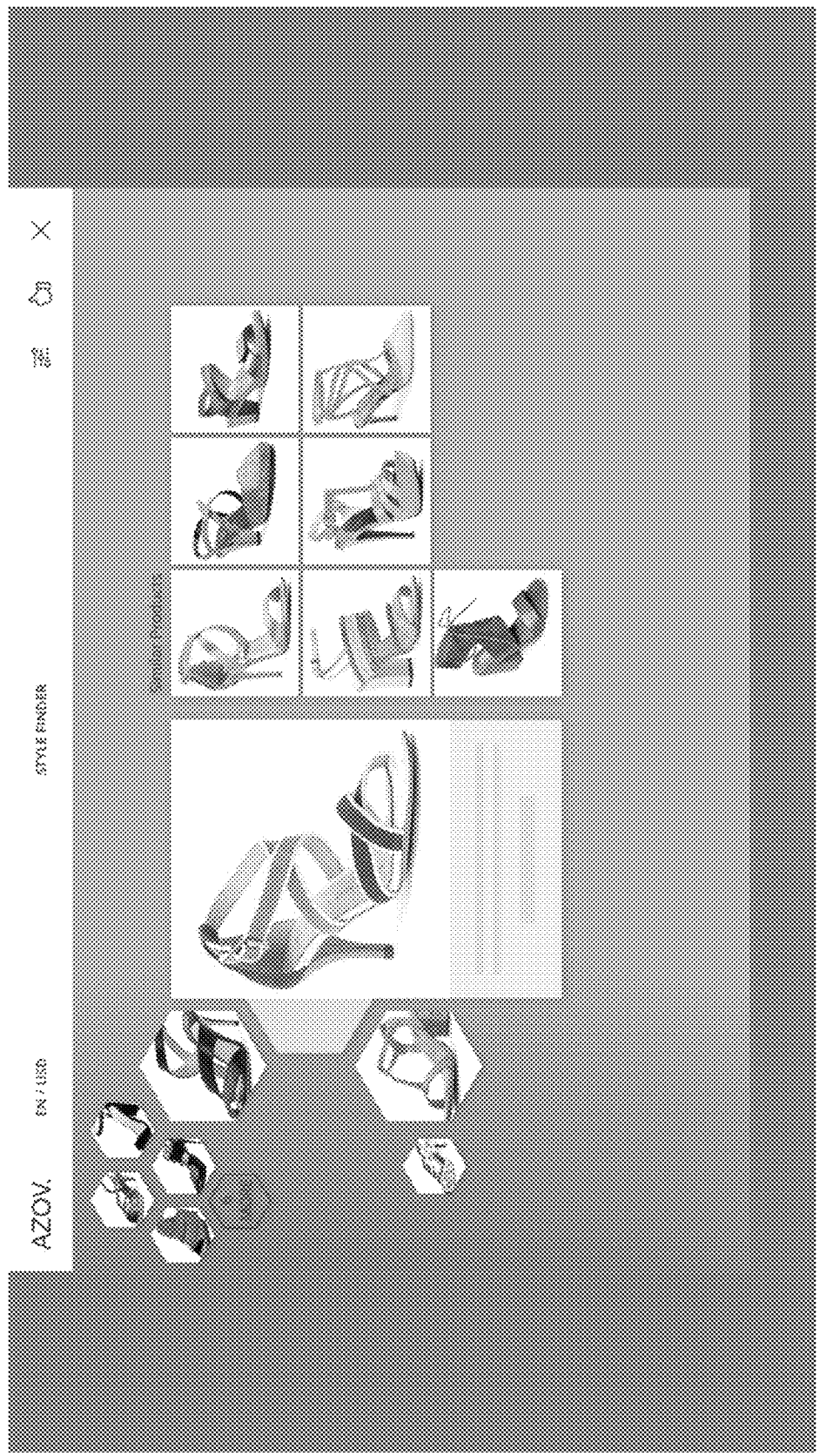
Figure 33:
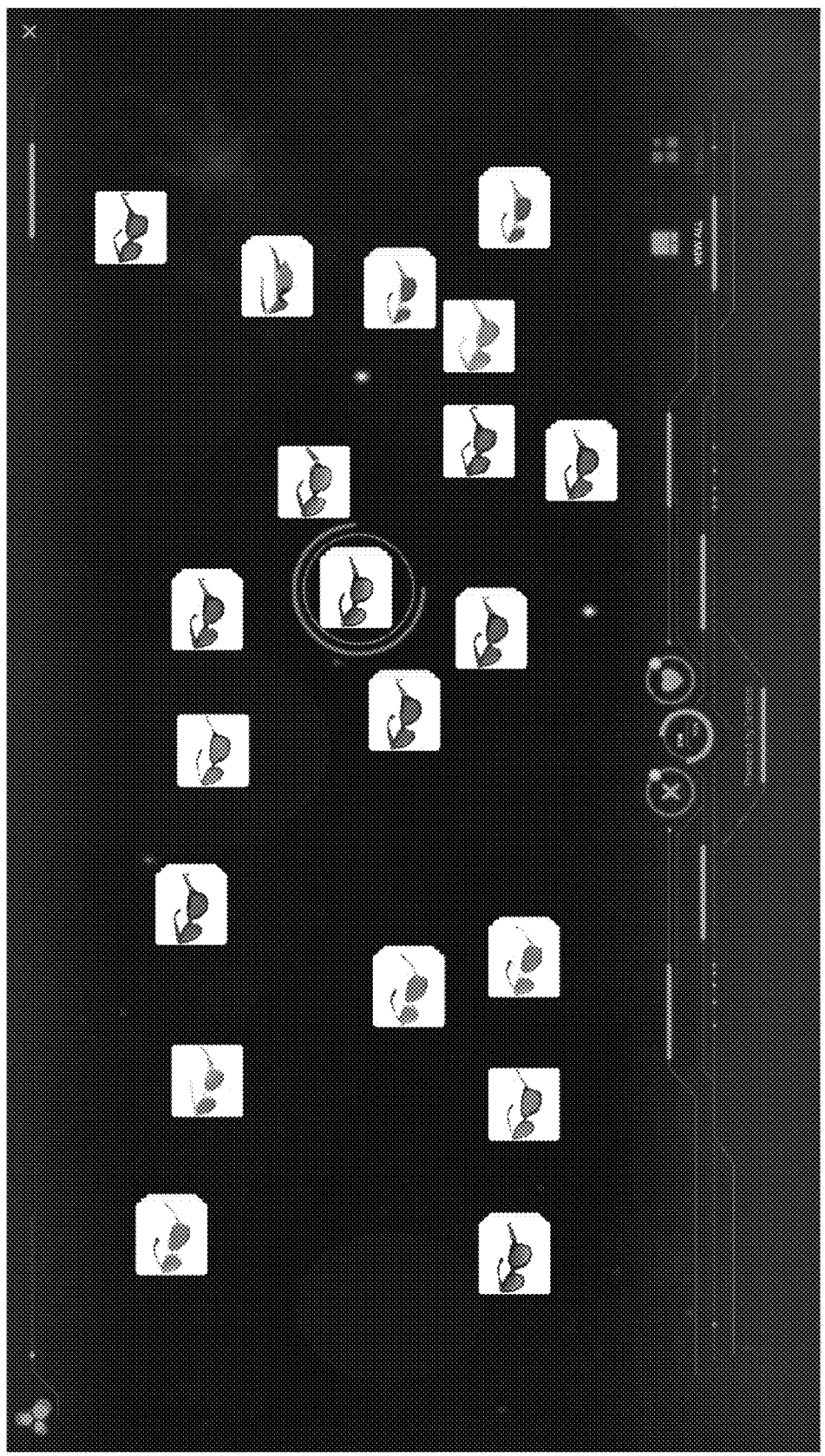
Figure 34:
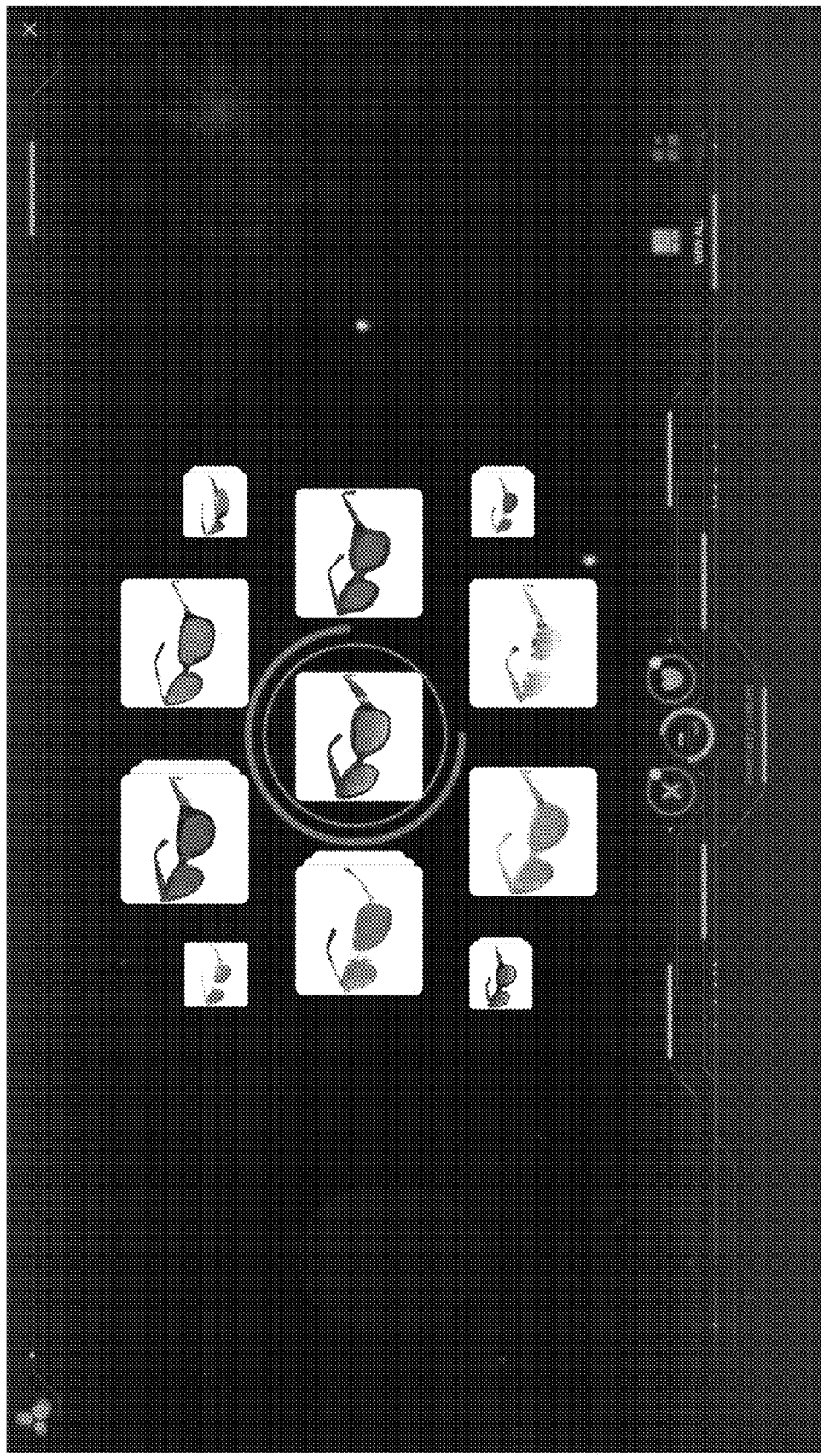
Figure 35:
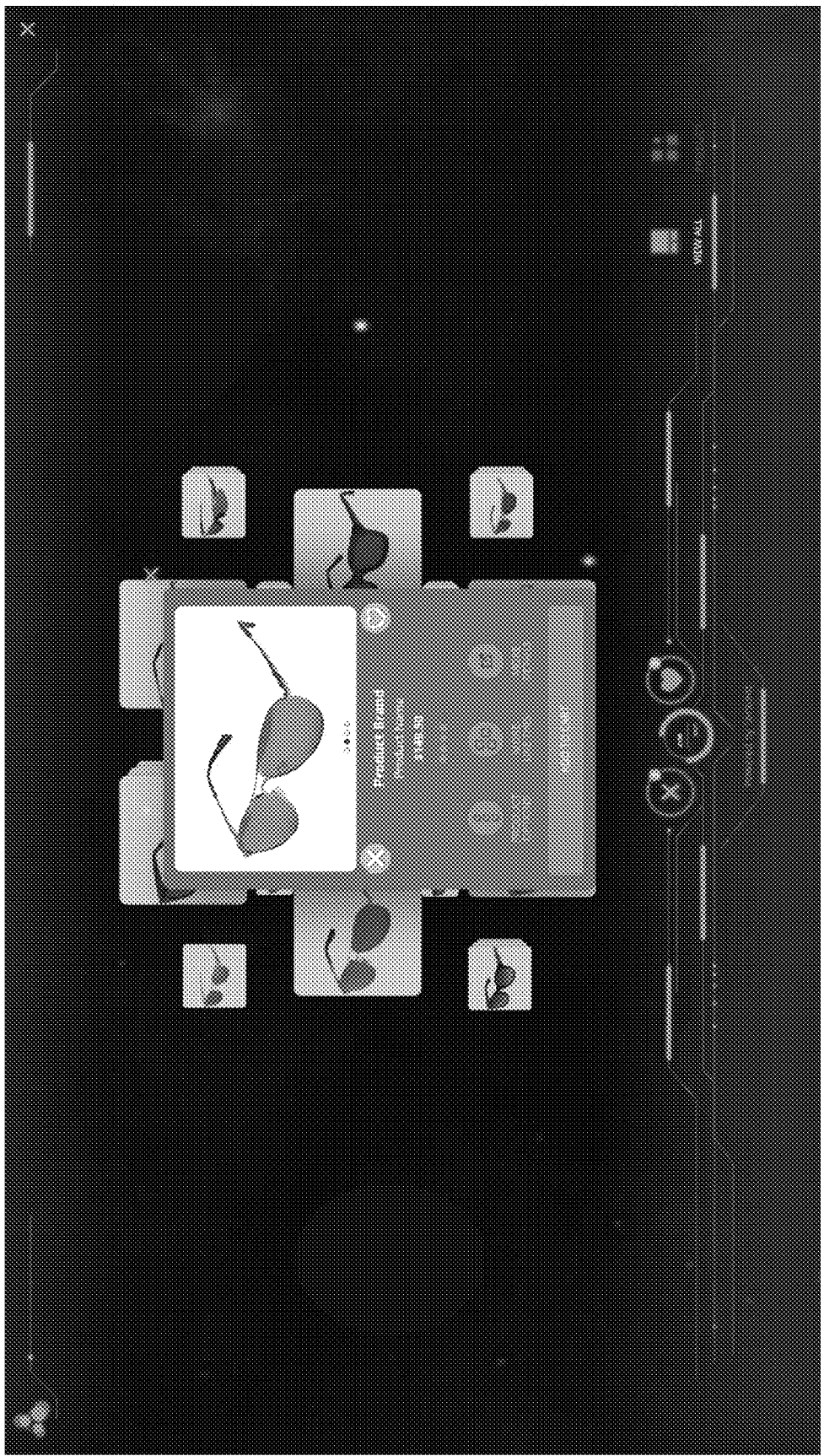
Figure 36:

FIGS. 31 and 32 illustrate various examples of presenting groupings of products and identifying similar products in a manner consistent with the previously described Intelligently Driven User Interface and Implicit User Actions.

FIGS. 33-36 illustrate a high-tech themed interface for selecting groups of products, viewing products from the various groups, etc., with the ability to like or remove products, etc., where the products are grouped and presented using the previously described Intelligently Driven User Interface and Implicit User Actions.

Figure 37:
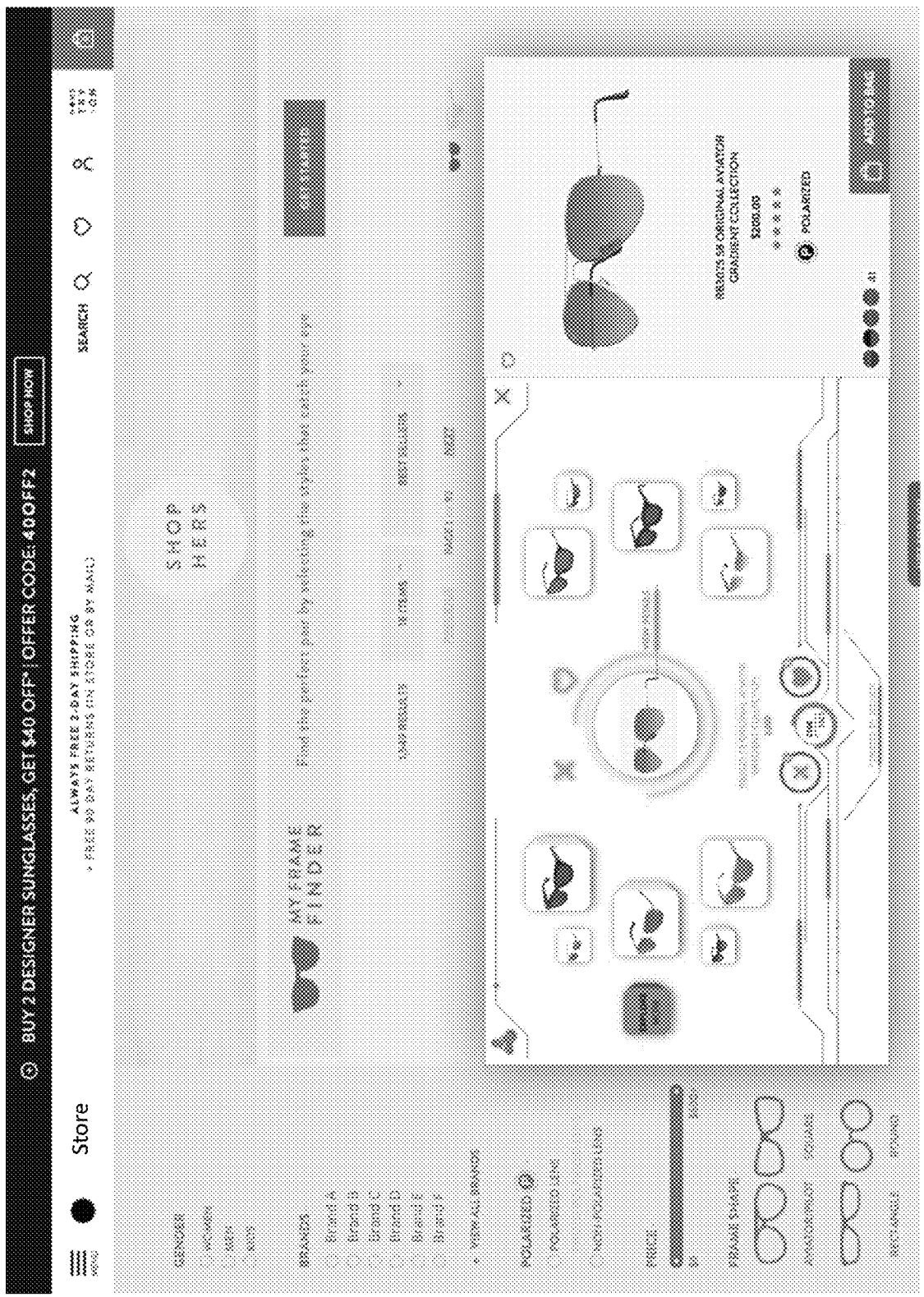

FIG. 37 illustrates an implementation of the high-tech themed interface of FIG. 33-36 into an e-commerce website of a fictional store.

Figure 38:
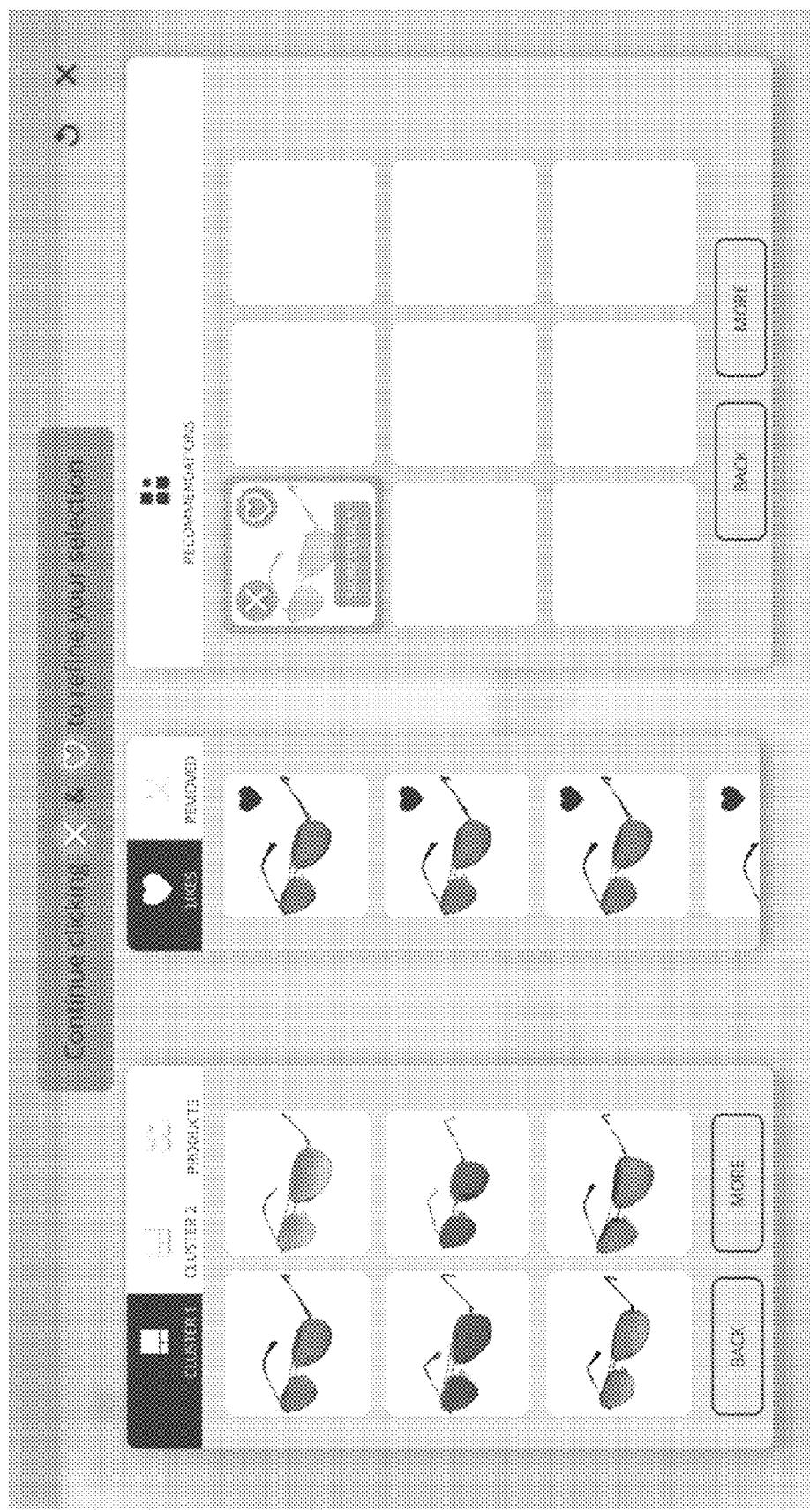
Figure 39:
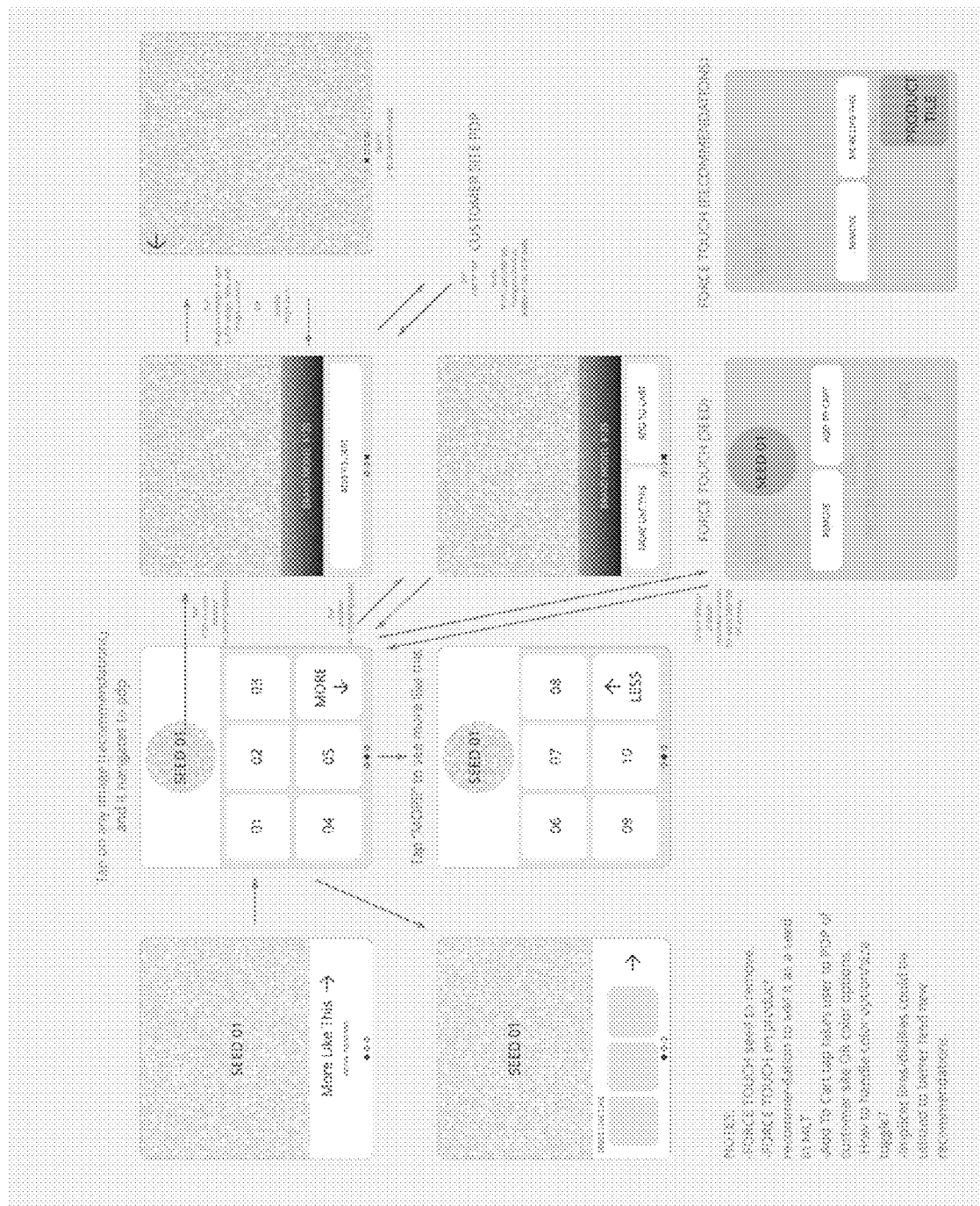
Figure 40:
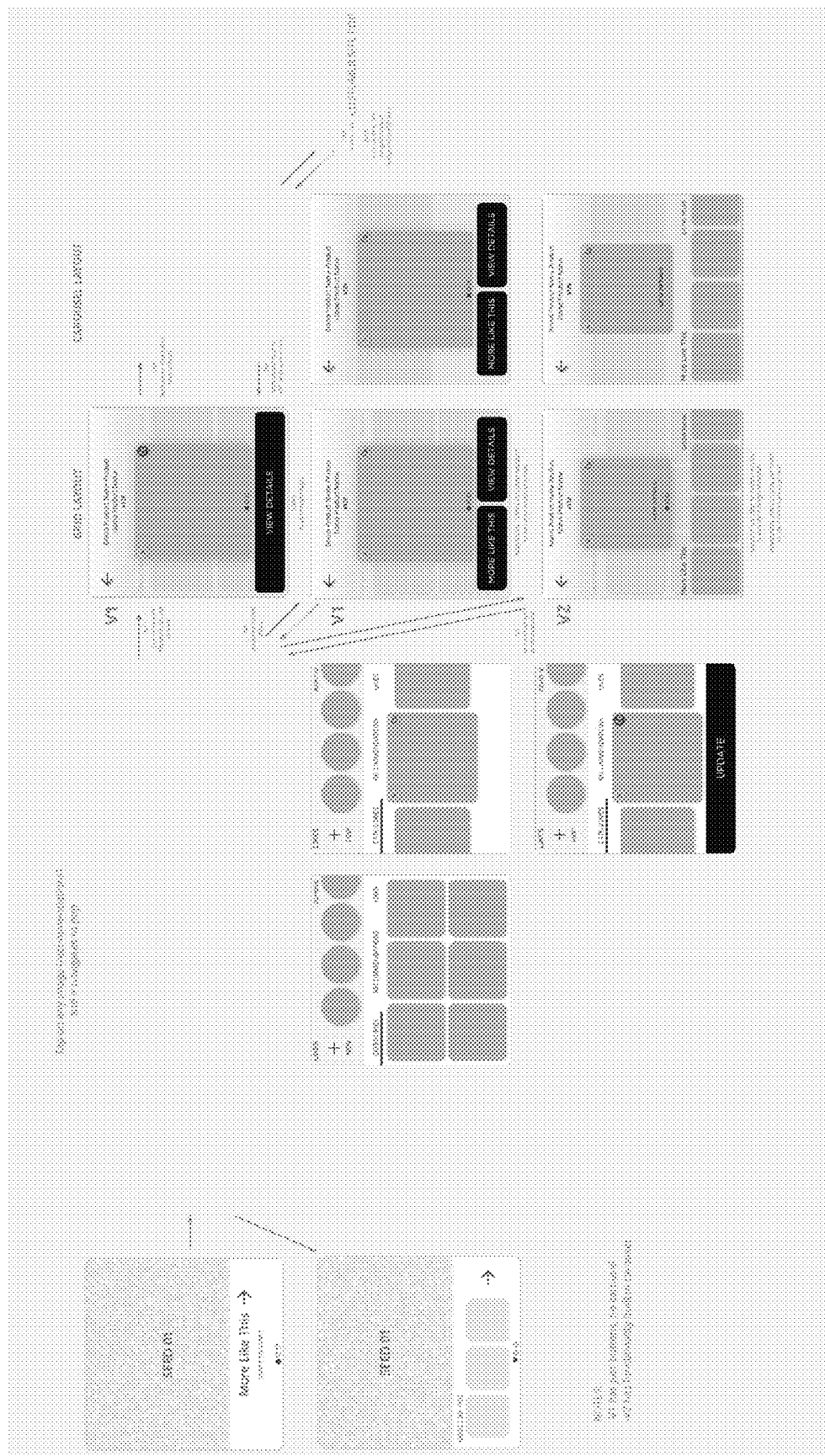
Figure 41:
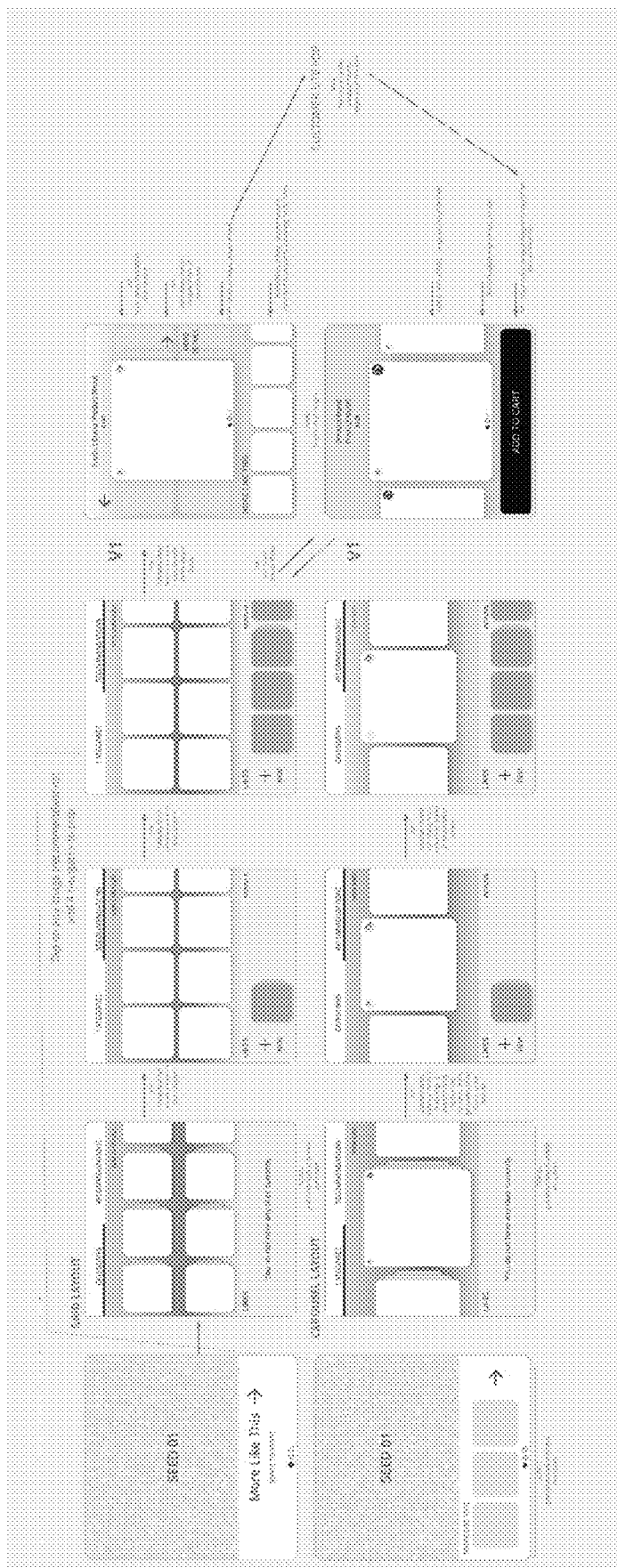
Figure 42:
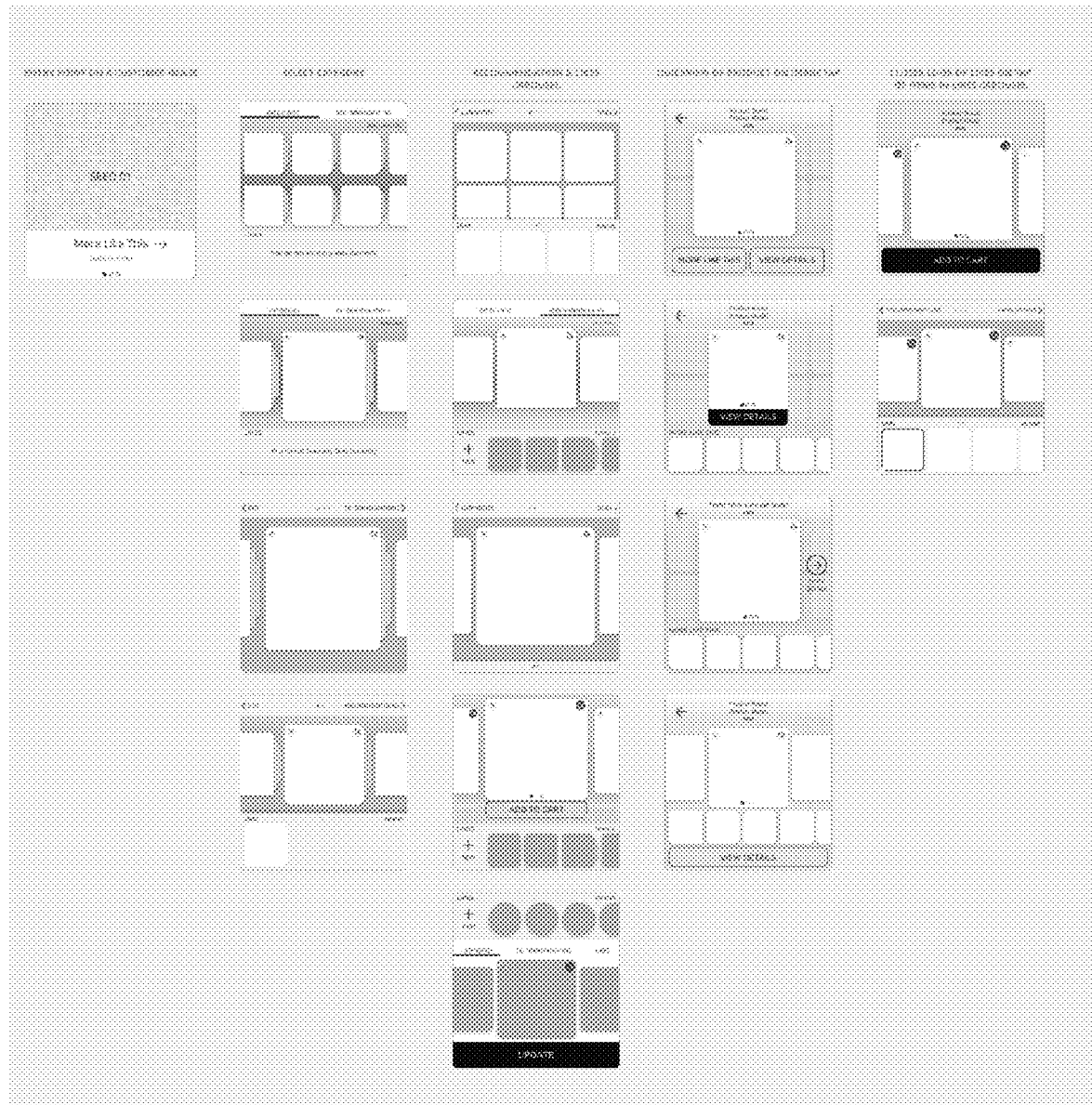

FIG. 38 illustrates various different examples of graphical user interfaces that provide for dynamic display. These examples illustrate different possible locations for placement of liked products and different menu options such as removing, liking, scrolling, etc., in a manner consistent with the previously described Intelligently Driven User Interface and Implicit User Actions.

FIGS. 39-42 illustrate various different "flows" of graphical user interfaces that provide for dynamic display of products in dependence on user actions starting from a "seed" and continuing through various stages of a customer experience, where the products are grouped and presented using the previously described Intelligently Driven User Interface and Implicit User Actions.

Figure 43:
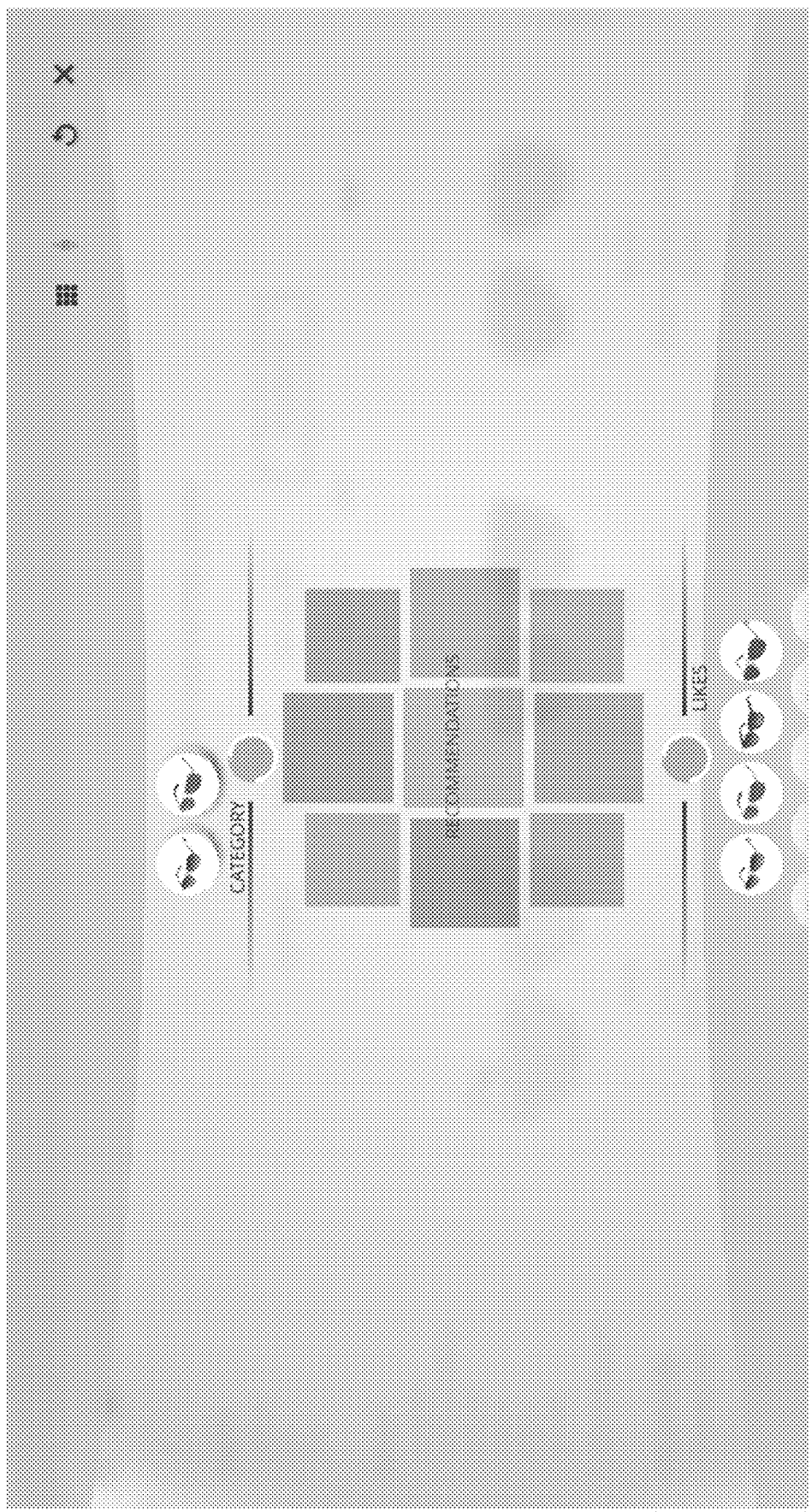

FIG. 43 illustrates an example of graphical user interface that provides for dynamic display. This example illustrates possible locations for placement of liked products, categories, recommendations, etc., in a manner consistent with the previously described Intelligently Driven User Interface and Implicit User Actions.

Simple Collection and Comparison of Items on a Mobile Device or Tablet

Screen sizes of devices play a significant factor on e-commerce conversion rates. Smaller screens of devices such as mobile devices and tablets typically have a lower conversion rate with respect to product purchases than larger screens. This is at least partially driven because the user has difficulty tracking which products they prefer or like and which products they do not prefer or like.

Typically, preferred products can be placed in a "cart" for purchase or a wish list. However, this is cumbersome and has drawbacks. The technology disclosed provides a user interface that includes an "electronic drawer" at the bottom of user interface. The electronic drawer can either include a smaller replication each of the items that were liked or can be a link to a list that displays each of the items that the user has "liked" during that session. When the electronic drawer includes a replication of each of the liked items at a location on the screen, the items that are visible in the electronic drawer may exceed what can be displayed on the screen. If this occurs, the contents of the electronic drawer can be scrolled through by swiping in the appropriate direction. The user can select any of the items in the electronic drawer to get more detailed information. If the user wants to manipulate the items in the electronic drawer, the items can be rearranged or removed by swiping and/or moving in the desired direction.

As the user continues to like items, more similar recommendations are provided to the user. The user is able to view the contents of the electronic drawer at any point without the necessity of adding items to the cart or creating a special wish list for that specific shopping experience.

For example, when a user "likes" a product by selecting a like button (as opposed to a dislike button or as opposed to not selecting a like or a dislike button) the electronic drawer is populated with the liked item and better recommendations are provided to the user for further viewing. Most product comparisons rely on multiple open tabs—opened from a single search results page (referred to as pogoing). The technology disclosed provides better ways to present tables of product information on a mobile or tablet interface, which has a smaller form factor than desktop devices.

The technology disclosed addresses the difficulty of accumulating products of interest, then comparing them in detail on the small form factor of a mobile device.

The conventional way e-commerce sites allow for product comparison is to allow people to open up product detail pages from a base page such as a search results page, or product landing page. This is insufficient as it takes many clicks to 'pogo' back and forth between the main results page and the product details. It also adds cognitive load to the user who has to try and remember the items they like, amongst a large set of items they do not.

Alternatively, people will add items to their cart (with intention of removing the items they ultimately decide not to buy), or to a persistent wish list. This method is insufficient as it still requires 'pogoing' back and forth between details pages and the wish list. It also requires the user to manually remove the items from the wish list after they have made their decision.

Sites like www.samsung.com/us/compareNcategory/N0000099 allow you to add a 'Compare List' but this does not guide your search to items you are more likely to like, and is not well tailored to mobile.

The technology disclosed provides a user interface that allows the user to navigate through recommended products by liking and disliking items. As more items are liked and disliked, it presents improved recommendations are presented to the user. The improved recommendations are obtained, for example, from a highly dimensional space representing products and using the various techniques described in the documents incorporated by reference.

These likes are stored for that shopping session, and displayed in a permanent drawer at the bottom of the page. This makes it exceptionally easy to switch between products when the user is comparing details of their initial selections.

For example, the technology disclosed presents the user with a carousel of products, which they scroll through, liking and disliking products. Every like is stored in memory for the length of the session.

Figure 44C:
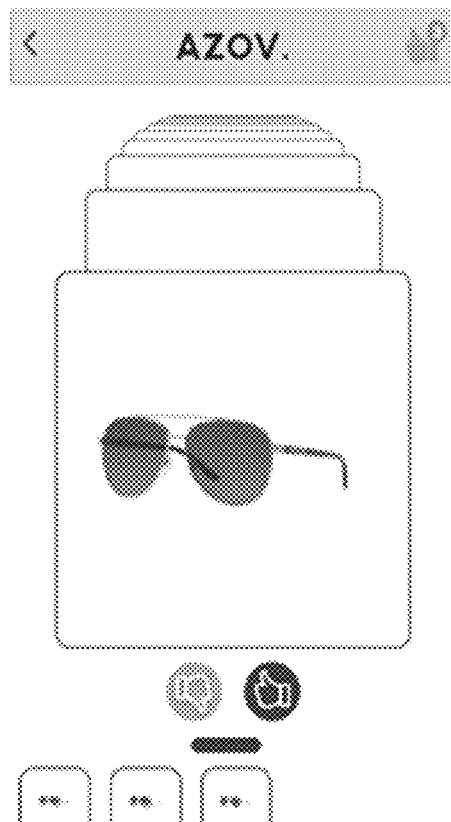
Figure 44D:
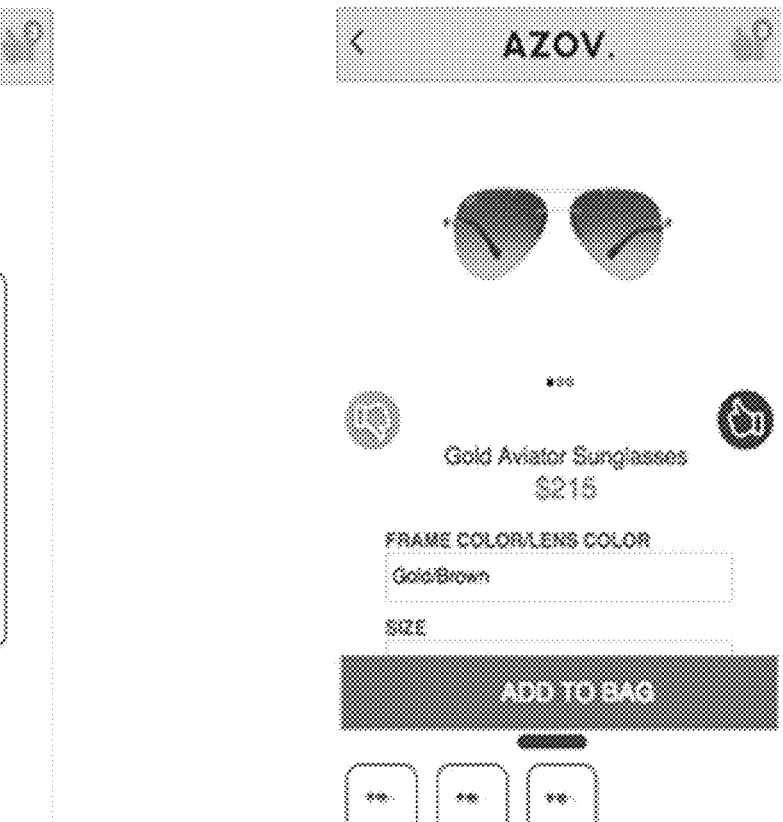
Figure 44E:

Next, the products are displayed in a drawer at the bottom of the page. This drawer is always present—allowing the user to jump to comparing at any point. This process is illustrated in FIG. 44A-44E. FIG. 44A illustrates presentation of a product to a user on a mobile device or tablet (or even a browser on a computer screen). The user is given the ability to like the product, dislike the product or just ignore the product and flip to the next product. The products are presented to the user in the same or similar manner as discussed above regarding Intelligently Driven User Interface and Implicit User Actions. FIG. 44B illustrates that a thumbnail of a product that has been "liked" by the user is placed near the bottom of the graphical user interface. The thumbnail of the product can be placed anywhere on the graphical user interface. FIG. 44C illustrates that multiple thumbnails of "liked" products are placed near the bottom of the graphical user interface. This allows the user to keep track of the products that have been liked while still providing the ability for the user to scroll through other products. FIG. 44D illustrates an example of what happens when the user selects one of the products from the main portion of the graphical user interface or selects one of the products from the thumbnails so that the user can get additional information about a particular product and then add it to their shopping cart or shopping bag. FIG. 44E illustrates an example of the user selecting a different product, in contrast to the product selected in FIG. 44D. The user can quickly switch between the products illustrated in FIG. 44D and FIG. 44E by selecting different thumbnail images located near the bottom of the graphical user interface.

These features can also be implemented in a desktop or laptop computing environment. This can eliminate the need to have multiple tabs or browser instances for product comparison and can reduce the number of clicks for switching between products.

Various Implementations

According to an implementation, the meaning assigned to the implicit user action can be weighted in dependence on the type of implicit user action.

In another implementation, the implicit user action can be one or more of (i) requesting a more detailed description of the document, (ii) requesting the document to be added to a cart, (iii) requesting the document to be added to a list (iv) the user lingering on a view of the document for more than a predetermined amount of time and (v) the user lingering on a view of the document for less than another predetermined amount of time. Further, the meaning assigned to the implicit user action is weighted in dependence on whether the implicit user action is one or more of (i), (ii), (iii), (iv) and (v).

According to an additional implementation the implicit user action can be one or more of (i) a particular eye movement of the user that is tracked using an eye tracker, (ii) opening information associated with an entity that is associated with the document, (iii) facial changes of the user tracked using a facial tracker, (iv) a previous document identification session with the user. Further, the meaning assigned to the implicit user action can be weighted in dependence on whether the implicit user action is one or more of (i), (ii), (iii) and (iv).

In an implementation, the user action can be an implicit user action and the weight can be assigned in dependence upon a type of the implicit user action.

Additionally, the user action can be an explicit user action solicited or required from the user and the weight is assigned in dependence upon a type of the explicit user action.

According to another implementation, a method of implementing a graphical user interface to collect information from a user is provided. The method can include dynamically displaying, by the graphical user interface, a document from a catalog of documents in an embedding space, wherein the catalog of documents is from a database identifying a distance between each pair of the documents in the embedding space corresponding to a predetermined measure of dissimilarity between the pair of documents; collecting information representing one or more implicit actions of the user interacting with the graphical user interface that is dynamically displaying the document, the one or more implicit actions being unsolicited actions received by the graphical user interface; receiving a subsequent document to display to the user in dependence on the information collected from the user that represents the one or more implicit actions; and dynamically displaying the subsequent document.

Further, a meaning can be assigned to the collected information representing the one or more implicit actions of the user, such that each of the one or more implicit actions of the user has its own meaning, and wherein the meaning of each of the one or more implicit actions is weighted in dependence on the type of implicit user action.

Moreover, the graphical user interface can be displayed by a portable electronic device.

In a further implementation a method of implementing a graphical user interface to collect information from a user can be provided. The method can include providing, for dynamic display by the graphical user interface, a document from a catalog of documents in an embedding space, wherein the catalog of documents is from a database identifying a distance between each pair of the documents in the embedding space corresponding to a predetermined measure of dissimilarity between the pair of documents. The method can also include receiving a collection of information representing one or more implicit actions of the user interacting with the graphical user interface that is dynamically displaying the document, the one or more implicit actions being unsolicited actions received by the graphical user interface. The method can include determining a subsequent document to display to the user in dependence on the information collected from the user that represents the one or more implicit actions, and providing the determined subsequent document for dynamic display by the graphical user interface.

Conclusion

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

It will be appreciated that the logic described herein for implementing aspects of the invention herein can be implemented using processors programmed using computer programs stored in memory accessible to the computer systems and executable by the processors, by dedicated logic hardware, including field programmable integrated circuits, or by combinations of dedicated logic hardware and computer programs. Each step in a process described herein can be implemented in hardware or in software running on one or more computing processes executing on one or more computer systems. In one embodiment, each step illustrates the function of a separate module of software. In another embodiment, the logic of the step is performed by software code routines which are distributed throughout more than one module. In each embodiment, the code portions forming a particular module can be either grouped together in memory or dispersed among more than one different region of memory.

Applicant hereby discloses in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the invention. Applicant indicates that aspects of the present disclosure may consist of any such feature or combination of features. In view of the foregoing description it will be evident to a person skilled in the art that various modifications may be made within the scope of the invention.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various implementations of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various implementations of the present disclosure as described above. Alternatively, one or more processors operating in accordance with stored instructions may implement the functions associated with the various implementations of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

The foregoing description of preferred implementations of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of implementations of the invention. In addition, any and all variations described, suggested or incorporated by reference herein with respect to any one implementation are also to be considered taught with respect to all other implementations. The implementations described herein were chosen and described in order to best explain the principles of the invention and its practical application, thereby enabling others skilled in the art to understand the invention for various implementations and with various modifications as are suited to the particular use contemplated. It is intended that the scope of the invention be defined by the following clauses and their equivalents.

The invention claimed is:

1. A method of implementing a graphical user interface to collect information from a user, the method comprising:
   dynamically displaying, by the graphical user interface, K>1 groupings of M>1 documents from a catalog of documents in an embedding space,
      wherein the catalog of documents is from a database, a distance between each pair of the documents in the embedding space corresponding to a predetermined measure of dissimilarity between the pair of documents, and
      wherein the K groupings are formed using K-medoid clustering analysis;
   receiving a user selection of one grouping of the K groupings;
   dynamically displaying, by the graphical user interface, a predetermined number P>0 documents of the cluster which corresponds to the selected grouping;
   receiving, from the user, categorical feedback with respect to two or more of the $P_k$ documents of the selected grouping, wherein the categorical feedback is a user interaction with the two or more of the $P_k$ documents indicating that the user likes at least one of the two or more documents of the $P_k$ documents and that the user dislikes at least one of two or more other documents of the $P_k$ documents, wherein the liked one or more documents is a set of liked documents and the disliked one or more documents is a set of disliked documents; and
   dynamically displaying, by the graphical user interface, an identified subsequent document from the selected grouping in dependence on the set of liked documents and the set of disliked documents.

2. The method of claim 1, wherein the measure of dissimilarity between the pair of documents is based on at least a color of the documents of the pair of documents.

3. A non-transitory computer-readable recording medium having computer instructions recorded thereon, the computer instructions, when executed on one or more processors, causing the one or more processors to implement the method of claim 1.

4. A system including one or more processors coupled to memory, the memory being loaded with computer instructions, the computer instructions, when executed on the one or more processors, causing the one or more processors to implement the method of claim 1.

5. A method for user identification of a desired document, comprising:
   providing, accessibly to a computer system, a database identifying (i) a catalog of documents in an embedding space and (ii) a distance between each pair of the documents in the embedding space, the distance corresponding to a predetermined measure of dissimilarity between the pair of documents;
   identifying, using the computer system and for dynamic display toward the user, an initial (i=0) collection of N0>1 candidate documents from the catalog of documents in the embedding space, the initial collection having fewer documents than the catalog of documents;
   for each i'th iteration in a plurality of iterations, beginning with a first iteration (i=1):
      detecting an implicit user action with respect to two or more documents of the (i−1)'th collection of documents, wherein the implicit user action is an input of an interaction with the two or more documents of the (i−1)'th collection of documents,
      assigning a meaning to the implicit user action, wherein the meaning is an indication that the user (i) likes at least one of the two or more documents of the (i−1)'th collection of documents and (ii) dislikes at least one of the two or more documents of the (i−1)'th collection of documents,
      identifying, using the computer system, an i'th collection of Ni>1 candidate documents from the embedding space such that, according to a predefined definition of collective closeness, the candidate documents in the i'th collection of Ni>1 candidate documents have a collective closeness in the embedding space to the two or more documents that is dependent upon the meaning assigned to the implicit user action, and identifying, for dynamic display toward the user, the i'th collection of Ni>1 candidate documents; and
   taking action in response to user selection of a document, of the i'th collection of Ni>1 documents, dynamically identified toward the user,
   wherein the predefined definition of collective closeness is defined such that a candidate document X is considered closer to a document A than to a document B if in the embedding space, d(A,X)<d(B,X).

6. A non-transitory computer-readable recording medium having computer instructions recorded thereon, the computer instructions, when executed on one or more processors, causing the one or more processors to implement the method of claim 5.

7. A system including one or more processors coupled to memory, the memory being loaded with computer instructions, the computer instructions, when executed on the one or more processors, causing the one or more processors to implement the method of claim 5.

8. A method for user identification of a desired document, comprising:
   providing, accessibly to a computer system, a database identifying (i) a catalog of documents in an embedding space and (ii) a distance between each pair of the documents in the embedding space corresponding to a predetermined measure of dissimilarity between the pair of documents;
   identifying, using the computer system and for dynamic display toward the user, an initial (i=0) collection of N0>1 candidate documents from an initial (i=0) candidate space within the embedding space, the initial collection having fewer documents than the initial candidate space;

for each i'th iteration in a plurality of iterations, beginning with a first iteration (i=1):

detecting an implicit user action with respect to two or more documents of the (i−1)'th collection of documents, wherein the implicit user action is an input of an interaction with the two or more documents of the (i−1)'th collection of documents, assigning a meaning to the implicit user action, wherein the meaning is an indication that the user (i) likes at least one of the two or more documents of the (i−1)'th collection of documents and (ii) dislikes at least one of the two or more documents of the (i−1)'th collection of documents, identifying, using the computer system, an i'th candidate space from the embedding space such that, according to a predefined definition of collective closeness and in dependence on the meaning assigned to the implicit user action, the documents in the i'th candidate space are collectively closer in the embedding space to or collectively farther in the embedding space from documents in an i'th selected subset, than are the documents in the (i−1)'th candidate space, and identifying, for dynamic display toward the user, an i'th collection of Ni>1 candidate documents from the i'th candidate space, Ni being smaller than the number of documents in the i'th candidate space; and taking action in response to user selection of a document, of the i'th collection of Ni>1 documents, dynamically identified toward the user, wherein the predefined definition of collective closeness is defined such that a candidate document X is considered closer to a document A than to a document B if in the embedding space, $d(A,X)<d(B,X)$.

9. A non-transitory computer-readable recording medium having computer instructions recorded thereon, the computer instructions, when executed on one or more processors, causing the one or more processors to implement the method of claim 8.

10. A system including one or more processors coupled to memory, the memory being loaded with computer instructions, the computer instructions, when executed on the one or more processors, causing the one or more processors to implement the method of claim 8.

11. A method for user identification of a desired document, comprising:

providing, accessibly to a computer system, a database identifying (i) a catalog of documents in an embedding space and (ii) a distance between each pair of the documents in the embedding space corresponding to a predetermined measure of dissimilarity between the pair of documents;

identifying, using a computer system and for dynamic display toward the user, an initial (i=0) collection of N0>1 candidate documents from the catalog of documents in the embedding space, the initial collection having fewer documents than the catalog of documents;

for each i'th iteration in a plurality of iterations, beginning with a first iteration (i=1):

detecting an implicit user action with respect to two or more documents of the (i−1)'th collection of documents, wherein the implicit user action is an input of an interaction with the two or more documents of the (i−1)'th collection of documents indicating that the user (i) likes at least one of the two or more documents of the (i−1)'th collection of documents and (ii) dislikes at least one of the two or more documents of the (i−1)'th collection of documents, assigning a weight to the implicit user actions in dependence on whether the user action indicates that the user likes or dislikes the two or more documents of the (i−1)'th collection of documents, wherein the assigned weight is positive when a particular user action indicates that the user likes a document of the (i−1)'th collection of documents, and wherein the assigned weight is negative when the particular user action indicates that the user dislikes the document of the (i−1)'th collection of documents, identifying, using a computer system, an i'th collection of Ni>1 candidate documents from the embedding space such that, according to a predefined definition of collective closeness, the candidate documents in the i'th collection of Ni>1 candidate documents have a collective closeness in the embedding space to the document that is dependent upon the weight assigned to the implicit user action, and identifying for dynamic display toward the user the i'th collection of Ni>1 candidate documents; and taking action in response to user selection of a document, of the i'th collection of Ni>1 documents, dynamically identified toward the user, wherein the predefined definition of collective closeness is defined such that a candidate document X is considered closer to a document A than to a document B if in the embedding space, $d(A,X)<d(B,X)$.

12. A non-transitory computer-readable recording medium having computer instructions recorded thereon, the computer instructions, when executed on one or more processors, causing the one or more processors to implement the method of claim 11.

13. A system including one or more processors coupled to memory, the memory being loaded with computer instructions, the computer instructions, when executed on the one or more processors, causing the one or more processors to implement the method of claim 11.

* * * * *